(12) United States Patent
Betzer Tsilevich

(10) Patent No.: US 9,114,406 B2
(45) Date of Patent: Aug. 25, 2015

(54) STEAM DRIVEN DIRECT CONTACT STEAM GENERATION

(75) Inventor: Maoz Betzer Tsilevich, Southwest Calgary (CA)

(73) Assignee: EX-TAR TECHNOLOGIES, Woodbine, Southwest Calgary, Alberta (CA)

( * ) Notice: Subject to any disclaimer, the term of this patent is extended or adjusted under 35 U.S.C. 154(b) by 1017 days.

(21) Appl. No.: 13/230,432

(22) Filed: Sep. 12, 2011

(65) Prior Publication Data

US 2012/0000642 A1 Jan. 5, 2012

Related U.S. Application Data

(63) Continuation-in-part of application No. 12/635,597, filed on Dec. 10, 2009, now Pat. No. 8,789,608, and a continuation-in-part of application No. 12/636,729, filed on Dec. 12, 2009, now Pat. No. 8,424,601.

(51) Int. Cl.

| E21B 43/40 | (2006.01) |
| B03D 1/02 | (2006.01) |
| B03D 1/24 | (2006.01) |
| E21B 43/24 | (2006.01) |
| E21B 43/241 | (2006.01) |
| B01D 1/14 | (2006.01) |

(52) U.S. Cl.
CPC .. B03D 1/02 (2013.01); B03D 1/24 (2013.01); E21B 43/24 (2013.01); E21B 43/241 (2013.01); E21B 43/40 (2013.01); B01D 1/14 (2013.01); *B03D 2203/006* (2013.01)

(58) Field of Classification Search
None
See application file for complete search history.

(56) References Cited

U.S. PATENT DOCUMENTS

| 4,969,520 A | 11/1990 | Jan et al. |
| 6,027,056 A | 2/2000 | Maciejewski |
| 6,036,748 A | 3/2000 | Wallace et al. |
| 6,706,199 B2 | 3/2004 | Winter |
| 2009/0020458 A1 | 1/2009 | Bozak |
| 2010/0282644 A1 | 11/2010 | O'Connor |
| 2011/0061610 A1* | 3/2011 | Speirs et al. .................... 122/32 |

FOREIGN PATENT DOCUMENTS

CA 1211063 A 9/1986

OTHER PUBLICATIONS

"Past, Present and Future of Tailing" a presentation by Mark Shaw of Suncor Energy, Alan Fair of Syncrude and Jonathan Matthews of Shell Canada Energy on Dec. 7-10, 2008 at the International Oil Sands Tailings Conference in Edmonton, Alberta.
"Oil Sands Tailings: Regulatory Perspective" presentation by Richard Houlihan and Haneef Mian from the ECRB, presented on Dec. 10, 2008 at the International Oil Sands Tailings Conference in Edmonton, Alberta.

* cited by examiner

*Primary Examiner* — Angela M DiTrani
(74) *Attorney, Agent, or Firm* — Andrew W. Chu; Craft Chu PLLC

(57) ABSTRACT

The system and method for steam production for oil production. The method includes generating steam from an indirect heat exchange system, mixing the steam with water containing solids and organics, separating solids, and injecting the steam through an injection well or using it above ground for oil recovery, such as for generating hot process water. The system includes a steam drive direct contact steam generator. The water feed can be hot produced water separated from a produced oil emulsion and/or low quality water salvaged from industrial plants, such as refineries and tailings from an oilsands mine.

18 Claims, 65 Drawing Sheets

STEAM DRIVEN DIRECT CONTACT STEAM GENERATION

RELATED U.S. APPLICATIONS

The present application is a continuation-in-part application under 35 U.S. Code Section 120 of U.S. application Ser. No. 12/635,597, filed on Dec. 10, 2009, and entitled "STEAM GENERATION PROCESS FOR ENHANCED OIL RECOVERY", presently pending. The present application also claims continuation-in-part priority from U.S. patent application Ser. No. 12/636,729, filed on Dec. 12, 2009 and entitled "SYSTEM AND METHOD FOR MINIMIZING THE NEGATIVE ENVIRONMENTAL IMPACT OF THE OILSANDS INDUSTRY".

STATEMENT REGARDING FEDERALLY SPONSORED RESEARCH OR DEVELOPMENT

Not applicable.

REFERENCE TO MICROFICHE APPENDIX

Not applicable.

BACKGROUND OF THE INVENTION

1. Field of the Invention

This application relates to a system and method for producing steam from a contaminated water feed for Enhanced Oil Recovery (EOR). This invention relates to processes for directly using steam energy, preferably superheated dry steam, for generating additional steam from contaminated water by direct contact, and using this produced steam for various uses in the oil industry, and in other industries as well. The produced steam can be injected underground for Enhanced Oil Recovery. It can also be used to generate hot process water for the mining oilsands industry. The high pressure drive steam is generated using a commercially available, non-direct steam boiler, co-gen, Once Through Steam Generator (OTSG) or any steam generation system or steam heater. Contaminates, like suspended or dissolved solids within the low quality water feed, can be removed in a stable solid (former Liquid Discharge) system. The system can be integrated with a combustion gas fired Direct Contact Steam Generator (DCSG) for consuming liquid waste streams or with distillation water treatment systems.

2. Description of Related Art Including Information Disclosed Under 37 CFR 1.97 and 37 CFR 1.98.

The injection of steam into heavy oil formations has proven to be an effective method for EOR and it is the only method currently used commercially for recovery of bitumen from deep underground oilsands formations in Canada. It is known that EOR can be achieved when combustion gases, mainly CO2, are injected into the formation, possibly with the use of a DCSG as described in my previous applications. The problem is that oil producers are reluctant to implement significant changes to their facilities, especially if they include changing the composition of the injected gas to the underground formation and the risk of corrosion in the carbon steel pipes due to the presence of the CO2. Another option to address these concerns and generate steam from low grade produced water with Zero Liquid Discharge (ZLD) is to operate the DCSG with steam instead of a combustion gas mixture that includes, in addition to steam, other gases like nitrogen, carbon dioxide, carbon monoxide, etc. The driving steam is generated by a commercially available non-direct steam generation facility. The driving steam is directly used to transfer liquid water into steam and solid waste. In EOR facilities, most of the water required for steam generation is recovered from the produced bitumen-water emulsion. The produced water has to be extensively treated to remove the oil remains that can damage the boilers. This process is expensive and consumes chemicals. The Steam Drive-Direct Contact Steam Generator (SD-DCSG) can consume the contaminated water feed for generating steam. The SD-DCSG can be a standalone system or can be integrated with a combustion gas DCSG, as described in this application. The proposed SD-DCSG is also suitable for oilsands mining projects where the Fine Tailings (FT) or Mature Fine Tailings (MFT) are heated and converted to solids and steam using the driving steam energy. The produced steam from the SD-DCSG can be used to heat the process water in a direct or non-direct heat exchange. The hot process water is mixed with the mined oilsands ore during the extraction process.

The method, as described, includes generating additional steam from highly contaminated oily water with an option for zero liquid waste discharge. Superheated steam from an industrial boiler is used as the driving force for generating additional steam in a direct contact heat transfer with the contaminated water. Fine Tailings from tailing ponds can be also used. A "tailor made" pressure and temperature steam, as required for injection into the underground oil bearing formation, is generated. This process allows for generation of additional lower temperature steam from waste water in a high efficiency energy process. The amount of additional steam generated increases with the temperature of the driving steam, and with the reduction of the pressure of the formation. For low pressure shallow formations, more steam can be produced in comparison to deep, high pressure formations. Another option is to recycle a portion of the produced steam through a heater and use it as the driving steam, and thereby minimizing the need for external steam as a heat energy source. A portion of the oil component in the water feed will be converted into hydrocarbon gas, basically serving as a solvent. Additional solvents can be added and injected with the steam to improve the oil recovery. The presented technology has a high thermal efficiency capable of consuming contaminated hot produced water, without the need to reduce the heat to allow effective water treatment. The process can convert the existence of oil contaminates within the feed water into an advantage by generating solvent. This steam generation direct contact facility can be located in close proximity to the SAGD pads to use the hot produced water and inject the produced steam into the injection wells.

The steam for the SD-DCSG can be provided directly from a power station. The most suitable steam will be medium pressure, super-heated steam as is typically fed to the second or third stage of steam turbine. A cost efficient, hence effective system will be used to employ a high pressure steam turbine to generate electricity. The discharge steam from the turbine, at a lower pressure, can be recycled back to the boiler re-heater to generate a superheated steam which is effective as a driving steam. Due to the fact that the first stage turbine, which is the smallest size turbine, produces most of the power (due to a higher pressure), the cost per Megawatt of the steam turbine will be relatively low. The efficiency of the system will not be affected as the superheated steam will be used to drive the SD-DCSG directly and to generate injection steam for an enhanced oil recovery unit with Zero Liquid Discharge (ZLD). A ZLD facility is more environmentally friendly compared to a system that generates reject water and sludge.

The definition of "Steam Drive-Direct Contact Steam Generation" (SD-DCSG) is that steam is used to generate additional steam from a direct contact heat transfer between the liquid water and the combustion gas. This is accomplished through the direct mixing of the two flows (the water and the steam gases). In the SD-DCSG, the driving steam pressure is similar to the combustion pressure and the produced steam is a mixture of the two.

The driving steam is generated in a Non-Direct Steam Generator (like a steam boiler with a steam drum and a mud drum) or in a "Once Through Steam Generator" (OTSG) COGEN that uses the heat from a gas turbine to generate steam, or in any other available design. The heat transfer and combustion gases are not mixed and the heat transfer is done through a wall (typically a metal wall), where the pressure of the generated steam is higher than the pressure of the combustion. This allows for the use of atmospheric combustion pressure. The product is pure steam (or a steam and water mixture, as in the case of the OTSG) without combustion gases.

The excessive energy in the superheated steam is used for generating additional lower temperature steam for injection into the formation. The use of evaporation water treatment facilities in the oilsands industry allows for the production of superheated steam. The proposed method uses Direct Contact Steam Generation where the superheated steam gas is in direct contact with the liquid produced water. Hydrocarbons, like solvents, within the produced water will be directly converted to gas and recycled back to the formation, possibly with additional solvents that can be added to the steam flow. The method generates a "tailor made" pressure and temperature steam, as required for injection into the underground oil bearing formation while maximizing the amount of the generated steam. The simulation in this application shows that for a 263 psi system with a constant feed of 25° C. water flow at 1000 kg/hour, there is a need for 12.9 tons/hour of 300° C. steam to gasify 1 ton/hour of liquid water. When higher temperature (500° C.) driving steam is used, there is a need for only 4.1 tons/hour of steam. The example simulation results show that the amount of produced steam increases by 314% with an increase in the driving steam temperature. The pressure impact simulation was based on driving steam being at a constant temperature of 450° C. and with one ton/hour of 25° C. water feed. The simulation shows that at pressure of 263 psi, 4.9 tons/hour of driving steam is used to gasify the water feed. At a higher pressure of 1450 psi, 5.1 tons/hour driving steam will be used. The results show that a pressure increase slightly reduces the amount of produced steam. The impact of the feed water temperature on the system performance was also simulated. It was shown that for a system of constant 12 kw heat source at 600 psi, 15.1 kg/hour of feed water was gasified to generate injection steam. When the produced water temperature was 220° C., 22.4 kg/hour was gasified. This shows that the produced water temperature has a large impact on the overall performance and that by using the high temperature produced water, the system performance can be increased by close to 150%. The simulation shows that hydrocarbons, like solvents with the produced water, will be converted to gas and injected with the steam. The system can also include a heater to recycle a portion of the produced steam as the driving steam that will be produced locally. There was also shown to be an advantage to using hot produced water and minimizing the produced steam pressure drop. This can be achieved by locating the system close to the injection and production well pad. Make-up steam supplied from a remote steam generation facility can be used to operate a steam ejector with a local steam heater, or be used as the superheated driving steam. The system is ZLD in nature. It can also produce liquid waste if liquid disposal is preferred.

There are patents and disclosures issued in the field of the present invention. U.S. Pat. No. 6,536,523, issued to Kresnyak et al. on Mar. 25, 2003, describes the use of blow-down heat as the heat source for water distillation of de-oiled produced water in a single stage MVC water distillation unit. The concentrated blow-down from the distillation unit can be treated in a crystallizer to generate solid waste.

U.S. patent application Ser. No. 12/702,004, filed by Minnich et al. and published on Aug. 12, 2010, describes a heat exchanger that operates on steam for generating steam in an indirect way from low quality produced water that contains impurities. In this disclosure, steam is used indirectly to heat the produced water that includes contaminates. By using steam as the heat transfer medium, the direct exposure of the low quality water heat exchanger to fire and radiation is prevented, thus there will be no damage due to the redaction of the heat transfer. The concentrated brine is collected and delivered for disposal or to a multi stage evaporator to recover most of the water and there generates a ZLD system. The heat transfer surfaces between the steam and the produced water will have to be clean or the produced water will have to be treated. The concentrated brine, possibly with organics, will be treated in a low pressure, low temperature evaporator to increase the concentration; the higher the concentration is, the lower the temperature. In my application, due to the direct approach of the heat transfer, the system in ZLD with the highest concentration, possibly up to 100% liquid recovery, while generating solid waste, is at the first stage at a higher temperature due to the direct mixture with the superheated dry steam that converts the liquid into gas and solids.

U.S. Pat. No. 7,591,309, issued to Minnich et al. on Sep. 22, 2009, describes the use of steam for operating a pressurized evaporation facility where the pressurized vapor steam is injected into underground formations for EOR. The steam heats the brine water which is boiled to generate additional steam. To prevent the generation of solids in the pressurized evaporator, the internal surfaces are kept wet by liquid water and the water is pre-treated to prevent solid build up. The concentrated brine is discharged for disposal or for further treatment in a separate facility to achieve a ZLD system. To achieve ZLD, the brine evaporates in a series of low pressure evaporators (Multi Effect Evaporator).

U.S. Pat. No. 6,733,636, issued to Heins on May 11, 2004, describes a produced water treatment process with a vertical MVC evaporator.

U.S. Pat. No. 7,578,354, issued to Minnich et al. on Aug. 25, 2009, describes the use of Multi Effect Distillation (MED) for generating steam for injection into an underground formation.

U.S. Pat. No. 7,591,311, issued to Minnich et al. on Sep. 22, 2009, describes a process of evaporating water to produce distilled water and brine discharge, feeding the distilled water to a boiler, and injecting the boiler blow-down water from the boiler into the produced steam. The solids and possibly volatile organic remains are carried with the steam to the underground oil formation. The concentrated brine is discharged in liquid form.

U.S. Pat. No. 4,398,603, issued to Rodwell on Aug. 16, 1983, describes producing steam from a low quality feed water. Superheated steam is introduced into liquid water in a vessel. The mixture is done in a liquid environment where minerals (solids) are participates and are removed in a liquid phase from the vessel by withdrawing a waste water stream. Due to the excess heat within the superheated steam, a portion of the liquid feed water evaporates and produces saturated steam. Because all mixing with the steam is done in a liquid environment, the process can only produce saturate (wet) steam with waste liquid discharge for removing the solids.

This invention's method and system for producing steam for extraction of heavy bitumen includes the steps as described in the patent figures.

The advantage and objective of the present invention are described in the patent application and in the attached figures.

These and other objectives and advantages of the present invention will become apparent from a reading of the attached specifications and appended claims.

SUMMARY OF THE INVENTION

Steam injection is currently the only method commercially used on a large scale for recovering oil from deep (non-minable) oil sands formations. Sometimes additional solvents are used, mainly hydrocarbons. There are a few disadvantages to the existing steam generation methods. For example, the steam is much cleaner than is needed for injection. To achieve the water quality currently used for steam injection, the water is extensively treated—the first stage is to separate the oil and de-oiling. To achieve that, the produced water is cooled to a temperature at which it can efficiently be de-oiled to the water treatment plant feed specifications where it is treated to the boiler feed water specifications. The need to cool the water decreases the SAGD's overall efficiency. In recent year there has been a shift toward the use of evaporator water treatment technologies instead of softening based technologies. As a result, due to the higher quality of the produced water, it is possible to increase the produced steam temperature and pressure. There are other advantages to the use of evaporators to treat the produced water, such as the ability to use brackish water with high levels of salts and incorporate a crystallizer to achieve ZLD. The proposed method intends to use the systems and methods developed for combustion of low quality fuel in gas driven Direct Contact Steam Generation (DCSG) and to replace the combustion gas driving fluid with steam, where additional steam is generated by a direct mixture of liquid with superheated steam gas, resulting in a relatively low cost steam achieved by a Steam Drive DCSG.

The method and system of the present invention for steam production (for extraction of heavy bitumen by injecting the steam into an underground formation or by using it as part of an above ground oil extraction facility) includes the following steps: (1) Generating a super heated steam stream. The steam is generated by a commercially available non-direct steam generation facility, possibly as part of a power plant facility; (2) Using the generated steam as the hot gas to operate a DCSG (Direct Contact Steam Generator); (3) Mixing the super heated steam gas with liquid water containing significant levels of solids, oil contamination and other contaminates; (4) Directly converting liquid phase water into gas phase steam; (5) Removing the solid contaminates that were supplied with the water for disposal or further treatment; (6) Using the generated steam for EOR, possibly by injecting the produced steam into an underground oil formation through SAGD or CSS steam injection wells.

The presented method and its associated system can be applied to many existing oilsands operations. Due to the minimal water treatment requirements and the fact that the feed water can be at higher temperatures, it is possible to produce additional steam close to the production and the injection wells, on the well pad. The high temperature of the feed water is an advantage as this heat energy helps in the production of steam and minimizes the amount of superheated driving steam consumed. It is possible to operate the SD-DCSG in a ZLD mode where the solids contaminates are extracted in a dry, semi-dry stable form. A ZLD facility is more environmentally friendly compared to a system that generates reject water and sludge. However, it is also possible to operate the SD-DCSG in liquid waste discharge mode (liquid discharge mode can be used if disposal caverns or disposal wells are available and are approved for disposal usage by the regulators, like the Energy Resources Conservation Board (ERCB) in Alberta, Canada). The invention method can also be operated in a liquid waste discharge mode. This can be done by adjusting the ratio between the produced water and the driving superheated steam and increasing the water feed flow or decreasing the superheated driving steam flow. The water feed of this method and system for enhanced oil recovery can be water separated from produced oil and/or low quality water salvaged from industrial plants, such as refineries, and tailings as make-up water. Both of the above will allow oilsands operations to more easily meet environmental regulations without radical changes to oil recovery and water recycling technologies currently in use.

The excessive energy in superheated steam can be used for generating additional lower temperature steam for injection into the formation. The use of evaporation water treatment facilities in the oilsands industry allows for the production of superheated steam. The proposed method uses Direct Contact Steam Generation where the superheated steam gas is in direct contact with the liquid produced water. Hydrocarbons, like solvents, within the produced water will be directly converted to gas and recycled back to the formation, possibly with additional solvents that can be added to the steam flow. The presented technology generates a "tailor made" pressure and temperature steam, as required for injection into the underground oil bearing formation while maximizing the amount of the generated steam. The simulation shows that for a 263 psi system with a constant feed 25° C. water flow at 1000 kg/hour, there is a need for 12.9 tons/hour of 300° C. steam to gasify 1 ton/hour of liquid water. When higher temperature (500° C.) driving steam is used, there is a need for only 4.1 tons/hour of steam. The results show that the amount of produced steam increases by 314% with a driving steam temperature increase. The pressure impact simulation was based on driving steam at a constant temperature of 450° C. and 1 ton/hour 25° C. water feed. The simulation shows that at pressure of 263 psi, 4.9 tons/hour of driving steam is used to gasify the water feed. At a higher pressure of 1450 psi, 5.1 tons/hour driving steam will be used. The results show that a pressure increase slightly reduces the amount of produced steam. The impact of the feed water temperature on the system performance was also simulated. It was shown that for a system of a constant 12 kw heat source at 600 psi, 15.1 kgs/hour of feed water was gasified to generate injection steam. Where the produced water temperature was 220° C. temperature, 22.4 kg/hour was gasified. This shows that the produced water temperature has a large impact on the overall performance and that by using the high temperature produced water, the system performance can be increased by close to 150%. The simulation shows that hydrocarbons, like solvents with the produced water, will be converted to gas and injected with the steam. The system can also include a heater to recycle a portion of the produced steam as the driving steam that will be produced locally. There was shown to be an advantage to using hot produced water and to minimizing the produced steam pressure drop. This can be achieved by locating the system close to the injection and production well pad. Make-up steam supplied from a remote steam generation facility can be used to operate a steam ejector with a local steam heater, or be used as the superheated driving steam. The system can be ZLD. It can also produce liquid waste if liquid disposal is preferred.

In another embodiment, the invention can include the following steps: (1) Generating a super heated steam stream. The steam is generated by heating a steam stream in a non-direct heat exchanger; (2) Using the generated steam as the hot gas to operate a DCSG (Direct Contact Steam Generator); (3) Mixing the super heated steam gas with liquid water containing significant levels of solids, oil contamination and other contaminates; (4) Directly converting liquid phase water into the gas phase steam; (5) Removing the solid contaminates that were supplied with the water for disposal or further treatment; (6) Recycling a portion of the generated steam back to the heating process of (1) to be used as the hot gas operating the DCSG. The recycled steam can be cleaned to remove contaminates that can affect the heating process (like silica). The cleaning process can include any type of filter, precipitators or wet scrubbers. Chemicals (like caustic, magnesium salts or any other commercially available chemicals) can be added to the wet scrubber to remove contaminates from the steam flow.

In another embodiment, part of the generating steam is condensed and used to wash the produced steam of solid particles in a wet scrubber. Chemicals can be added to the liquid water to remove contaminates. A portion of the liquid water is recycled back and mixed with the superheated steam to transfer it into gas and solids. A portion of the scrubbed saturated steam flow can be recycled and heated to generate a super heated "dry" steam flow to drive the SD-DCSG and change the liquid flow into steam.

In another embodiment, the scrubbed saturated steam, after the solids are removed, can be condensed to generate contaminate free liquid water, at a saturated temperature and pressure. The liquid water can be pumped and fed into a commercially available non-direct steam boiler for generating super heated steam to drive the SD-DCSG for transferring the liquid contaminated water into gas and solids.

In another embodiment, the SD-DCSG is integrated with a DCSG that uses combustion gases as the heat source. In that embodiment, the discharge from the SD-DCSG can be in a liquid form and it can be used as the water source for the combustion gas driven DCSG.

The present invention can be used to treat contaminated water using the SD-DCSG in different industries, such as the power industry or chemical industry where there is a need to recover the water from a contaminated water stream to generate steam with zero liquid discharge.

The system and method's different aspects of the present invention are clear from the following figures.

DETAILED DESCRIPTION OF THE DRAWINGS

FIGS. 1, 1A, 1B, 1C, 1D, and 1E show the conceptual flowchart of the method and the system.

Figure 1:
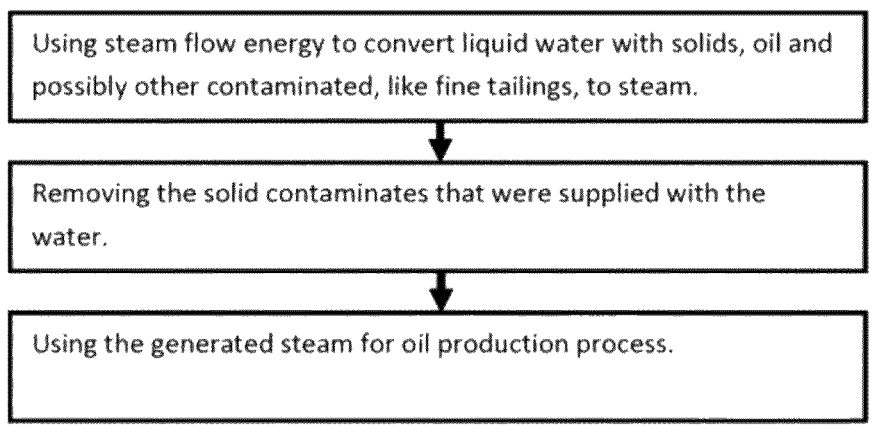
FIGS. 1, 1A, 1B, 1C, 1D, and 1E show the conceptual flowchart of the method and the system.
Figure 1A:
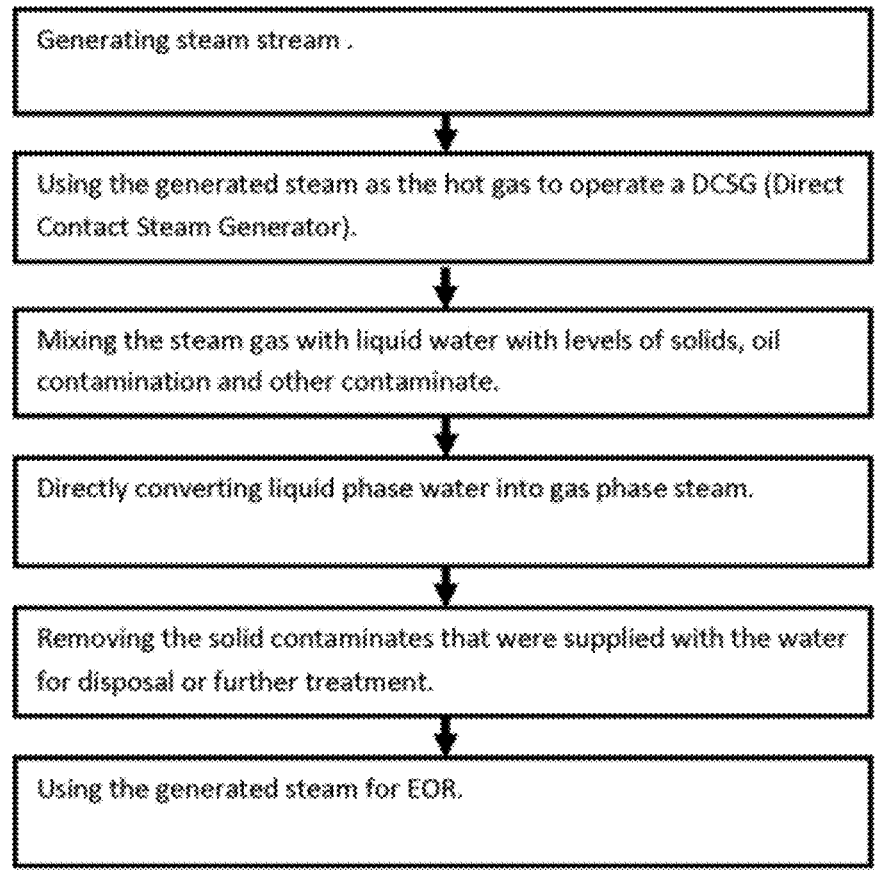
Figure 1B:
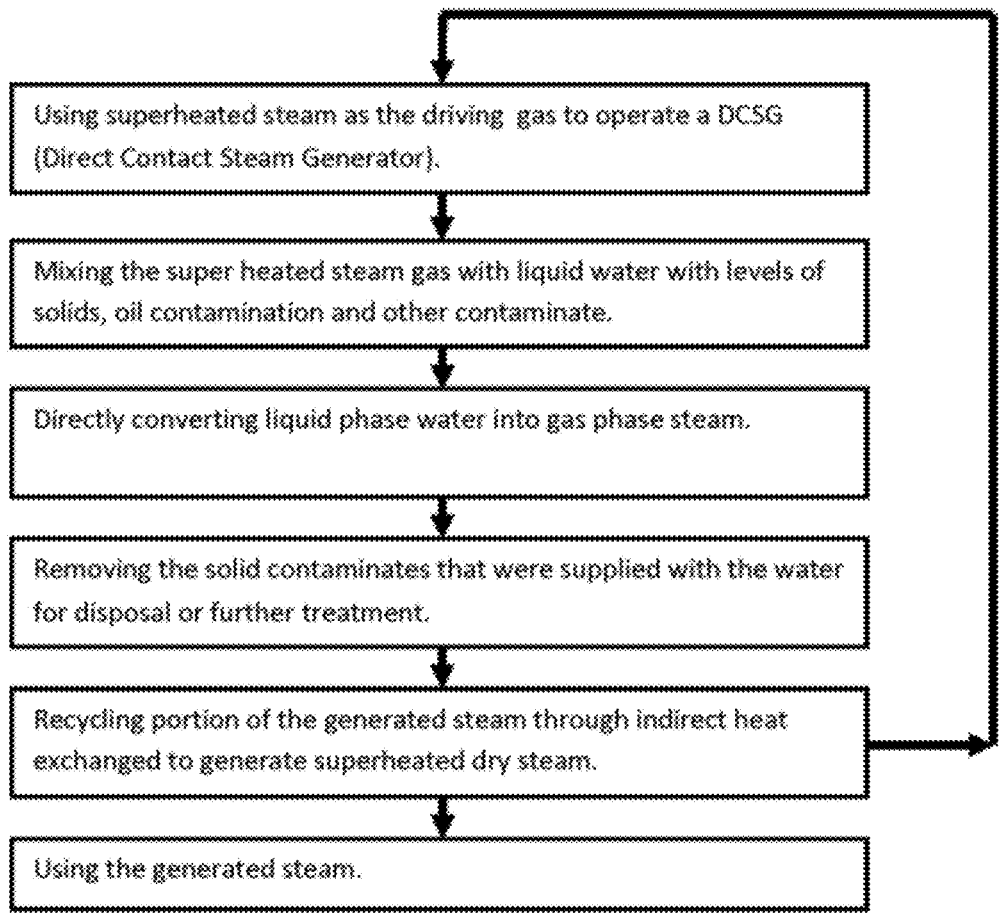
Figure 1C:
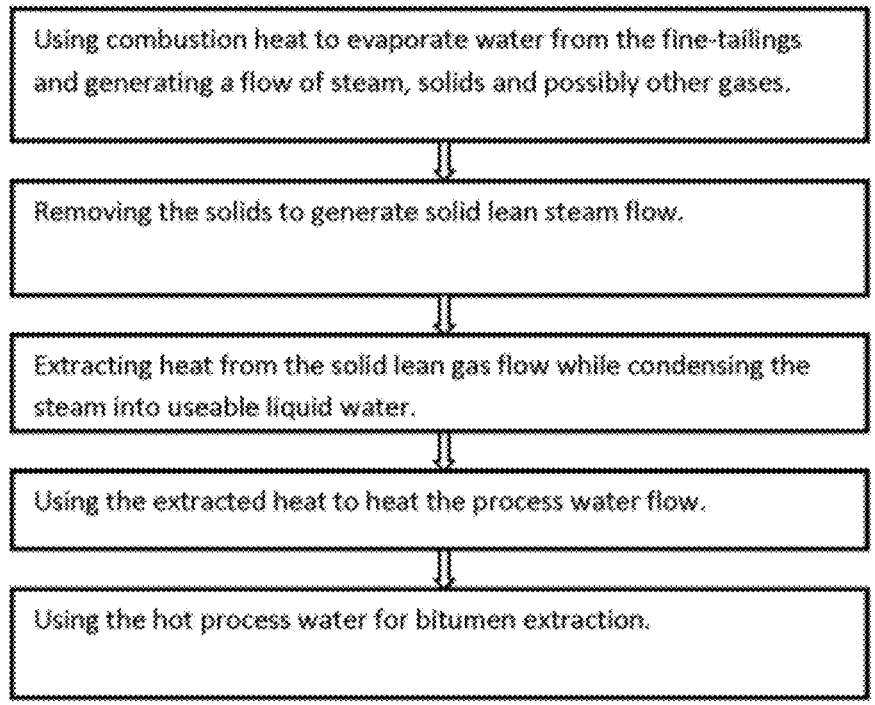
Figure 1D:
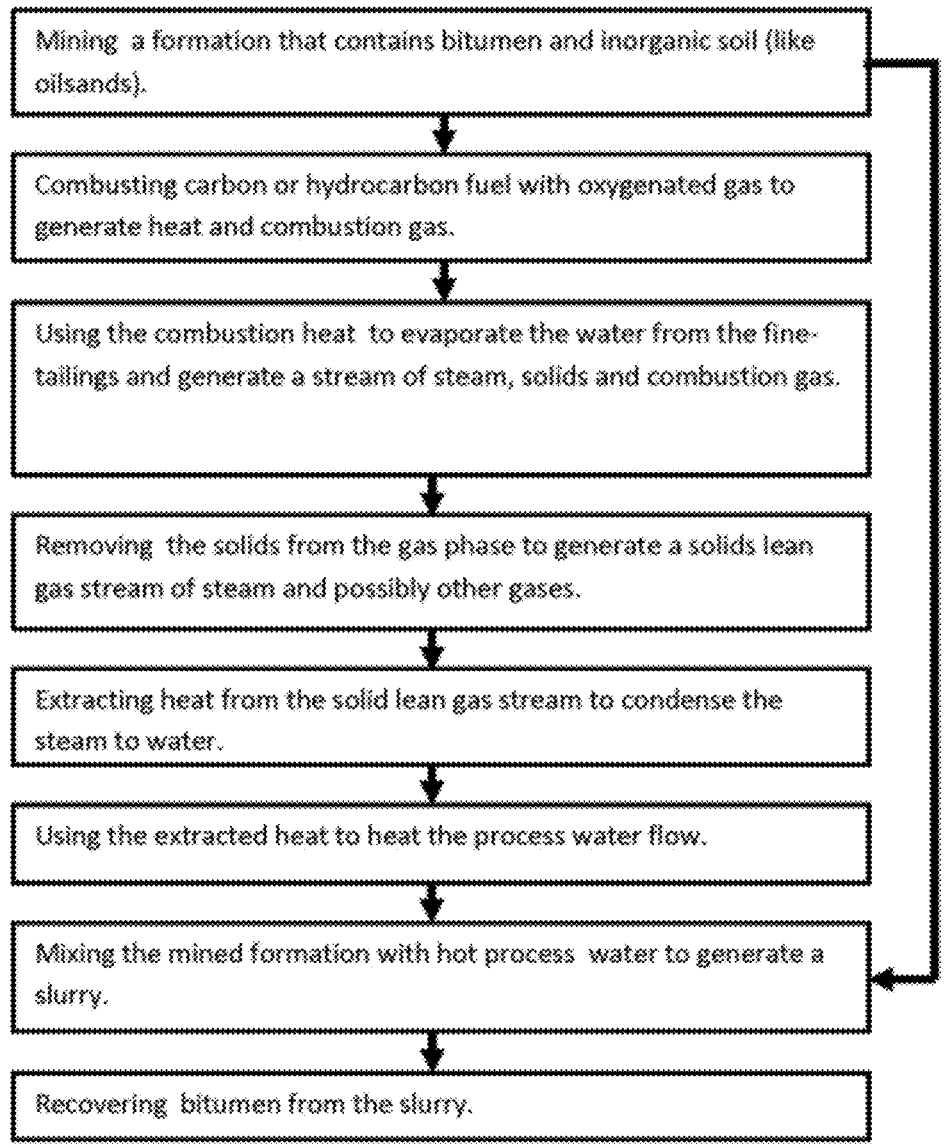
Figure 1E:
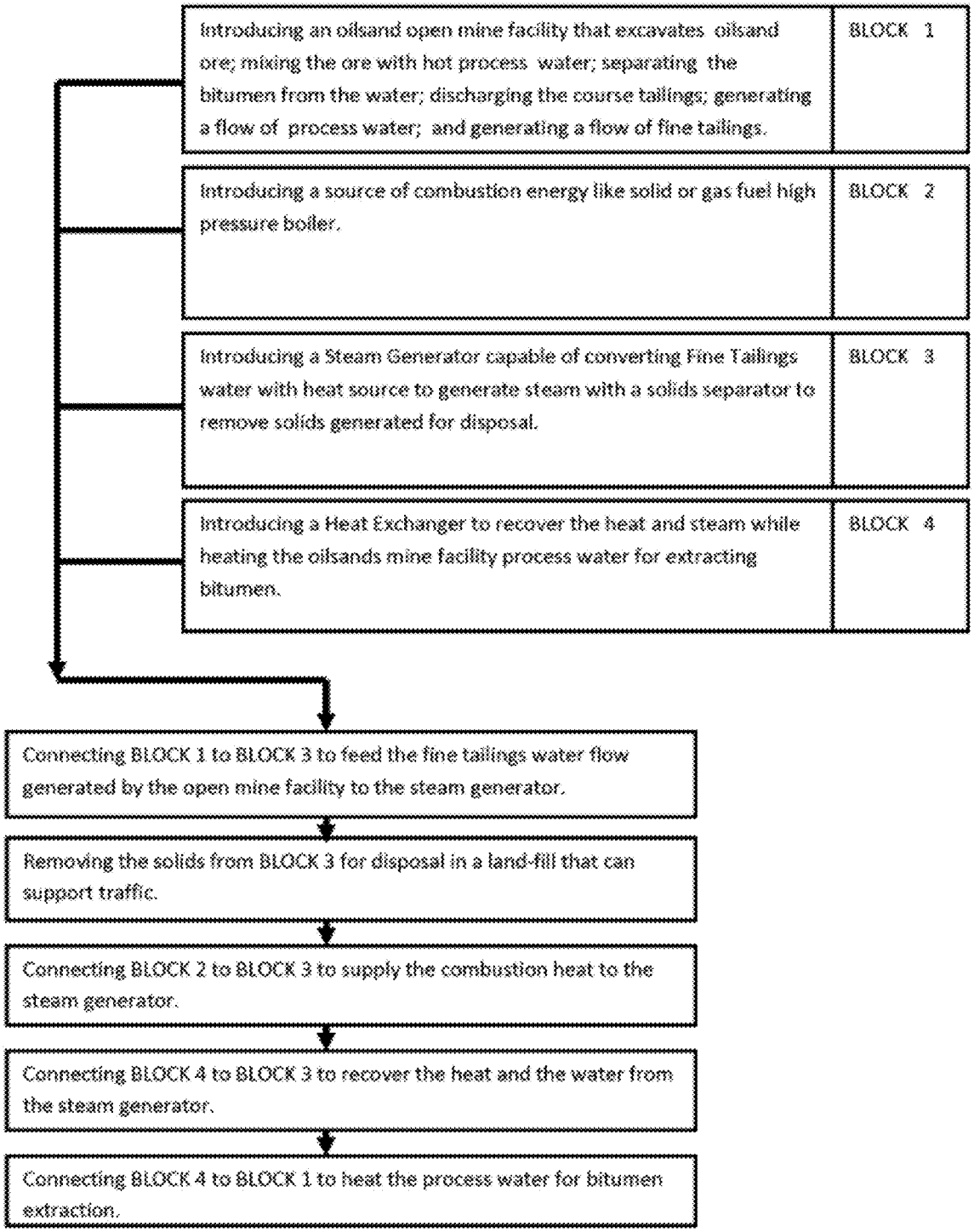
Figure 2:
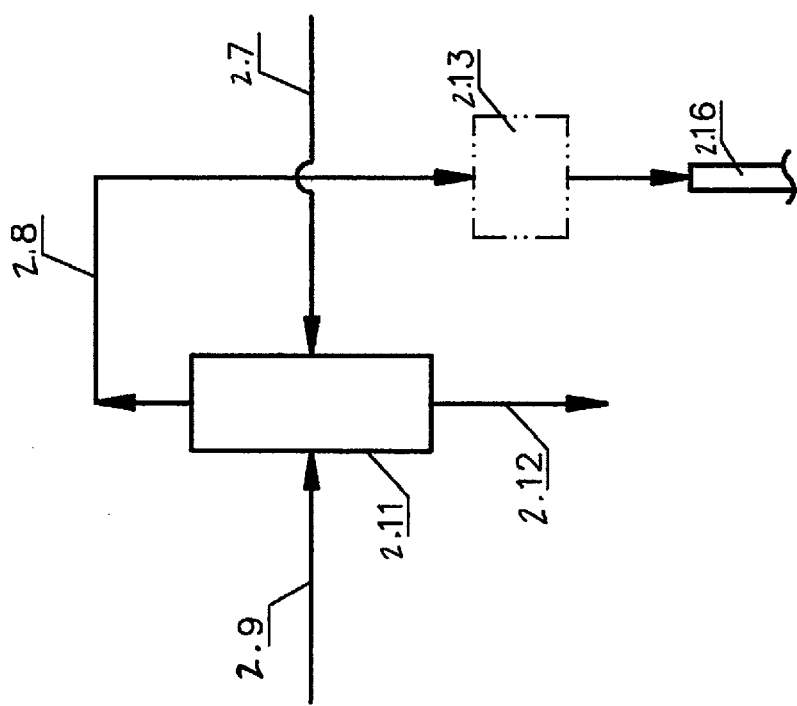
FIG. 2 shows a block diagram of an embodiment of the invention.

FIG. 2 shows a block diagram of an embodiment of the invention. Flow 2.9 is superheated steam. The steam pressure can be from 1 to 150 bar and the temperature can be between 150° C. and 600° C. The steam flows to enclosure 2.11, which is a SD-DCSG. Contaminated produced water 2.7, possibly with organic contaminates, and suspended and dissolved solids, is also injected into enclosure 2.11 as the water source for generating steam. The water 2.7 evaporates and is transferred into steam. The remaining solids 2.12 are removed from the system. The generated steam 2.8 is at the same pressure as that of the drive steam 2.9 but at a lower temperature because a portion of its energy was used to drive the liquid water 2.7 through a phase change. The generated steam is also at a temperature that is close to the saturated temperature of the steam at the pressure inside enclosure 2.11. The produced steam can be further treated 2.13 to remove carry-on solids, reducing its pressure and possibly removing additional chemical contaminates. Then the produced steam is injected into an injection well 2.16 for EOR.

Figure 2A:
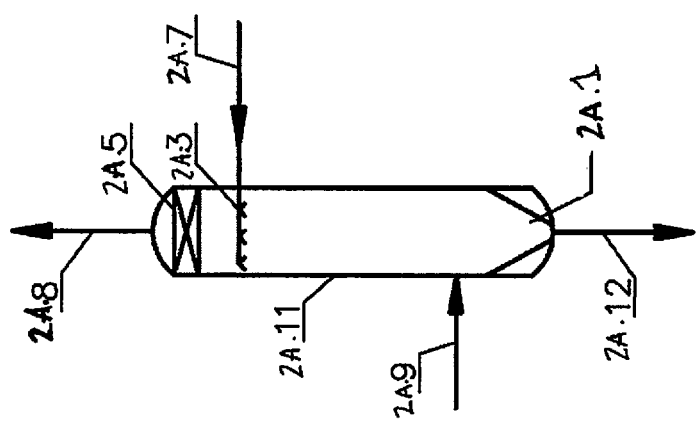
FIG. 2A shows a schematic of a vertical SD-DCSG.

FIG. 2A shows a schematic of a vertical SD-DCSG. Dry steam 2A.9 is injected into vessel 2A.11 at its lower section. At the upper section, water 2A.7 is injected 2A.3 directly into the up-flow stream of dry steam. The water evaporates and is converted to steam at a lower temperature but at the same pressure. Contaminates that were carried on with the water are turned into solids and possibly gas (if the water includes hydrocarbons like naphtha). The produced gas 2A.8, mainly steam, is discharged from the SD-DCSG at the top. To prevent carried-on water droplets, demister packing 2A.5 can be used at the top of SD-DCSG enclosure vessel 2A.11. The solids 2A.12 are removed from the system from the bottom 2A.1 of the vertical enclosure where they can be disposed of or treated.

Figure 2B:
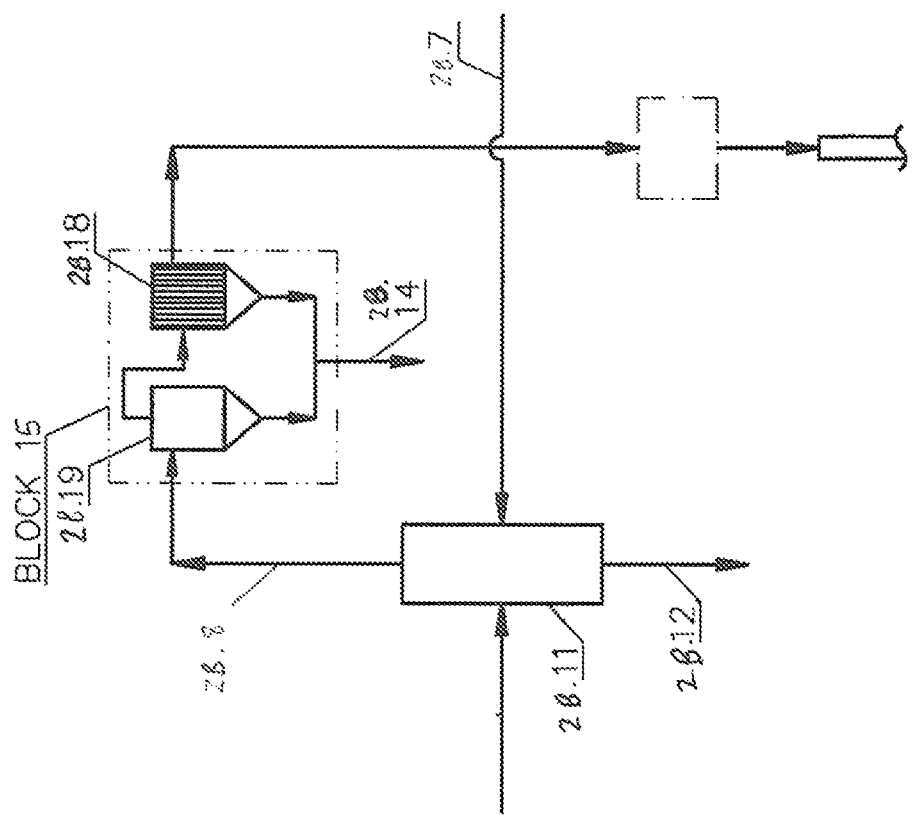
FIG. 2B shows a block diagram of the embodiment of the invention.

FIG. 2B shows a block diagram of the invention. This figure is similar to FIG. 2 but contains an additional solids removal system as described in Block 15. Block 15 can include any commercially available Solid-Gas separation unit. In this particular figure, cyclone separator 2B.19 and electrostatic separation 2B.18 are represented. High temperature filters, that can withstand the steam's temperature, possibly with a back-pressure cleanup system, can be used as well. The steam flow leaving the SD-DCSG can include solids from the contaminate water 2B.7. A portion of the solids 2B.12 can be recovered in a dry or wet form from the bottom of the steam generation enclosure 2B.11. The carry-on solids 2B.14 can be recovered from the gas flow 2B.8 in a dry form for disposal or for further treatment.

Figure 2C:
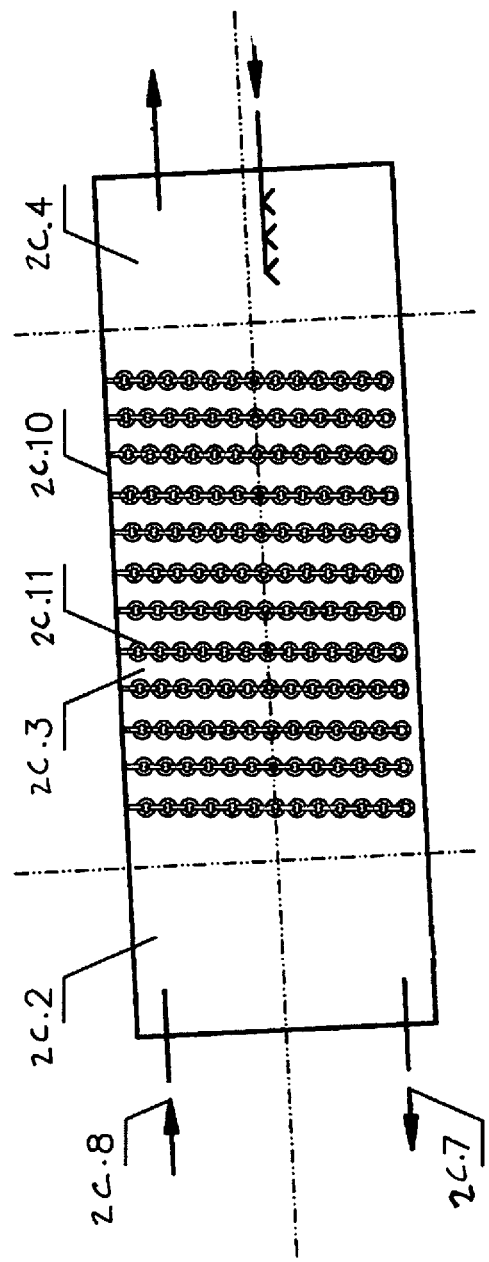
FIG. 2C is schematic view of another embodiment of a reaction chamber apparatus of a high-pressure steam drive direct contact steam generator of the present invention.

FIG. 2C is another embodiment of a reaction chamber apparatus of a high-pressure steam drive direct contact steam generator of the present invention. A similar structure can be used with DCSG that uses combustion gas as the heat source to convert the liquid water into steam. A counter-flow horizontally-sloped pressure drum 2C.10 is partially filled with chains 2C.11 that are free to move inside the drum and are internally connected to the drum wall. A parallel flow design can be used as well. The chains increase the heat transfer and remove solids build-up. Any other design that includes internal embodiments that are free to move or that are moving with the rotating enclosure and continually lifting solids and liquids to enhance their mixture with the flowing gas can be used as well. The drum 2C.10 is a pressure vessel which is continually rotating, or rotating at intervals. At a low point of the sloped vessel or drum 2C.10, hot dry steam 2C.8 is generated by a separate unit, like the pressurized boiler (not shown), and is injected into the enclosure. The boiler is a commercially available boiler that can burn any available fuel like natural gas, coal, coke, or hydrocarbons such as untreated heavy low quality crude oil, VR (vacuum residuals), asphaltin, coke, or any other available carbon or hydrocarbon fuel. The pressure inside the rotating drum can vary between 1 bar and 100 bar, according to the oil underground formation. The vessel is partially filled with chains 2C.11 that are internally connected to the vessel wall and are free to move. The chains 2C.11 provide an exposed regenerated surface area that works as a heat exchanger and continually cleans the insides of the rotating vessel. The injected steam temperature can be any temperature that the boiler can supply, typically in the range of 200° C. and 800° C. Low quality water, like mature tailing pond water, rich with solids and other contaminants (like oil based organics), or contaminated water from the produced water treatment process, are injected into the opposite, higher side of the vessel at section 2C.4 where they are mixed with the driving dry steam and converted into steam at a lower temperature. This heat exchange and phase exchange continues at section 2C.3 where the heavy liquids and solids move downwards, directly opposite to the driving steam flow. The driving steam injected at section 2C.2, which is located at the lower side of the sloped vessel, moves upwards while converting liquid water to gas. The heat exchange between the dry driving steam and the liquids is increased by the use of chains that maintain close contact, both with the hot steam and with the liquids at the bottom of the rotating vessel. The amount of injected water is controlled to produce steam in which the dissolved solids become dry or become high solids concentration slurry and most of the liquids become gases. Additional chemical materials can be added to the reaction, preferably with any injected water. The rotational movement regenerates the internal surface area by mobilizing the solids to the discharged point. The rotating movement can agglomerate the solids into small spheres to increase the solids stability and minimize dust generation. The heat transfer in section 2C.3 is sufficient to provide a homogenous mixture of gas steam and ground-up solids, or high viscosity slurry. Most of the remaining liquid transitions to gas and the remaining solids are moved to a discharge point 2C.7 at the lower internal section of the rotating vessel near the rotating pressurized drum 2C.10 wall. The solids or slurry are released from the vessel or drum 2C.10 at a high temperature and pressure. They undergo further processing, such as separation and disposal.

Figure 2D:
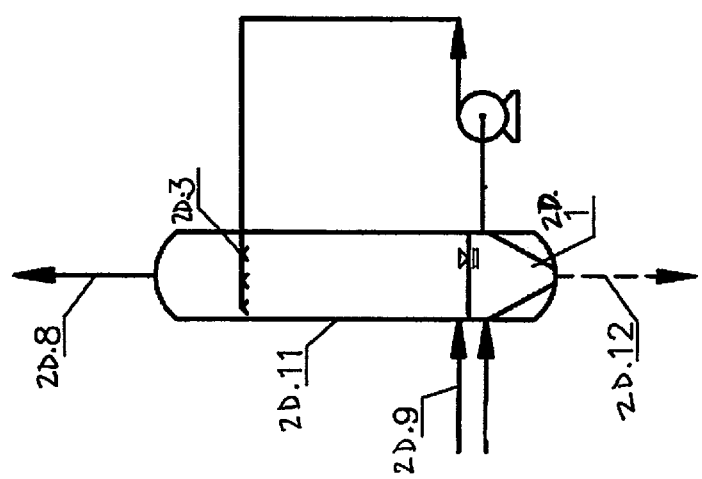
FIG. 2D shows a schematic view of another embodiment of a vertical SD-DCSG.

FIG. 2D shows a schematic of a vertical SD-DCSG. It is similar to FIG. 2A with the following changes: Vessel 2D.11 includes a liquid water 2D.1 bath at its bottom. The water is maintained at a saturated temperature. Saturated water is recycled and dispersed into the up-flow flow 2D.3 with dry steam 2D.9. The dispersed water evaporates into the up-flowing steam. Contaminates that were carried on with the water are turned into solids and possibly gas (if the water includes hydrocarbons). The produced gas, mainly steam, is discharged from the SD-DCSG at the top. A portion of the liquid water 2D.1 is dispersed at the up-flow stream of dry steam. The water evaporates and is converted to a lower temperature steam. Solids are carried with the up-flow gas 2D.8. Over-sized solids 2D.12 can be removed from the system from the bottom of the vertical enclosure in a slurry form for further treatment.

Figure 2E:
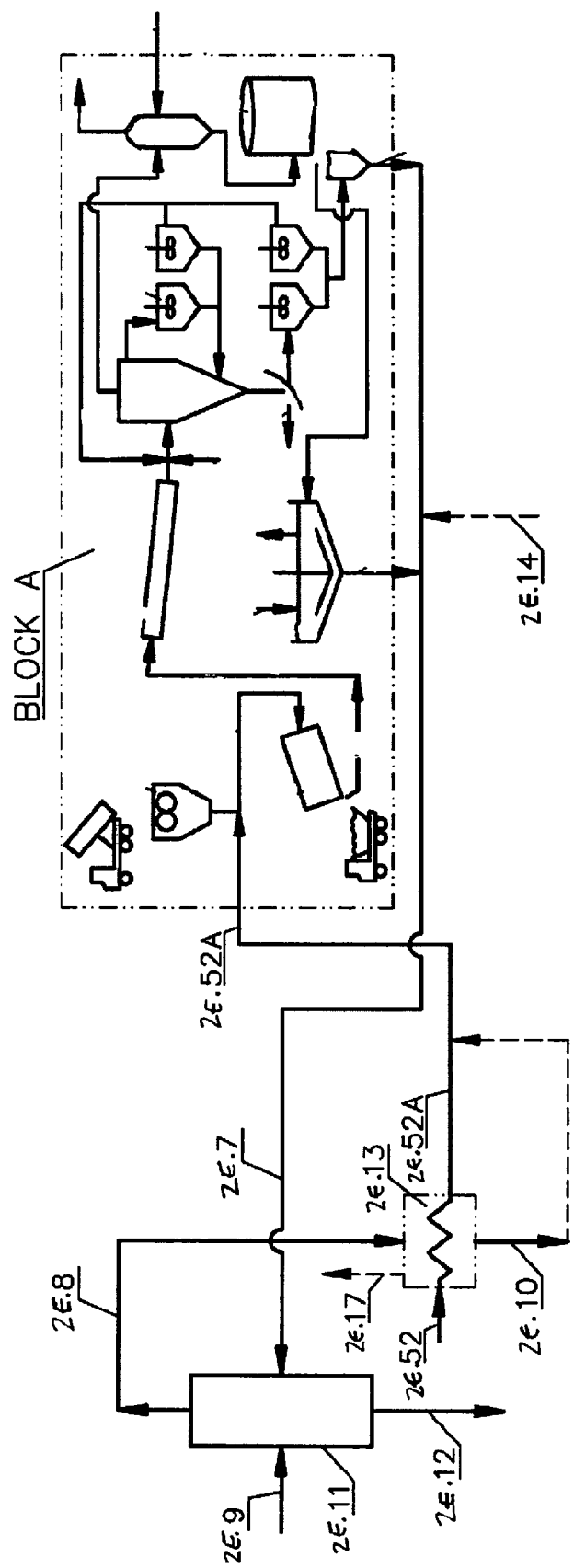
FIG. 2E shows a schematic view of a SD-DCSG integrated into an open mine oilsands extraction plant.

FIG. 2E shows a schematic of a SD-DCSG integrated into an open mine oilsands extraction plant for generating the hot extraction water while consuming the Fine Tailings generated by the extraction process. Flow of drive steam 2E.9 is superheated steam. The steam flows to enclosure 2E.11 which is a SD-DCSG. Fine Tailings (FT) contaminated produced water 2E.7, is also injected into enclosure 2E.11 as the water source for generating steam. The water 2E.7 evaporates and is transferred into steam. The remaining solids 2E.12 are removed from the system. The generated steam 2E.8 is at the same pressure as that of the drive steam 2E.9 but at a lower temperature because a portion of its energy was used to drive the liquid water 2E.7 through a phase change. The generated steam is also at a temperature that is close to (or slightly higher than) the saturated temperature of the steam at the pressure inside the enclosure 2E.11. The produce steam is fed into a heat exchanger/condenser 2E.13. In FIG. 2E, a non-direct heat exchanger is described. A direct heat exchanger can be used as well. The produced steam condensation energy is used to heat the flow of cold extraction process water 2E.52 to generate a hot process water 2E.52A flow at a temperature of 70-90° C. The produced hot process water can be used in Block A for tarsands extraction. The hot condensate 2E.10 that is generated from steam 2E.8 can be added to the process water 2E.52A or used for other processes as a water source for a High Pressure steam boiler, as an example. In case that Non-Condensed Gases (NCG) 2E.17 were generated, they are recovered for further use. (For FT that contains low levels of organics, low amounts of NCG will be generated. With the use of direct contact heat exchange between the process water 2E.52 and the produced steam 2E.8 at the condenser 2E.13, the low levels of NCG will be dissolved and washed by the large amount of process water 2E.14). Block A is a typical open mine extraction oilsands plant as described, for example, in Block 5 in FIG. 8. Flow of water 2E.7 is fine tailings generated during the extraction process. Flow of process water 2E.14 is additional fine tailings from other sources, like MFT from a tailing pond (not shown). The drive steam 2E.9 can be generated by compressing and heating a portion of the generated steam.

Figure 2F:
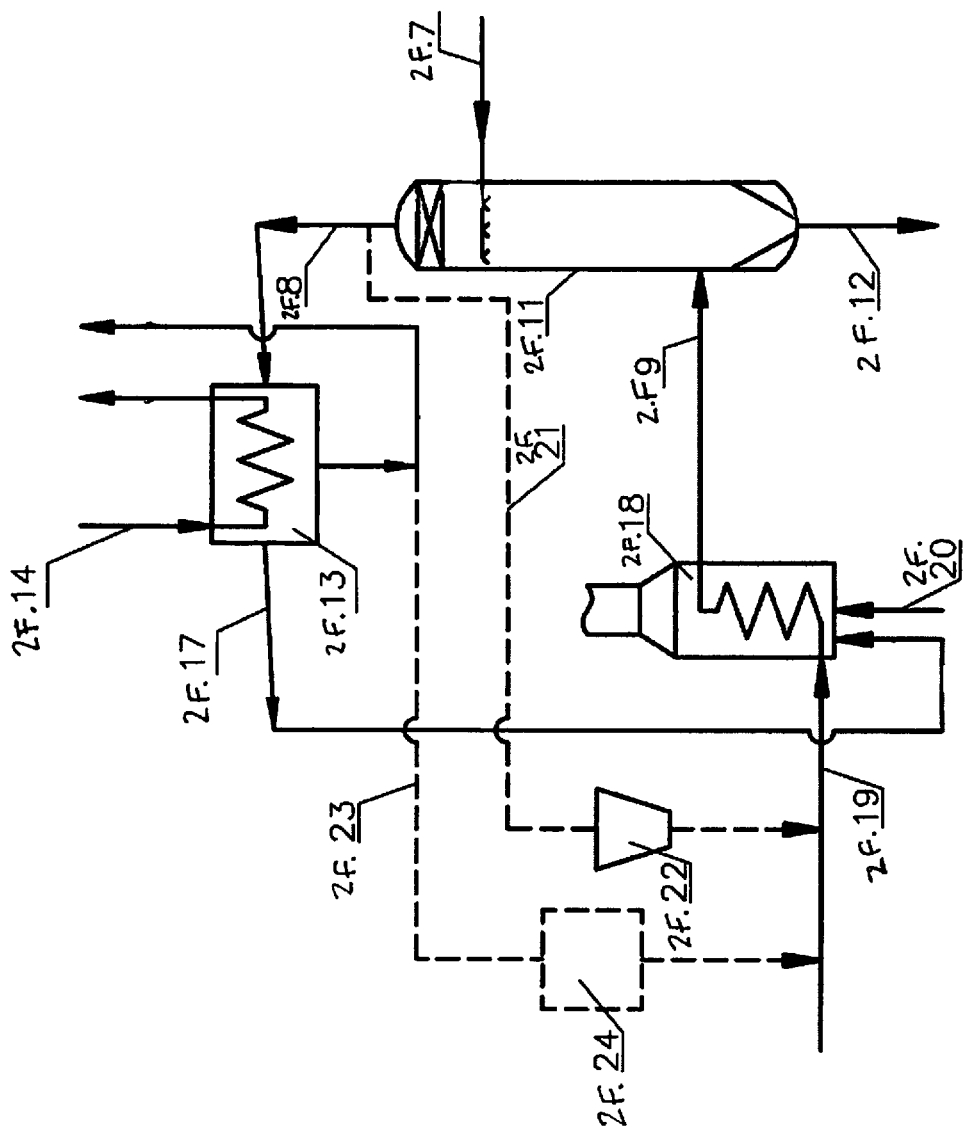
FIG. 2F shows a schematic view of a SD-DCSG with a non-direct heat exchanger to heat the process water.

FIG. 2F shows a SD-DCSG with a non-direct heat exchanger to heat the process water and with the combustion of the NCG hydrocarbons as part of generating the driving steam. FT or MFT 2F.7 are injected into a SD-DCDG. In FIG. 2F, a vertical fluid bed SD-DCSG is schematically represented. Any other SD-DCSG can be used as well, like the horizontal SD-DCDG presented in FIGS. 3A, 3B, 3C or any other design. The FT 2F.7 are mixed with the dry super-heated steam flow 2F.9 that is used as the energy source to transfer the liquid water phase in flow of FT 2F.7 to gas (steam) phase by direct contact heat exchange. The FT 2F.7 solids are removed in a stable form 2F.12 where they can be economically disposed of and can support traffic. The produced steam 2F.8 is condensed in a non-direct heat exchanger/condenser 2F.13. The water condensation heat is used to heat the extraction process water 2F.14. With some tailings types, NCG (Non Condensed Gases) 2F.17 are generated due to the presence of hydrocarbons, like solvents used in the froth treatment or oil remains that were not separated and remained with the tailings. The NCG 2F.17 is burned, together with other fuel 2F.20 like natural gas, syngas or any other fuel. The combustion heat is used, through non-direct heat exchange, to produce the superheated driving steam flow 2F.9 used to drive the process. The amount of energy in the NCG hydrocarbons 2F.17 recovered from typical oilsands tailings, even that from a solvent froth treatment process, is not sufficient to generate the steam flow 2F.9 to drive the SD-DCSG. It can provide only a small portion of the process heat energy used to generate the driving steam flow 2F.9. One option is to use a standard boiler 2F.18 designed to generate steam from liquid water feed 2F.19 from a separate source. Another option is to use a portion of the produced steam condensate 2F.23 as the liquid water feed to generate the driving steam flow 2F.9. The condensate will be treated to bring it to BFW quality. Treatment units 2F.24 are commercially available. Another option to generate the driving steam flow 2F.9 is to recycle a portion of the produced steam 2F.8. The recycled produced steam 2F.21 is compressed 2F.22. The compression is needed to overcome the pressure drop due to the recycle flow and to generate the flow through the heater or boiler 2F.18 and the SD-DCSG 2F.11. The compression can be done using a steam ejector with high pressure additional steam or with the use of any available low pressure difference mechanical compressor. The recycled produced steam 2F.21—possibly after additional cleaning, like wet scrubbing, to remove contaminates like silica—is indirectly heated by combustion heater or boiler 2F.18.

Figure 3:
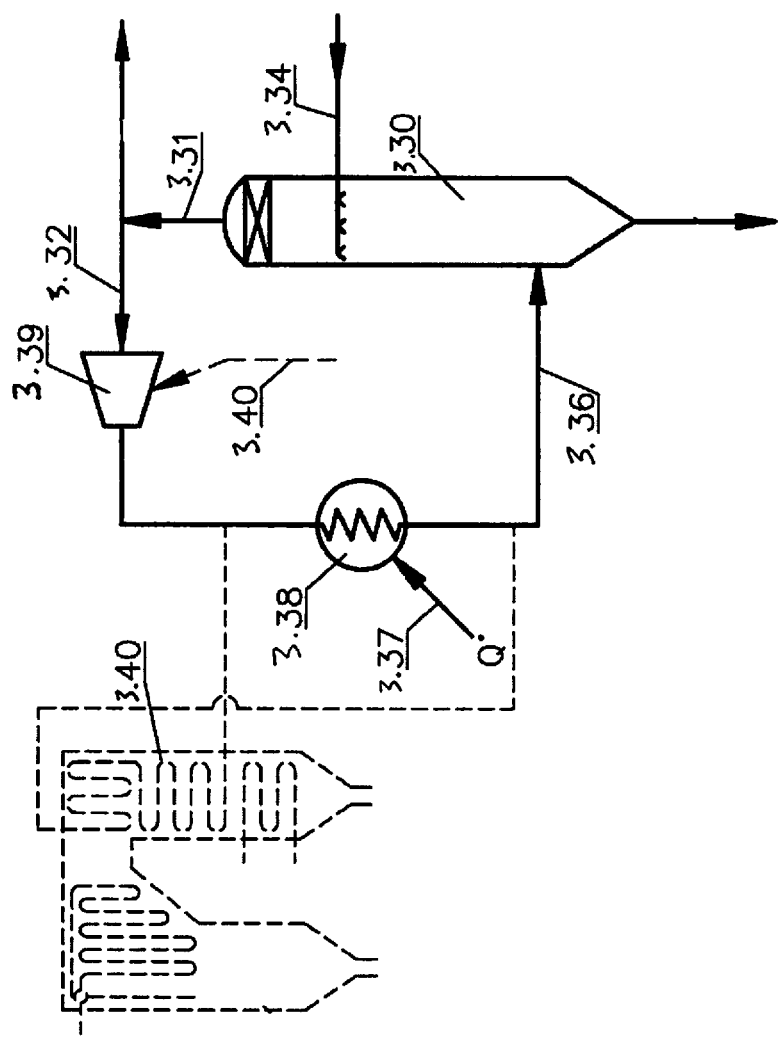
FIG. 3 is a schematic view of an illustration of one embodiment of the present invention without using an external water source for the driving steam.

FIG. 3 is an illustration of one embodiment of the present invention without using an external water source for the driving steam. SD-DCSG 3.30 includes a hot and dry steam 3.36 injection. The steam is flowing upwards where low quality water 3.34 is injected to the up-flow steam. At least a portion of the injected water is converted into steam at a lower temperature and is at the same pressure as the dry driving steam 3.36. The generated steam can be saturated ("wet") steam at a lower temperature than the driving steam. A portion of the generated steam 3.32 is recycled through compressing device 3.39. The compression is only designed to create the steam flow through heat exchanger 3.38 and create the up flow in the SD-DCSG 3.30. The compressing device 3.39 can be a mechanical rotating compressor. Another option is to use high pressure steam 3.40 and inject it through ejectors to generate the required over pressure and flow in line of steam 3.36. Any other commercially available unit to create the recycle flow of steam 3.36 can be used as well. The produced steam, after its pressure is slightly increased to generate the recycle flow of steam 3.36, and possibly after the contaminates are removed in a dry separator or wet scrubber to protect the heater, flows to heat exchanger 3.38 where additional heat is added to the recycled steam 3.32 flow to generate a heated "dry" steam 3.36. This steam is used to drive the SD-DCSG as it is injected into its lower section of the SD-DCSG 3.30 and the excess heat energy is used to evaporate the injected water and generate additional steam 3.31. The heat exchanger 3.38 is not a boiler as the feed is in gas phase (steam). There are several commercial options and designs to supply the heat 3.37 to the process. The produced steam 3.31 or just the recycled produced steam 3.32 can be cleaned of solids carried with the steam gas by an additional commercially available system (not shown). The system can include solids removal; this heat exchanger can be any commercially available design. The heat source can be fuel combustion where the heat transfer can be radiation, convection or both. Another possibility can be to use the design of the re-heat heat exchanger typically used in power station boilers to heat the medium/low pressure steam after it is released from the high pressure stages of the steam turbine. This option is schematically shown on FIG. 3. Typically, the re-heater 3.40 supplies the heat to operate the second stage (low pressure) steam turbine. Accordingly, the feed to the re-heater is saturated or close to saturated medium-low steam. As such, this minimizes the re-heater design conversion changes to heat the generated steam 3.31 for generating the superheated steam 3.36. If an existing steam power plant is used, the supercritical high-pressure steam can be used to drive a high pressure steam turbine, while the remaining heat can be used through the re-heater to provide the heat 3.37 to drive the steam generation facility. The advantages of this configuration: a high pressure steam turbine has smaller dimensions and Total Installed Cost (TIC) compared to medium/low pressure steam turbine per energy unit output.

Figure 3A:
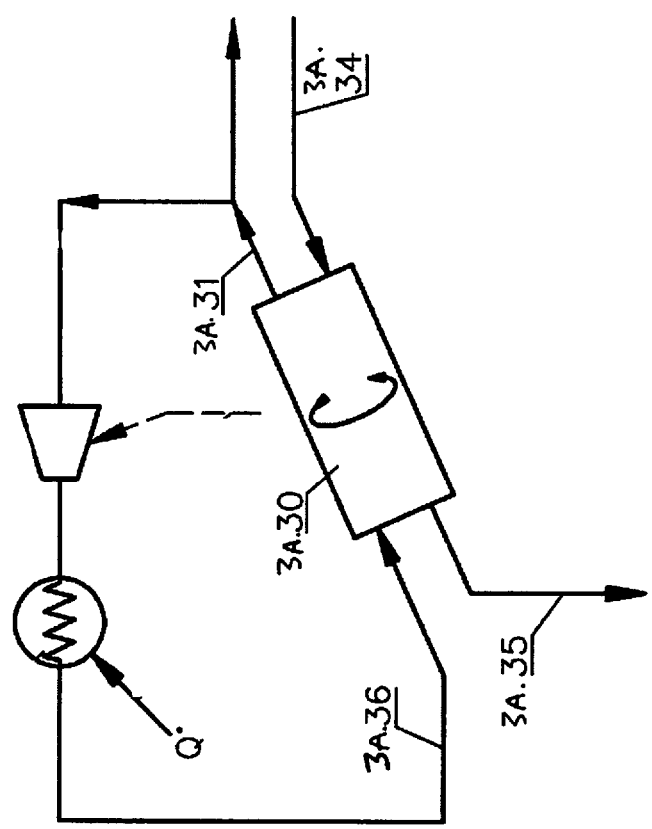
FIG. 3A is a schematic view of an illustration of another embodiment of the present invention.

FIG. 3A is an illustration of one embodiment of the present invention. It is similar to FIG. 3 with the use of a rotating SD-DCSG. The driving superheated ("dry") steam 3A.36 is injected into a rotating pressurized enclosure 3A.30. The rotating SD-DCSG enclosure consumes liquid water 3A.34, possibly with solid and organic contaminations, and generates lower temperature steam 3A.31 and solid waste 3A.35 that can be disposed of in a landfill and can support traffic. The rotating SD-DCSG 3A.30 is described in FIG. 2C.

Figure 3B:
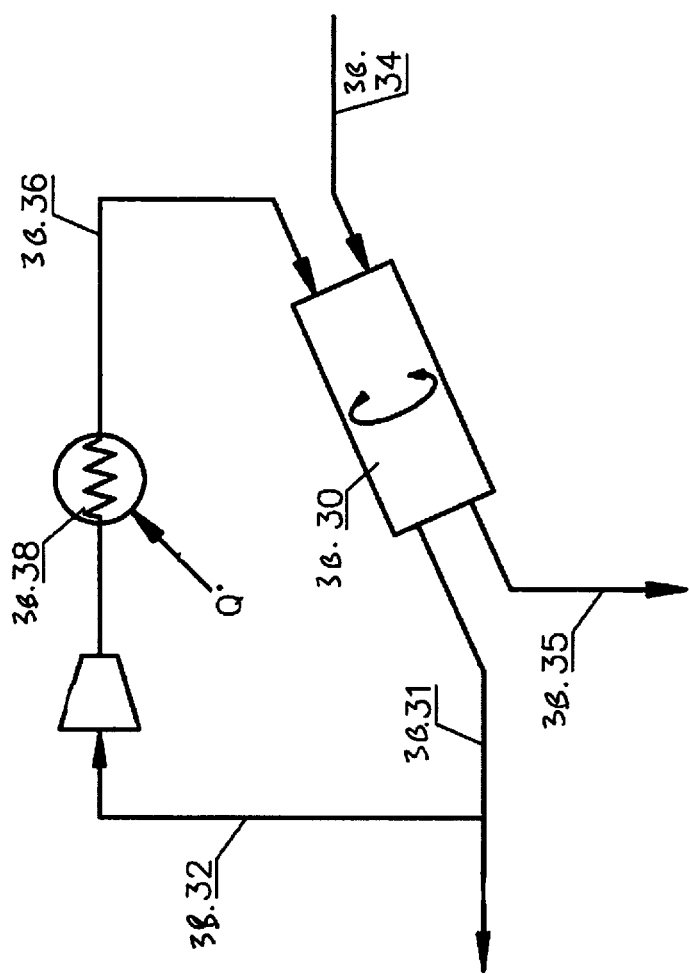
FIG. 3B is a schematic view of an illustration of a parallel flow SD-DCSG according to FIG. 3A.

FIG. 3B is an illustration of a parallel flow SD-DCSG. It is similar to FIG. 3A with the use of a parallel flow direct contact heat exchange between the liquid water and the dry steam. The driving superheated ("dry") steam 3B.36 is injected into rotating pressurized enclosure 3B.30. Liquid water 3B.34, possibly with solid and organic contaminations, is injected together with the driving steam at the same side of the enclosure. Lower temperature produced steam 3B.31 and solid waste 3B.35 can be disposed of in a landfill and can support traffic. The driving superheated steam is generated by recycling a portion of the produced steam 3B.32. The recycled produced steam is compressed to overcome the pressure loss and generate the required flow. It is indirectly heated in heater 3B.38 and recycled back as steam 3B.36 to the SD-DCDG or enclosure 3B.30.

Figure 3C:
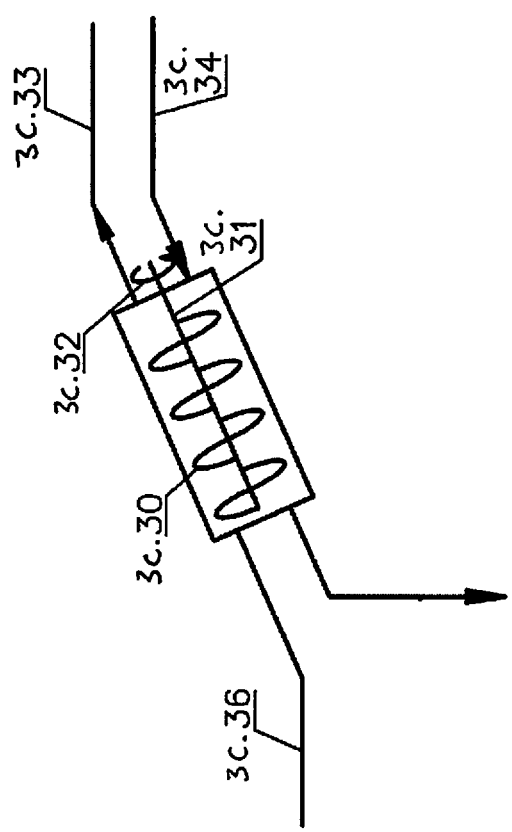
FIG. 3C is a schematic view of an illustration of a SD-DCSG with a stationary enclosure and an internal rotating element.

FIG. 3C is an illustration of a SD-DCSG with a stationary enclosure and an internal rotating element. Super heated driving steam 3C.36 is injected into enclosure 3C.30. Low quality liquid water with high levels of contaminates, like Fine Tailings generated by an open mine oilsands extraction plant, is injected into the enclosure. The enclosure is pressurized. The liquid water is evaporated to generate produced steam 3C.33. The produced steam 3C.33 is at a lower temperature as compared to the superheated driving steam; it is close to the saturated point due to the additional water that was evaporated and converted to steam. The solids that were introduced with the low quality liquid water 3C.34 are removed in a stable form where they can be disposed of in a land fill and can support traffic. To increase the direct contact heat transfer within the enclosure 3C.30, moving internals are used. The internals can be any commercially available design that is used to mobilize slurry and solids in a cylindrical enclosure. A rotating screw 3C.31 can be used. The rotating movement 3C.32 is provided through a pressure sealed connection from outside the enclosure. The screw mobilizes the solids and drives them to the discharge location where they are discharged from the pressurized enclosure.

Figure 3D:
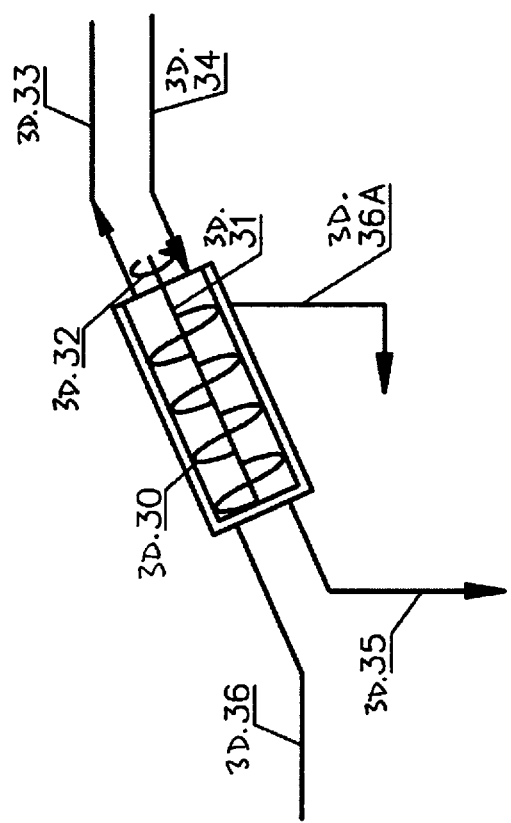
FIG. 3D is a schematic view of an illustration of a modification of FIGS. 3C and 3B for a steam drive Non-Direct contact steam generator.

FIG. 3D is an illustration of a modification of FIGS. 3C and 3B for a steam drive Non-Direct contact steam generator where the heat is supplied by steam to a heated stationary external enclosure and an internal rotating element to mobilize the evaporating low quality solids rich water, like MFT. The process includes generating or heating steam 3D.36 through indirect heat exchange (not shown). The generated steam energy from steam 3D.36 is used to indirectly gasify liquid water 3D.34 with solids and organic contaminates, like fine tailings, so as to transfer said liquid water from a liquid phase to a gas phase steam 3D.33. Solids 3D.35 are removed to produce solids-free gas phase steam 3D.33. The produced steam can be further condensed to generate heat and water for oil production (not shown). The hot driving steam (there is no need to usie dry superheated steam as the driving steam) 3D.36 is heating enclosure 3D.30. Low quality liquid water with high levels of contaminates, like Fine Tailings generated by an open mine oilsands extraction plant, are injected into the enclosure. The enclosure is pressurized. The liquid water evaporates due to a non-direct heat transfer from the enclosure 3D.30 to generate produced gas phase steam 3D.33. The solids that were introduced with the low quality liquid water 3D.34 are removed in a stable form as solids 3D.35 where they can be disposed of in a land fill and can support traffic. To increase the direct contact heat transfer within the enclosure 3D.30 and to mobilize the solids and slurry, moving internals are used. The internals can be any commercially available design that is used to mobilize slurry and solids in a cylindrical enclosure. The rotating movement can agglomerate the solids into small spheres to increase the solids stability and minimize dust generation. A rotating screw 3D.31 can be used. The rotating movement 3D.32 is provided through a pressure sealed connection from outside the enclosure. The screw mobilizes the solids and drives them to the discharge location where they are discharged from the pressurized enclosure. Any other design (like double screws, lifting scoops, or chains) can be used as well. Condensed water 3D.36A from the condensing driving steam 3D.36 is recycled to the point where it can be re-heated for generating additional driving steam 3D.36 or for any other use.

Figure 3E:
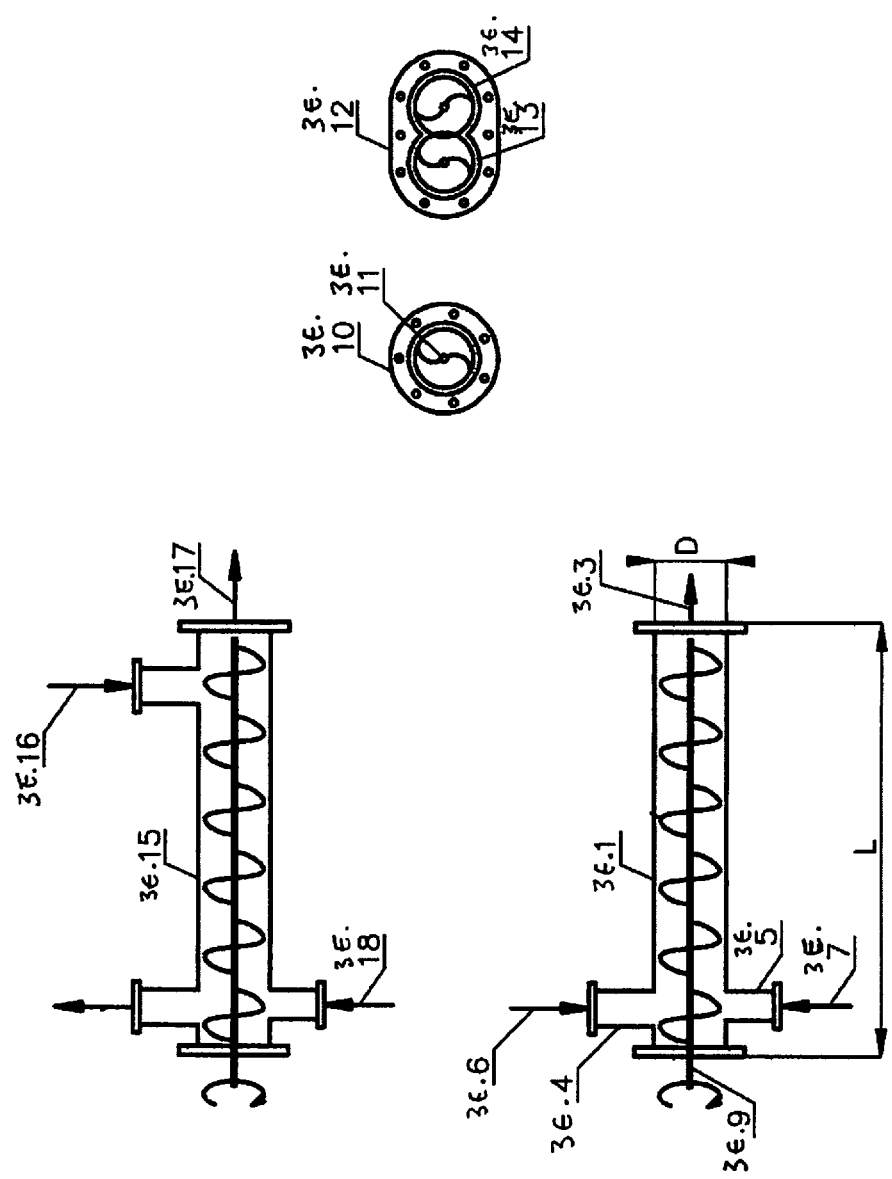
FIG. 3E shows a schematic view of a parallel flow and a counter flow steam drive direct contact steam generation system.

FIG. 3E shows a parallel flow and a counter flow steam drive direct contact steam generation system. In the parallel flow system 3E.1 liquid water 3E.7, possibly with high levels of suspended and dissolved solids like fine tailings, produced water, evaporator brine, brackish water, produced gas, carbons, hydrocarbons or any available water feed possibly with high levels of contaminates, is fed into a longitude enclosure 3E.5. Superheated dry steam 3E.6 is also fed into the same longitude enclosure 3E.4 at the same side where the low quality water is injected and where the two flows, the liquid and the gas, are mixed in direct contact. To enhance the mixing and mobilize the generated slurry or solids, mechanical energy is supplied to the enclosure. One possible, simple way to supply the mechanical energy is by a longitudinal rotating element 3E.9. There are several designs for such a rotating element that can include spirals, scoops, scrapers or any other commercially available design. It is possible to use a single rotating unit 3E.11 in a circle enclosure 3E.10. It is also possible to use double rotating units 3E.13 and 3E.14 in an oval enclosure 3E.12 where the multiple rotating units can enhance the mixing and the removal of solids deposits. In the parallel system, the produced steam 3E.3 is discharged with the solids rich slurry or solids at the enclosure end. To allow efficient heat transfer duration, the enclosure length is longer than its diameter, typically the length L is at least twice the diameter D. The steam-solids mixture is further separated (not shown). In the counter flow system 3E.15 the low quality liquid flow 3E.18, similar to flow of water 3E.7 in the parallel flow system 3E.1, is fed into a longitude enclosure with an internal rotating element to introduce mechanical energy into the enclosure. The superheated driving steam 3E.16 is introduced at the opposite end of the enclosure where it is mixed with the flow of liquids 3E.18. The heat energy in the super heated driving steam 3E.16 is directly transferred to the liquid water to generate steam. The slurry or solids are transferred by rotating auger, possibly with a spiral in the opposite direction, to the driving steam 3E.16 flow and discharged from the longitude system at as steam 3E.17. It is also possible to connect the parallel flow and the counter flow systems to each other where the discharge from the first system of steam 3E.3 or steam 3E.17 still contains significant levels of liquids, possible in a slurry form, which is fed into the second system as liquids 3E.18 or liquid water 3E.7.

Figure 3F:
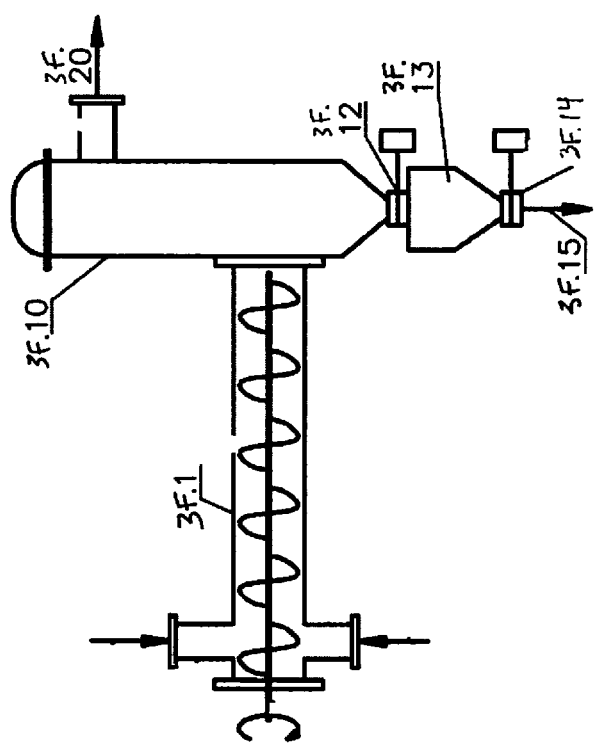
FIG. 3F shows a schematic view of a direct contact steam generating system as shown in FIG. 3E with solids separation.

FIG. 3F shows a direct contact steam generating system as shown in FIG. 3E with solids separation. The direct contact parallel flow steam generator 3F.1 is similar to FIG. 3E where the solid contaminates are removed from the steam flow in a separator 3F.10 through a de-pressurized collection hopper system that includes valves 3F.12 and 3F.14, de-pressurized enclosure 3F.13, and solids discharge 3F.15. The enclosure or separator 3F.10 can include internals to generate cyclone separation or any other commercially available solids separation design. A commercially available gas-solid separation package can be added to the discharged flow 3F.20 to remove solids from the gas stream (not shown). The solids removed from flow 3F.20 can be discharged through the de-pressurized hopper system or de-pressurized enclosure 3F.13.

Figure 3G:
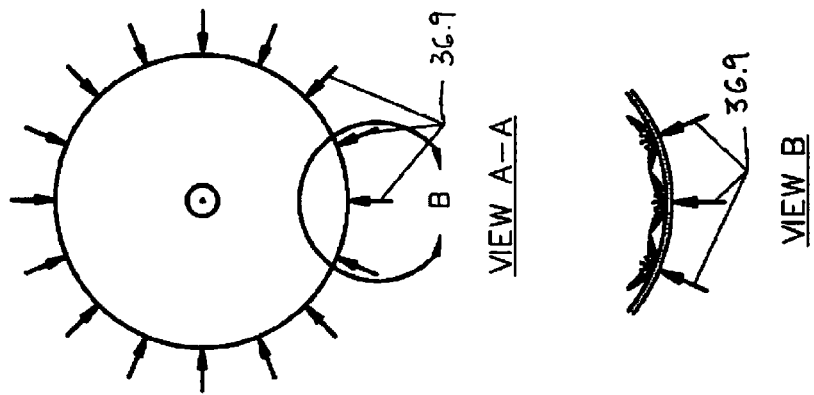
FIG. 3G is a schematic view of a steam drive direct contact steam generator apparatus.
Figure 3G:
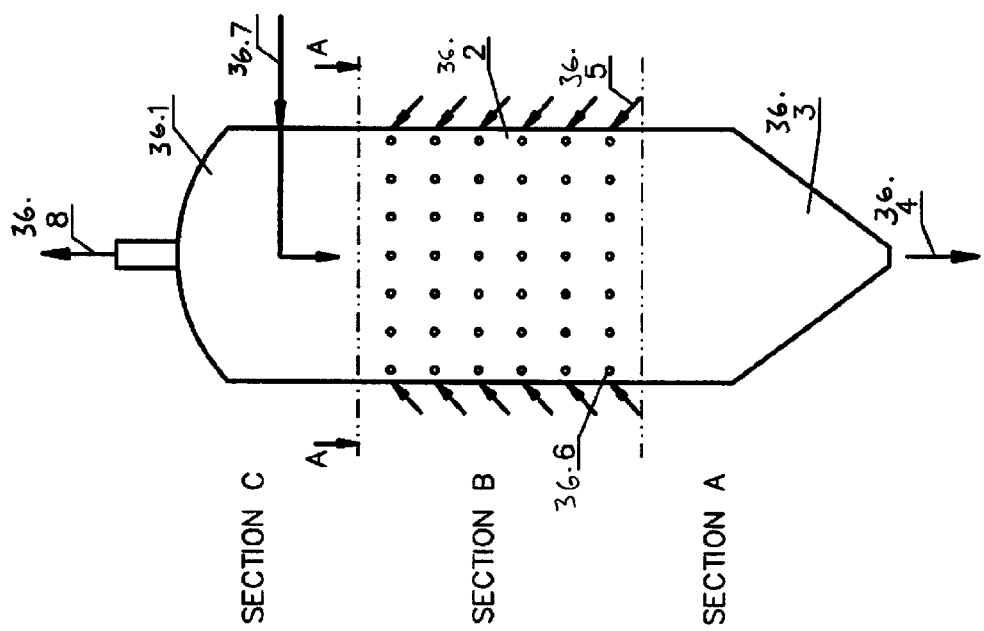

FIG. 3G is a steam drive direct contact steam generator apparatus. It includes a vertical enclosure 3G.2 with steam injection points 3G.6 arranged around the enclosure wall. The injection flows 3G.5, 3G.9 are arranged to enhance the mixing flow within the vessel and to protect the enclosure wall from solids build-up. Liquid water 3G.7 injected into the upper section 3G.1 of the enclosure. The water injection can include a sprayer to disperse the water and enhance the mixture between the liquid water and the steam. The injected water can be low quality produced water or water from any other source, such as tailings pond water. The injected water 3G.7 can include dissolved or suspended solids as well as any other carbon or hydrocarbon contamination. The water is injected at the upper section—section C. Super heated dry steam through flow 3G.5 is injected at section B located below the injection of water 3G.7. The dry steam is injected substantially perpendicular to the enclosure wall, possibly with an angle to enhance the mixture of the liquid water and the steam and to minimize the contact between the liquid water and the enclosure wall which can prevent build up of solids deposits on the enclosure wall. The solids rich contaminates 3G.4 that were introduced into the system with the water 3G.7, after most of the liquid water evaporates into steam, are collected at the bottom of the enclosure 3G.3 and removed from the system. The injected steam through flow 3G.9 can be dispersed by a nozzle 3G.10 close to the enclosure wall in such a way that part of the steam flow will be spread and then will generate a flowing movement that will reduce the potential contact between the water 3G.7 and the enclosure wall. The injected steam through flow 3G.5 and the water feed that was converted into steam is released in a gas flow 3G.8 from the upper section 3G.1 of the enclosure. The steam through gas flow 3G.8 can flow through a demister and a separator that can be located internally in section C or externally to remove water droplets and solids remains (not shown). The pressure of the produced steam through gas flow 3G.8 is similar to the pressure of the superheated driving steam through flow 3G.5, except for a small difference to generate the up flow movement, and its temperature is closer to the saturated temperature at the particular enclosure pressure due to the evaporation of the feed water 3G.7.

Figure 3H:
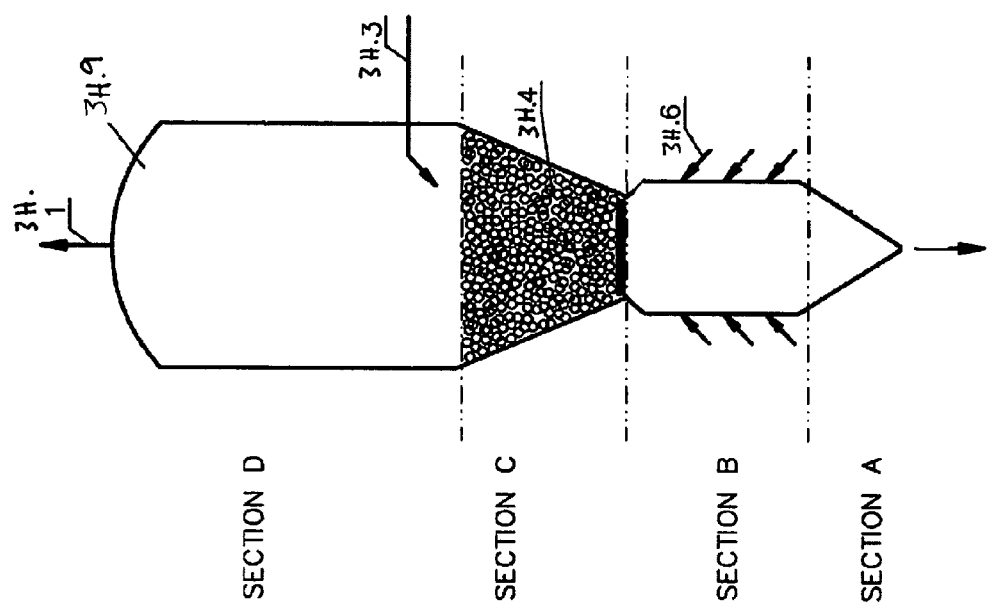
FIG. 3H is a schematic view of another configuration of a steam drive direct contact steam generator apparatus.

FIG. 3H is another configuration of a steam drive direct contact steam generator apparatus. Sections A and B are described in FIG. 3E. Superheated dry steam 3H.6 is injected into Section B. Any liquid water that flows into the up-flow chamber of Section B is converted into steam. Contaminates, mainly solids, that were carried with the feed water 3H.3 are removed from the bottom of the enclosure 3H.9 from Section A. The superheated steam 3H.6 flows from Section B into Section C located above B. Section C includes a fluid bed 3H.4. This fluid bed includes liquid, solids and slurry supplied with the feed water 3H.3. Additional free moving bodies, like sand, round metal particles, or round ceramic particles can be added to the fluid bed 3H.4 to enhance the heat transfer between the up flowing steam and the slurry from the water feed 3H.3. The fluid bed in Section C can include additional steam injectors (not shown) to mobilize the solids and prevent solids build-ups that can block the fluid bed. A direct steam injection into Section C can be done in intervals in strong bursts to mobilize the fluid bed and remove build-ups. A mechanical means to create movement within the fluid bed can be used as well, possibly in intervals, in case the steam up flow from Section B is not sufficient to prevent solidifications within the fluid bed 3H.4 and remove build-ups (not shown). Solids can also be removed directly from fluid bed 3H.4, from the fluid bed section. The produced steam 3H.1 from water 3H.3 and from the driving super heated steam 3H.6 is used for oil extraction or for other usages. In the case that the low quality water 3H.3 contains hydrocarbons, a portion of the hydrocarbons will be recovered with the produced steam and injected into the underground formation for heavy oil recovery. The produced steam 3H.1 can be further treated in a commercially available demister and gas-solids separator to remove water droplets or flying solids carried-on with the generated steam flow.

Figure 3I:
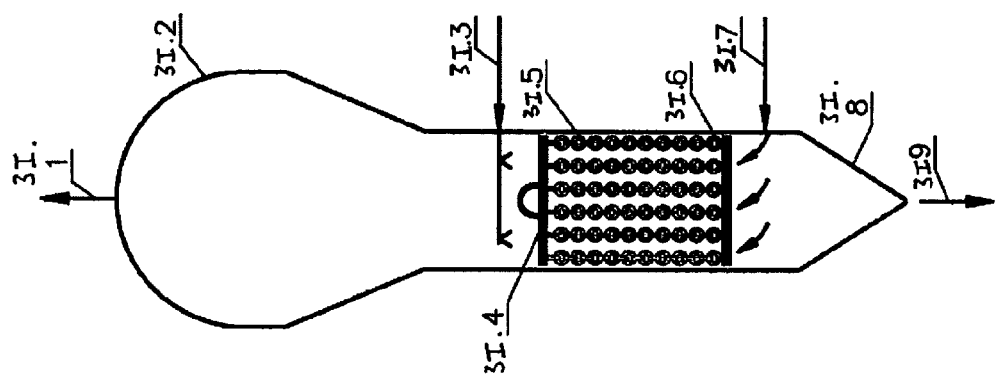
FIG. 3I is a schematic view of a steam drive direct contact steam generator apparatus.

FIG. 3I is a steam drive direct contact steam generator apparatus. Superheated steam 3I.7 is injected into a vertical enclosure at its lower section. Liquid water 3I.3 is injected into the enclosure above the steam injection area. The water injection can include a sprayer to disperse the water and enhance the mixture between the liquid water 3I.3 and the steam 3I.7. The injected water can be low quality SAGD produced water, boiler blow-down, evaporator brine or water from any other source, such as open mine tailings pond water. The injected water 3I.3 can include dissolved or suspended solids as well as any other carbon or hydrocarbon contamination. To enhance the mixture of the steam and the water and to remove solids, an internal structure 3I.4 is placed in between the steam injection section and the water injection section. Internal structure 3I.4 can include a moving bed or any other configuration of free moving elements, like chains 3I.5, that can remove solids build-ups from the supplied water 3I.3. Mechanical energy can be introduced into the internal structure 3I.4 to generate continuous or interval movement between its parts or between the internal structure and the enclosure. Vibration movement can be introduced to the bottom structure 3I.6 to prevent solids build-ups. The solids 3I.9 are collected and removed from a cone 3I.8 in the enclosure bottom. One option is to generate relative movement between the upper bed of the internal structure 3I.4 and the lower bed or bottom structure 3I.6 and the enclosure wall. Any commercially available design for moving bed internals can be used as well. The generated steam 3I.1 is released from the upper section of the enclosure 3I.2. The generated steam 3I.1, can be further cleaned in a dry or wet scrubber and used in enhanced oil recovery by injecting it underground, like in SAGD or CSS, or to heat water in an open mine extraction process.

Figure 3J:
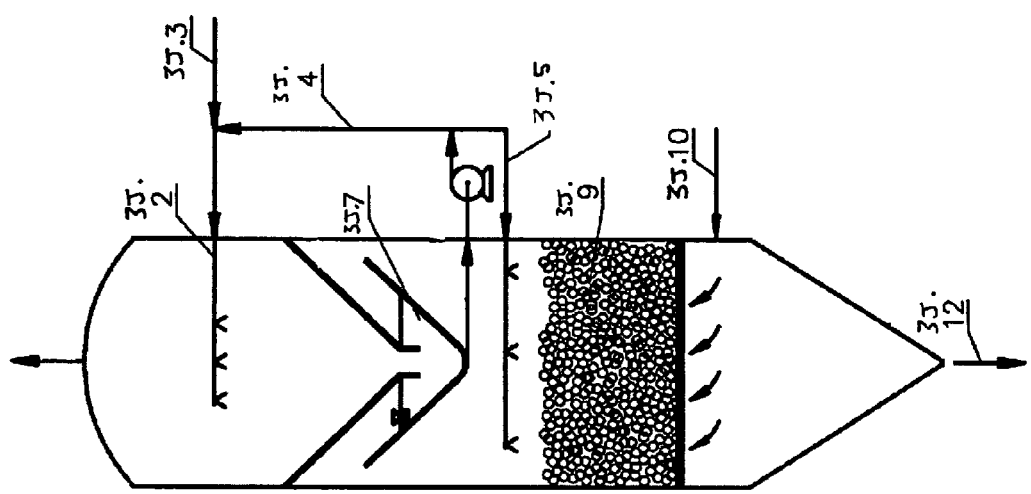
FIG. 3J is a schematic view of a steam drive direct contact steam generator with an internal wet scrubber that generates additional wet solids free steam.

FIG. 3J is a steam drive direct contact steam generator with an internal wet scrubber that generates additional wet solids free steam. Superheated steam 3J.10 is injected into Section A of the vertical enclosure. Liquid water 3J.5 is injected and dispersed above the dry steam injection point. A fluid bed, possibly with additional solid particles 3J.9, is supported above the steam injection area of superheated steam 3J.10 in Section A. The fluid bed increases the heat transfer between the up-flowing steam 3J.10 and the dispersed water 3J.5. Solids 3J.12 are remove from the bottom of Section A for disposal or further treatment. The bottom section of the fluid bed can move by mechanical means to generate a moving or vibrating bed. Solids can be recovered from the fluid bed at Section A to maintain a constant solids level. The up-flow generated steam, possibly with solids particles, flows into section B. In this section, the up flowing steam is scrubbed by liquid saturated water 3J.7. To generate the contact between the liquid saturated water and the steam, a liquid bath of water 3J.7 can be used where the steam is forced (due to pressure differences) through the liquid water. Another option is to continually recycle hot saturated liquid water 3J.4 and spray water 3J.2 into the up flowing steam, thereby scrubbing any solids remains and generating additional steam. In Figure J, both options are presented (the liquid bath is combined with the water sprayers of water 3J.2) however it is possible to use only one of the presented options. If only the liquid bath of water 3J.7 is used, the feed water 3J.3 will be supplied to the liquid bath as a make-up water (not shown) to replace the water that was evaporated in Section B and water 3J.5, ensuring any solids are scrubbed, from Section B that is supplied to Section A and evaporated there. The generated solids free saturated steam from Section B flows into Section C. Section C can include a demister to separate any droplets carried on with the up-flow steam (not shown). The produced solids free steam can be used for oilsands bitumen recovery with any commercial oilsands plant that requires steam.

Figure 3K:
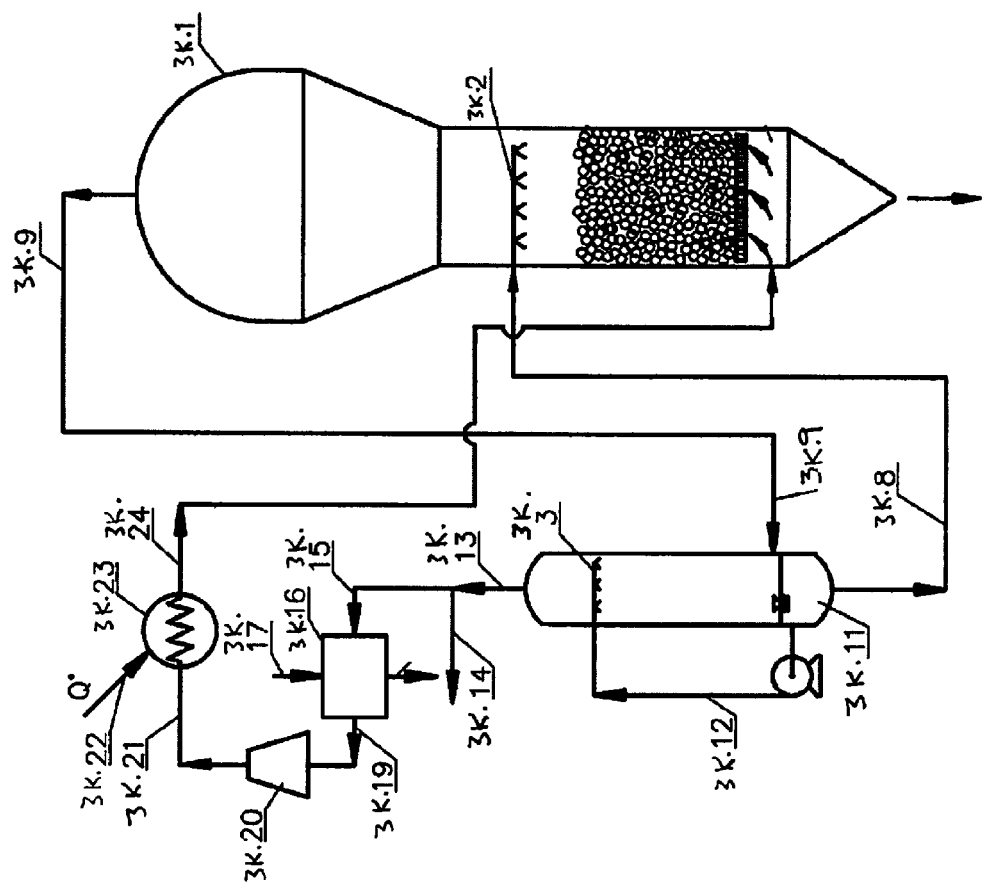
FIG. 3K is a schematic view of an illustration of another embodiment of the present invention.

FIG. 3K is an illustration of one embodiment of the present invention. An up-flow direct contact steam generator, as described in FIG. 3H or 3I, is used to generate steam 3K.9 from superheated steam and liquid water 3K.8. Additional designs for direct contact steam generators, like FIGS. 2C, 2D and 2E can be used as well. The produced steam 3K.9 flows to an external wet scrubber that also generates additional steam. The produced steam is mixed with liquid water 3K.11, possibly by circulating system 3K.12 with sprayers for dispersing the water 3K.3, where any solids remains are scrubbed with the water droplets while wet steam is generated. Liquid water 3K.8 at a saturated temperature and pressure is continually recycled and injected into the steam generator 3K.2. Water feed, possible with high levels of contaminates, is fed into the system. Portion 3K.14 of the produced steam 3K.13 can be used for any industrial use, such as for oil recovery or for steam use in the chemical industry. The other portion 3K.15 of the produced steam is recycled and used to produce dry superheated steam 3K.24 to operate the direct contact steam generator 3K.1. The recycled portion 3K.15 of produced steam can be further filtered in any commercially available filter package to remove contaminates like gas silica remains. Water and chemicals 3K.17 can be used in any gas treated commercial package 3K.16. The steam 3K.19 is then compressed to recover the pressure drops in the recycled piping and equipment and then flows to steam heater. Depending on the mechanical compressing system 3K.20 requirements, some heat can be added to flow of steam 3K.19 prior to the compression. Another option is to use a steam ejector of the system 3K.20 with high pressure steam feed to generate the recycle flow 3K.21. The steam flow 3K.21 is further heated in any commercially available heating system 3K.23. Heat flow 3K.22 increases the temperature of steam 3K.24 to generate a dry, superheated steam flow that is injected back into the direct contact steam generator as the driving steam.

Figure 4:
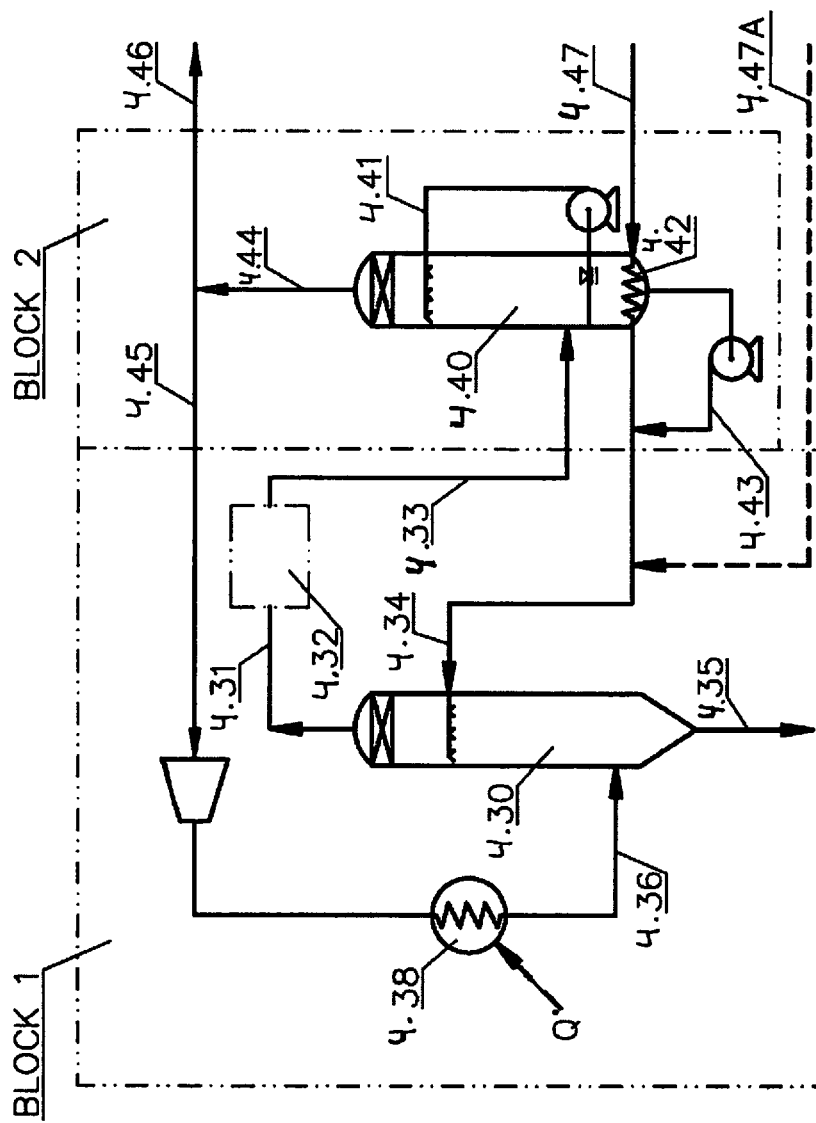
FIG. 4 is a schematic view of an illustration of still another embodiment of the present invention.

FIG. 4 is an illustration of one embodiment of the present invention, where the generated steam 4.44 is saturated and is washed by saturated water in a wet scrubber 4.40 where additional steam is generated. BLOCK 1 includes the system described in FIG. 3 whereas block 4.32 can include solids removal as a means to remove solid particles from the gas (steam) flow. Block 4.32 generates steam 4.33 and stable waste 4.35. The generated steam 4.33 can contain carry-on solid particles and contaminates that might create problems with corrosion or solids build ups in the high temperature heat exchanger. One way to remove the solid contaminates is by the use of a commercially available solid-gas separation unit, as described in FIG. 2B, or with any other prior art solids removal method. However, there is an advantage to wet scrubbing of solids and possibly other gas contaminates. To improve the removal of the solids and other contaminates, the steam 4.33 is directed to a wet scrubber. In one embodiment, the wet scrubber generates the liquid water for its operation.

This is done by an internal heat exchanger that recovers heat from the steam and generates condensate water. The condensate liquid water is used for scrubbing the flowing steam in vessel or scrubber 4.40. The condensate is recycled 4.41 and used to wash the steam and is then used as a means to improve the heat transfer. Low quality water from the oil-water separation process, fine tailings water from tailings ponds or from any other source is pre-heated through heat exchanger 4.42 while recovering heat from the produced steam 4.34 generated by the SD-DCSG 4.30. The condensate is recycled in the wet scrubber to wash the steam. Additional chemicals can be added to the condensate to remove gas contaminates. A portion of the condensate with the solids and other contaminates 4.43 is removed from vessel or scrubber 4.40 to maintain the contamination concentration of the condensate so it is constant. Additional low quality water 4.47A can be added to the SD-DCSG without pre-heating so as to prevent excessive cooling of the produced steam 4.33 and to prevent the generation of excessive condensate. The generated steam, after going through the wet scrubber, is a clean and saturated ("wet") steam. A portion of the clean steam 4.45 is directed through heat exchanger 4.38 to generate "dry" steam to drive the SD-DCSG 4.30 with sufficient thermal energy to convert the low quality water feed the produced steam 4.34. The flow through the heat exchanger and inside the vessel or SD-DCSG 4.30 is generated by any suitable commercial unit that can be driven by mechanical energy or can be a jet energy driven compression unit. The produced clean saturated steam 4.46 can be injected into an underground reservoir, like SAGD, for oil recovery, and it can also be used for heating process water for tar separation or for any other process that consumes steam.

Figure 5:
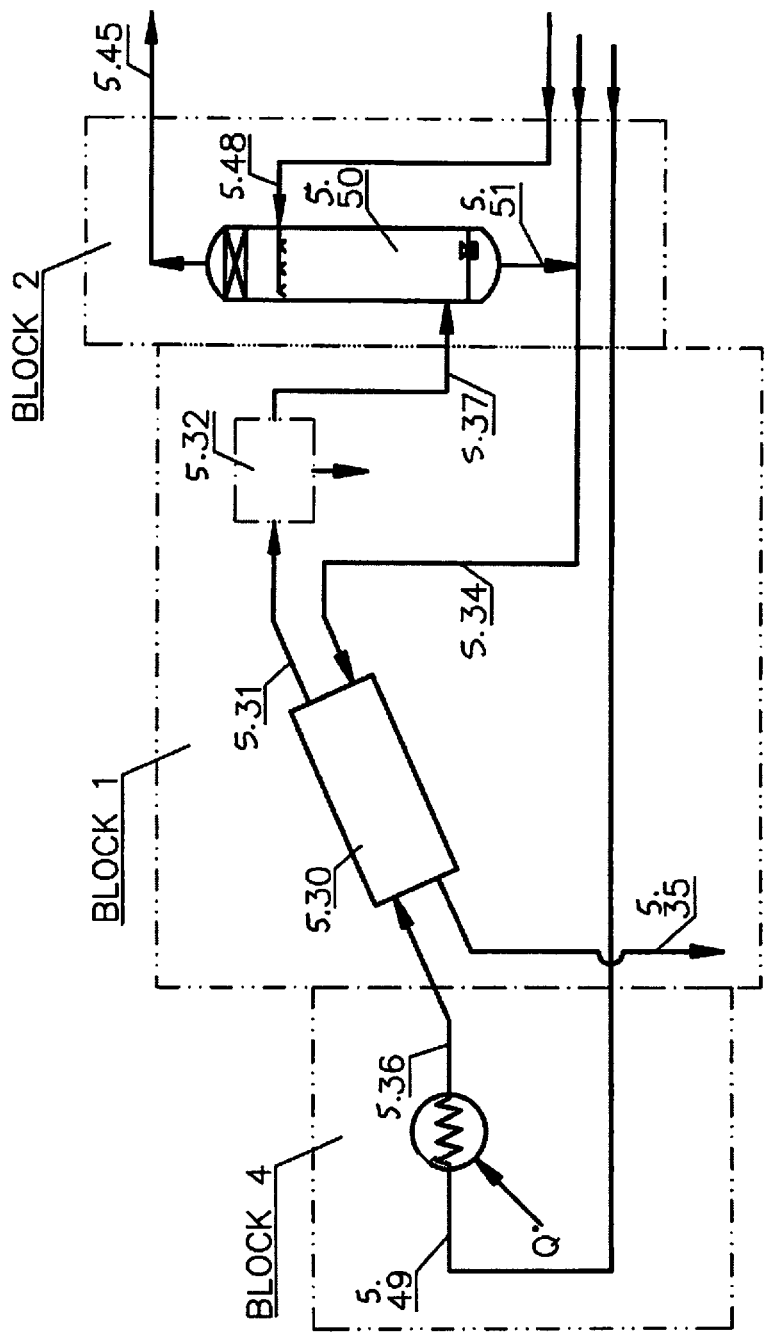
FIG. 5 is a schematic diagram of one embodiment of the invention that generates wet scrubbed, clean saturated steam.

FIG. 5 is a schematic diagram of one embodiment of the invention that generates wet scrubbed, clean saturated steam. BLOCK 1 includes a SD-DCSG 5.30 as previously described. The generated steam 5.31 can be cleaned of solids in commercial unit 5.32, previously described. Low quality water 5.34, like MFT, produced water or water from any other available source, can be injected into the SD-DCSG 5.30. Solids 5.35 carried by the water 5.34 are removed. The SD-DCSG 5.30 is driven by superheated ("dry") steam that supplies the energy needed for the steam generation process. The dry steam 5.36 is generated by a commercially available boiler as described in BLOCK 4. Boiler Feed Water (BFW) 5.49 is supplied to BLOCK 4 for generating the driving steam. The boiler facility can include an industrial boiler, OTSG, COGEN combined with gas turbine, steam turbine discharge re-heater or any other commercially available design that can generate dry steam 5.36 and that can drive the SD-DCSG 5.30. In the case where the boiler consumes low quality fuel, like petcoke or coal, commercially available flue gas treatment will be used. There is a lot of prior art knowledge for the facility in BLOCK 4 as it is similar to the facility that is used all over the world for generating electricity. The generated steam 5.37 from the SD-DCSG 5.30 is supplied to BLOCK 2, which includes a wet scrubber. The wet scrubber 5.50 can contain chemicals like ammonia or any other chemical additive to remove contaminates. The exact chemicals and their concentration will be determined based on the particular contaminates of the low quality water that is used. The contamination levels are much lower than in direct fired DCSG where the water is directly exposed to the combustion products, as described in my previous patents. Liquid water 5.48 is injected to the wet scrubber 5.50 to scrub the contaminants from the up-flowing steam 5.37. Liquid water 5.51, that includes the scrubbed solids, is removed from vessel or scrubber 5.50 and recycled back to the SD-DCSG 5.30 together with the feed water 5.34. Depending on the particular quality of feed water 5.34, it can be used in the scrubber. In that case, stream of water 5.48 and feed water 5.34 will have the same chemical properties and be from the same source. The scrubbed generated steam 5.45 generated at BLOCK 2 can be used for extracting and producing heavy oil or can be used for any other use.

Figure 5A:
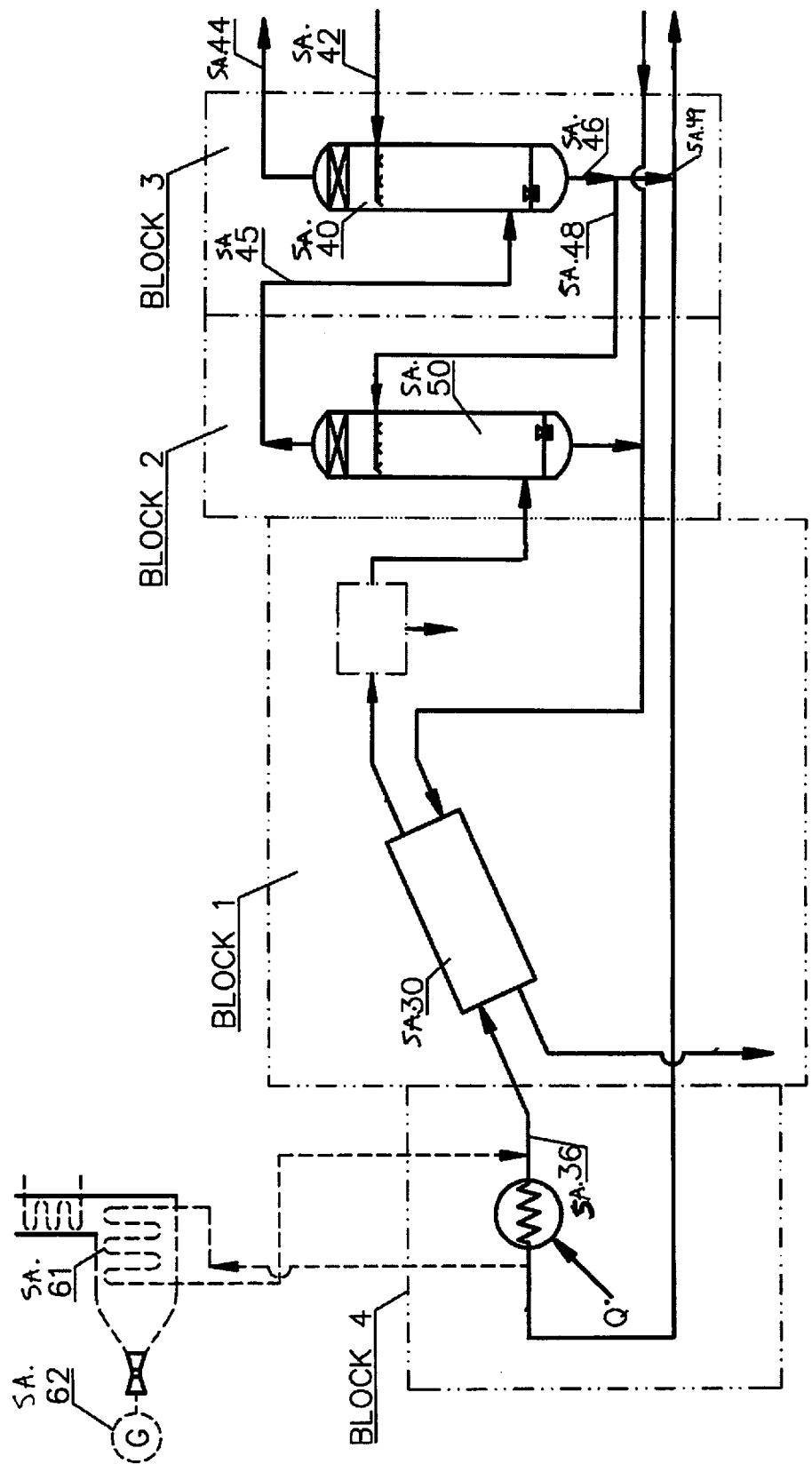
FIG. 5A is a schematic view of an illustration of one embodiment of the invention where a portion of the driving steam water is internally generated.

FIG. 5A is an illustration of one embodiment of the invention where a portion of the driving steam water is internally generated. The embodiment is described in FIG. 5 with the following changes: BLOCK 3 was added and connected to BLOCK 2. This block includes a direct contact condenser/heat exchanger 5A.40 that is designed to generate hot (saturated) boiler feed water 5A.46 and possibly saturated steam 5A.44. The saturated steam 5A.45 from scrubber 5A.50 flows into the lower section of a direct contact heat exchanger/condenser 5A.40 where BFW 5A.42 is injected. From the direct contact during the heating of the BFW, additional water will be condensed generating additional BFW 5A.46. A portion of the injected and generated water 5A.48 is used in wet scrubber 5A.50 to remove contamination and is then recycled back to the SD-DCSG 5A.30. The additional condensate—clean BFW quality water 5A.49—is used in BLOCK 4 for generating steam. The condensate is hot—it is at the water or steam saturated temperature at the particle system pressure. Addition hot condensate can be generated and recovered from the system as hot process water for oil recovery or for other uses. BLOCK 4 can include any commercially available steam generator boiler capable of producing dry steam 5A.36. In FIG. 5A, a schematic COGEN is described. Gas turbine 5A.62 generates electricity. The gas turbine flue gas heat is used to generate or heat steam through non-direct heat exchanger 5A.61. Typically the produced steam is used to operate steam turbines as part of a combined cycle. At least part of the produced dry superheated steam 5A.36 is used to operate the SD-DCSG 5A.30.

Figure 5B:
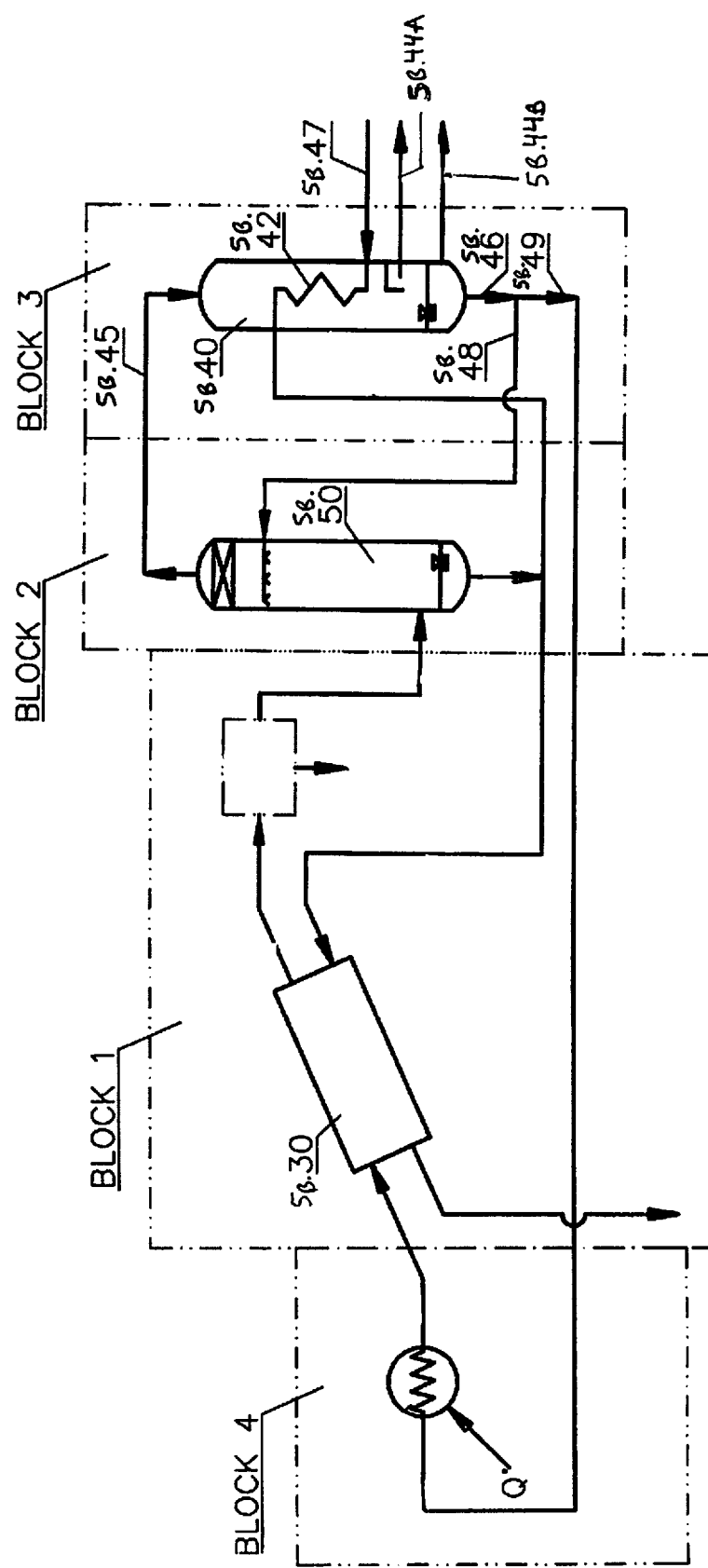
FIG. 5B is a schematic view of the invention with internal distillation water production for the boiler.

FIG. 5B is a schematic view of the invention with internal distillation water production for the boiler. The illustration is similar to the process described in FIG. 5A with a different BLOCK 3. The low quality water 5B.47 is heated with the saturated, clean (wet scrubbed) steam 5B.45 from BLOCK 2 (previously described). The saturated steam 5B.45 condenses on the heat exchanger 5B.42, located inside vessel 5B.40, while generating distilled water 5B.46. A portion of the distilled water 5B.48 is recycled to the wet scrubber vessel 5B.50 where it removes the solids and generates additional wet steam from the partially dry steam generated in the SD-DCSG 5B.30 in BLOCK 1. Additional distilled water 5B.49, possibly after minor treatment and addition of chemical additives (not shown) to bring it to BFW specifications, is directed to the boiler in BLOCK 4 for generating the driving steam. The system can produce saturated steam 5B.44A or saturated liquid distilled water 5B.44B or both. The produced steam and water are used for oil production or for any other use.

Figure 5C:
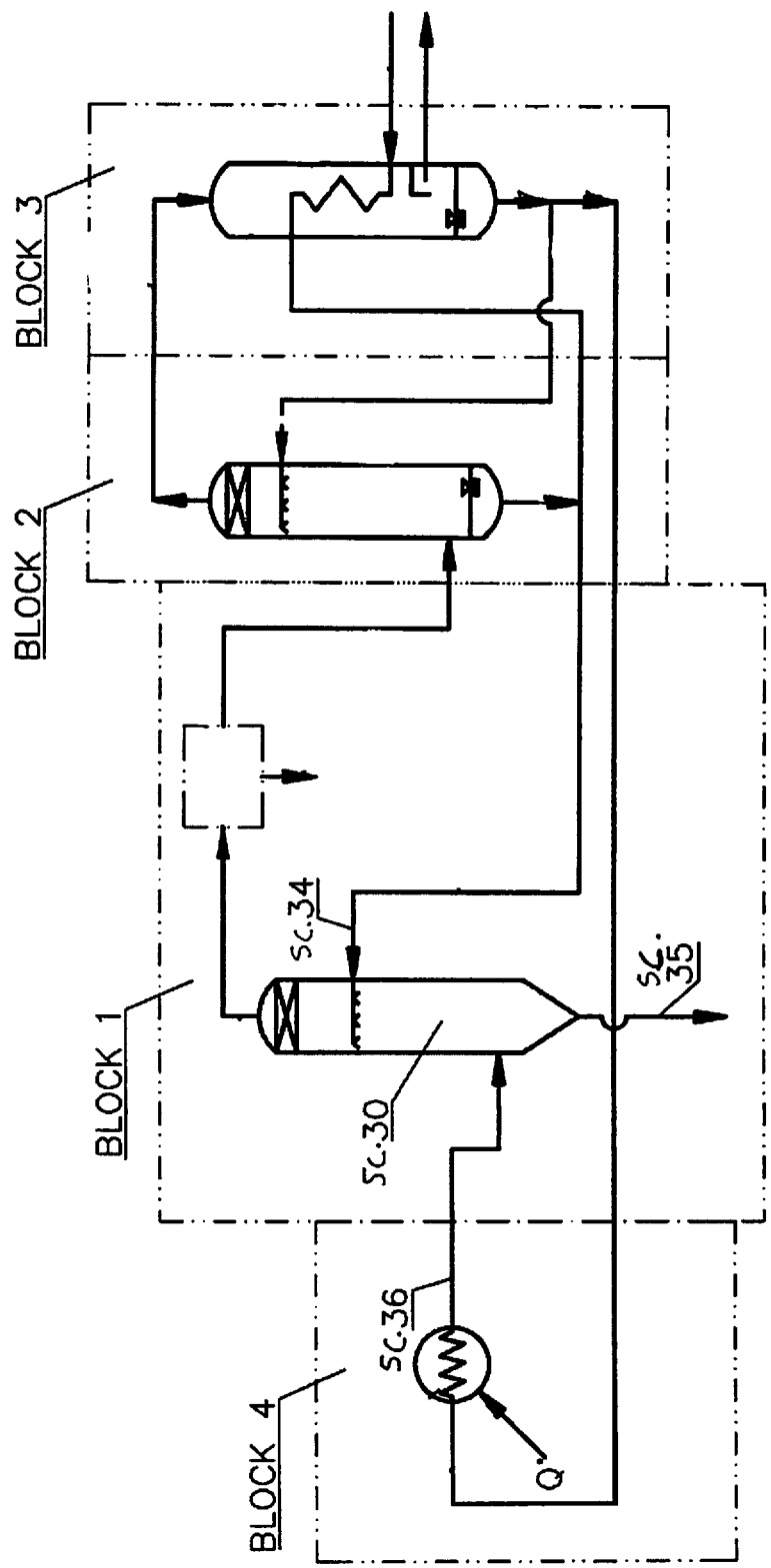
FIG. 5C is a schematic diagram of a method that is similar to FIG. 5B but with a different type of SD-DCSG.

FIG. 5C is a schematic diagram of a method that is similar to FIG. 5B but with a different type of SD-DCSG in Block 1. FIG. 5C includes a vertical stationary SD-DCSG. The dry driving steam 5C.36 is fed into vessel 5C.30 where the low quality water 5C.34 is fed above it. Due to excessive heat, the liquid water is converted into steam. The waste discharge at the bottom 5C.35 can be in a liquid or solid form. BLOCKS 2, 3 and 4 are similar to those in the previous FIG. 5B.

Figure 6:
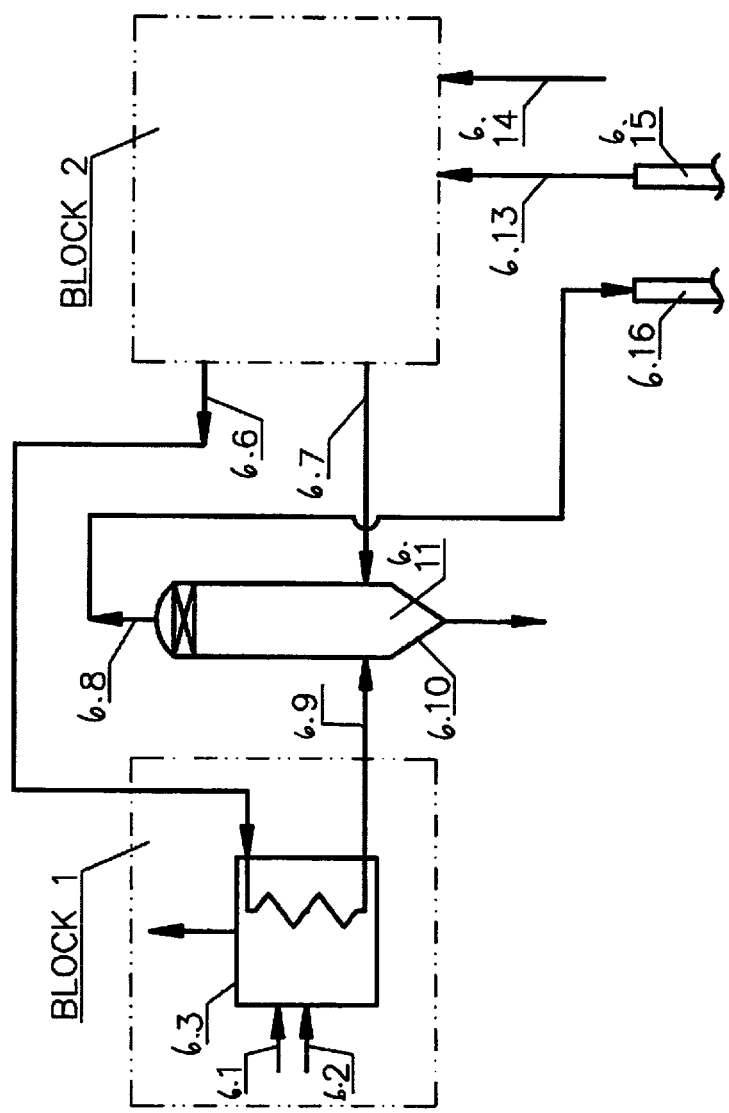
FIG. 6 is a schematic diagram of the present invention which includes a SD-DCSG and an EOR facility.

FIG. 6 is a schematic diagram of the present invention which includes a SD-DCSG and an EOR facility like SAGD for injecting steam underground. BLOCK 1 is a standard commercially available boiler facility. Fuel 6.1 and oxidizer 6.2 are combusted in the boiler 6.3. The combustion heat is recovered through a non-direct steam generator for generation of superheated dry steam 6.9. The combustion gases are released to the atmosphere or for further treatment (like solid particles removal, SOX removal, CO2 recovery, etc.). The water that is fed to the boiler is fed from BLOCK 2, which includes a commercially available boiler treatment facility. The required quality of the supplied water is according to the particular specifications of the steam generation system in use. The dry steam is fed to SD-DCSG 6.10. Additional low quality water 6.7 is fed into vessel 6.11 where the liquid water is transferred to steam due to the excess heat in the superheated driving steam 6.9. The generated steam 6.8, possibly saturated or close to being saturated, is injected into an underground formation through an injection well 6.16 for EOR. The produced emulsion 6.13 of water and bitumen is recovered at the production well 6.15. The produced emulsion is treated using commercially available technology and facilities in BLOCK 2, where the bitumen is recovered and the water is treated for re-use as a BFW. Additional make-up water 6.14, possibly from water wells or from any other available water source, can be added and treated in the water treatment plant. The water treatment plant produces two streams of water—a BFW quality 6.6 stream as is currently done to feed the boilers, and another stream of contaminated water 6.7 that can include the chemicals that were used to produced the high quality BFW, oil contaminates, dissolved solid (like salts) and suspended solids (like silica and clay). The low quality flow is fed to the SD-DCSG 6.10 to generate injection steam.

Figure 6A:
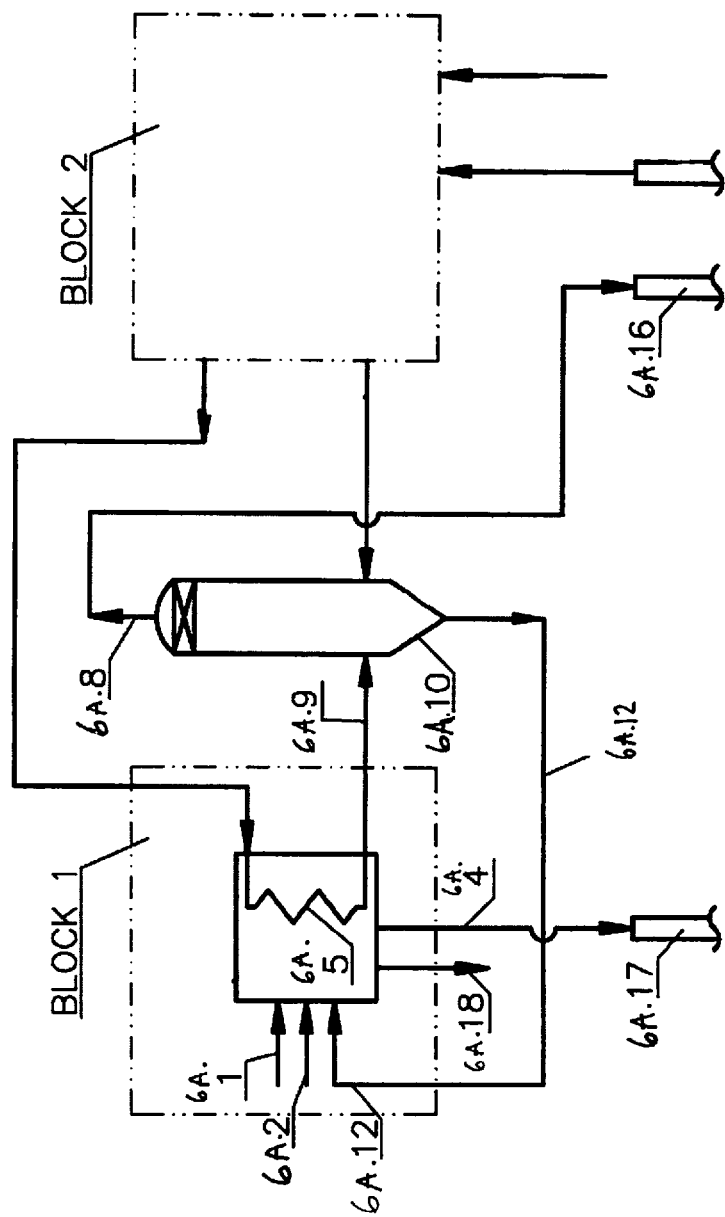
FIG. 6A is a schematic flow diagram of the integration between SD-DCSG and DCSG that uses the combustion gas generated by the pressurized boiler.

FIG. 6A is a schematic flow diagram of the integration between SD-DCSG and DCSG that uses the combustion gas generated by the pressurized boiler. BLOCK 1 includes a DCSG with non-direct heat exchanger boiler as described in my previous applications. Carbon or hydrocarbon fuel 6A.2 is mixed with an oxidizer that can be air, oxygen or oxygen enriched air 6A.1 and combusted in a pressurized combustor. Low quality water 6A.12 discharged from the SD-DCSG is fed into the combustion unit to recover a portion of the combustion heat and to generate a stream of steam and combustion gas mixture 6A.4. The solid contaminates 6A.18 are removed in a solid or stable slurry form where they can be disposed of. The steam and combustion gas mixture 6A.4 is injected into injection well 6A.17 for EOR. Injection well 6A.17 can be a SAGD "old" injection well where the formation oil is partly recovered and large underground volumes are available, as well as where corrosion problems are not so crucial as, for example, the well is approaching the end of its service life. Another, preferable option for using the steam and combustion gas mixture is to inject it into a formation that is losing pressure and needs to be pressurized by the injection of addition non-condensable gas, together with the steam. A portion of the combustion energy is used to generate superheated dry steam in a boiler type heat exchanger 6A.5. The generated steam 6A.9 is driving the SD-DCSG 6A.10. The water for the non-direct boiler or heat exchanger 6A.5 is supplied from the commercially available water treatment plant in BLOCK 2. Low quality water from BLOCK 2 is fed directly into the SD-DCSG where it is converted into steam. In this scheme, the conversion is only partial as the discharge from SD-DCSG 6A.10 is in a liquid form water 6A.12. The liquid discharge water 6A.12 is directed to the combustion DCSG to generate an overall ZLD (Zero Liquid Discharge) facility. The steam 6A.8 from the SD-DCSG 6A.10 is injected into an underground formation through an injection well 6A.16 for EOR.

Figure 6B:
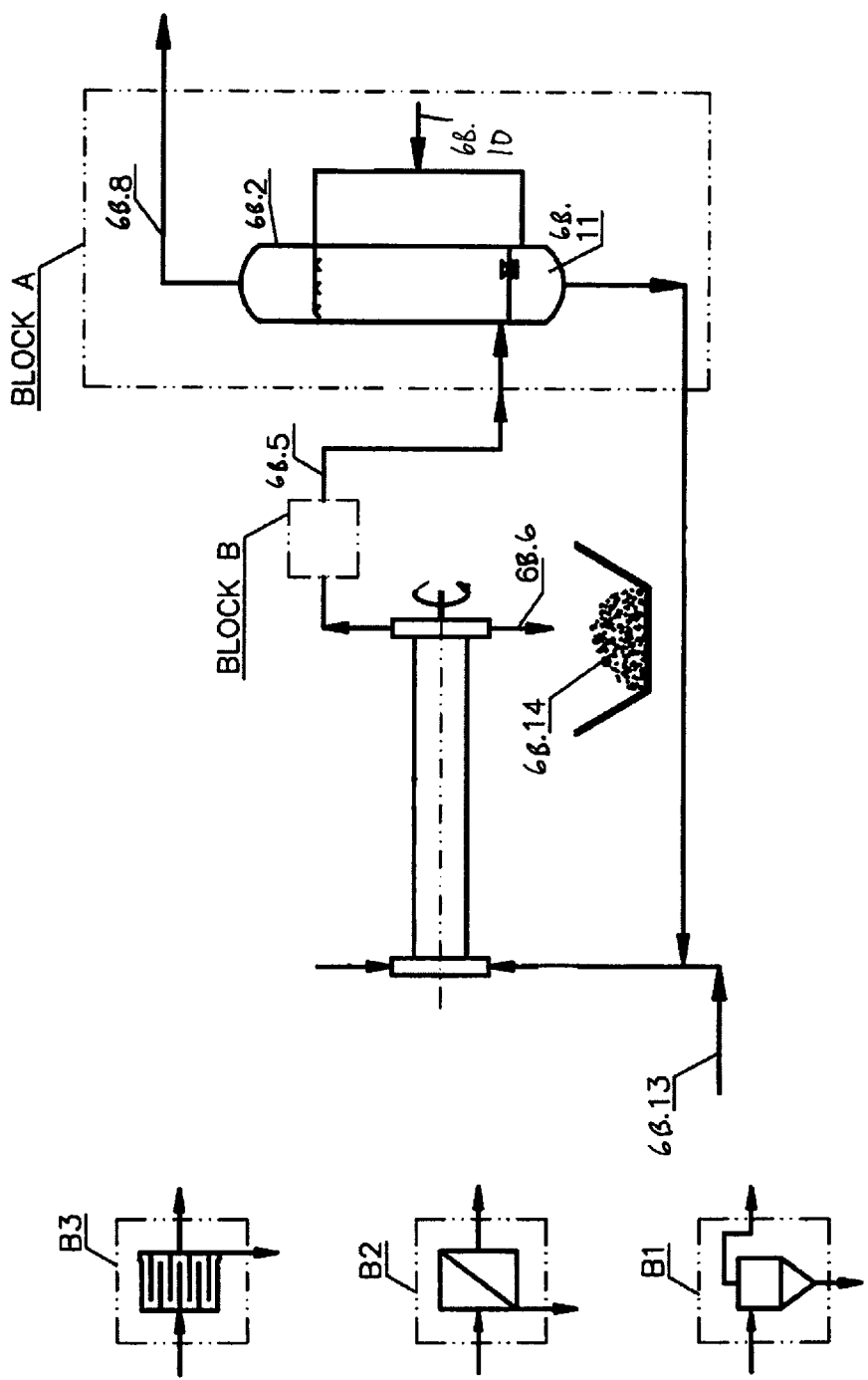
FIG. 6B is a schematic view of a direct contact steam generator with rotating internals, dry solids separation, wet scrubber and saturated steam generator.

FIG. 6B described a direct contact steam generator with rotating internals, dry solids separation, wet scrubber and saturated steam generator. Super heated driving steam 6B.13 is fed into a direct contact steam generator where it is mixed with water, possibly with contaminates. The excessive heat energy in the steam evaporates the water to generate additional steam. Solids 6B.6 are removed from the system in a dry or slurry form. The produced steam is treated in a commercially available gas treatment unit in Block B. An inlet demister, to remove carried-on liquid droplets, can be incorporated in Block B. Any commercially available unit to remove solids and contaminates can be used, such as cyclone solids removal system schematically described in B1, a high temperature filter B2, an electrostatic precipitator B3 or a combination of these with any other commercially available design. The solids are removed in a dry form are added to the solids removed from the steam generator 6B.14. The solids lean flow 6B.5 is fed into a saturated steam generator and a wet scrubber 6B.2. Liquid water is recycled and dispersed into the flowing steam. A portion of the liquid water evaporates. The water droplets remove contaminates. Chemicals like anti-foaming, flocculants, Ph control and other commercially available chemicals to control the process efficiency and prevent corrosion can be added to the recycled water 6B.11. Make-up water 6B.10 can be added to the system to replace the water converted into steam and to replace the recycled water with contaminates, back to the feed water 6B.12. The scrubbed solids free generated steam 6B.8 is supplied from the system for other usages.

Figure 6C:
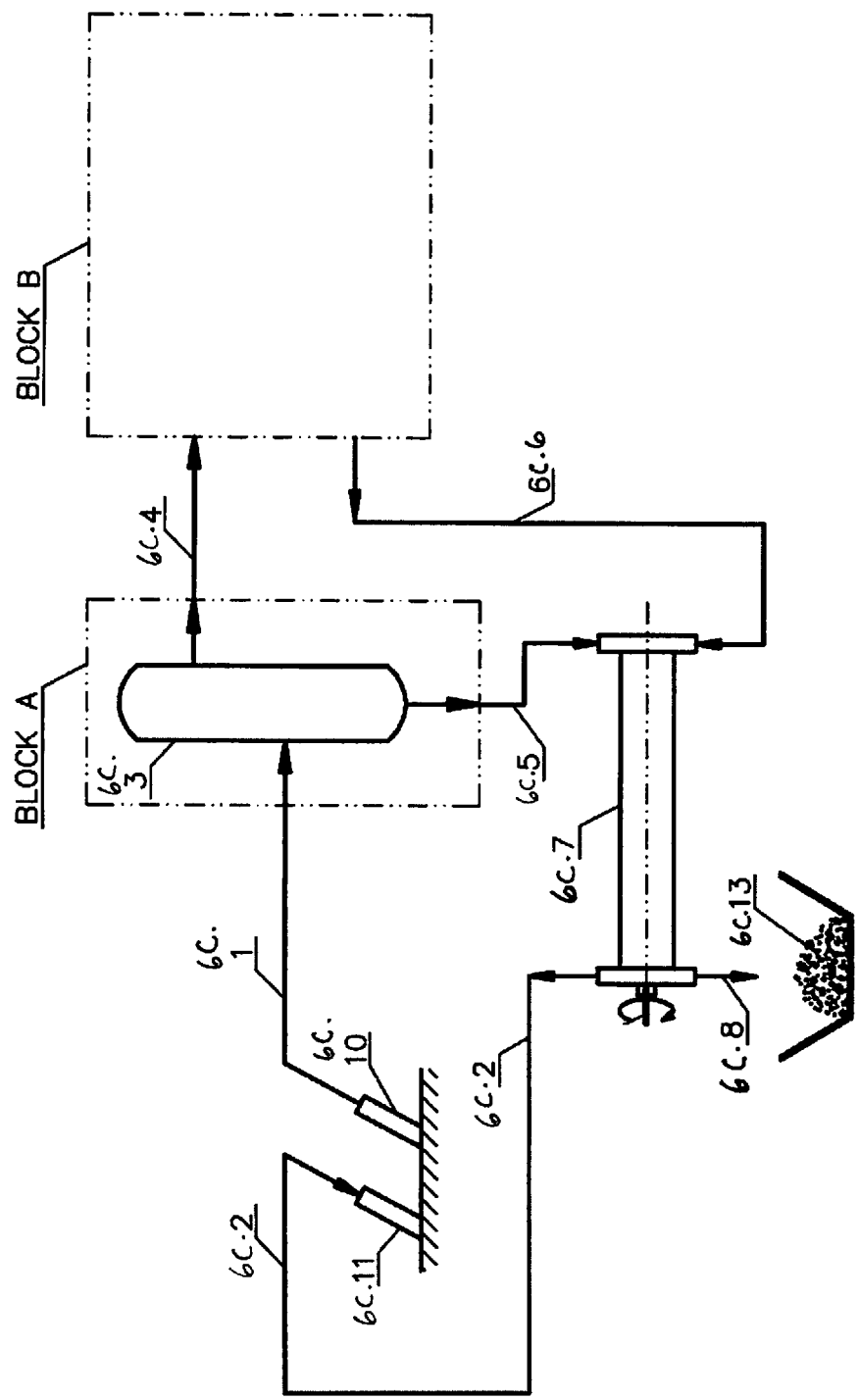
FIG. 6C is a schematic view of a SD-DCSG and heavy oil extraction through steam injection.

FIG. 6C includes SD-DCSG and heavy oil extraction through steam injection. Emulsion of steam, water bitumen and gas is produced from a production well 6C.10, like a SAGD well. The produced flow 6C.1 is separated in a separator 6C.3 (located in BLOCK A) to generate water rich flow 6C.5 with contaminates like sand, and hydrocarbons rich flow 6C.4. There are a few commercial designs for separators that are currently used by the industry. Chemicals can be added to the separation process. The hydrocarbon rich flow 6C.4 is further treated in processing plant at BLOCK B. Flow 6C.4 is further separated into the produced bitumen, usually diluted with light hydrocarbons to enhance the separation process and to reduce the viscosity which allows the flow of the bitumen in the transportation lines. In BLOCK B, the produced water that remained with the flow 6C.4 is de-oiled and used, usually with make-up water from water wells, for generating super-heated steam 6C.6. The water rich flow 6C.5, at a high temperature that is close to the produced emulsion temperature, is pumped into a SD-DCSG 6C.7 where it is mixed with the dry superheated steam 6C.6 to generate additional steam 6C.2 for injection. Light hydrocarbons in flow 6C.5 evaporate due to the heat required to generate hydrocarbons that are injected with the injection steam 6C.2 into the underground formation 6C.11. Additional solvents can be added to the injection steam 6C.2—it is a common practice to add solvents to the generated steam for injection. It is known that hydrocarbons that are mixed with the steam can improve the oil recovery. The SD-DCSG 6C.7 includes rotating internals to enhance the mixture between the two phases and to mobilize the generated slurry and solids. The solids 6C.8 are removed from the system for landfill disposal 6C.13 or for any other use. The heat energy within flow 6C.5 from separator 6C.3 increases the quantity of steam generated in SD-DCSG 6C.7 and by that improves the overall thermal efficiency of the system. The generated steam 6C.2 is injected, possibly after additional contaminate removal treatment and pressure control (not shown), into an injection well 6C.11 for EOR. The SD-DCSG 6C.7 is a parallel flow steam generator, as described by parallel flow system 3E.1 in FIG. 3E, however, any other SD-DCSG design like the counter flow SD- DCSG as described by counter flow system 3E.15 in FIG. 3E, or the rotating or fluid bed units as described in drawings 2C, 2D and 3C-3J can be used as well.

Figure 6D:
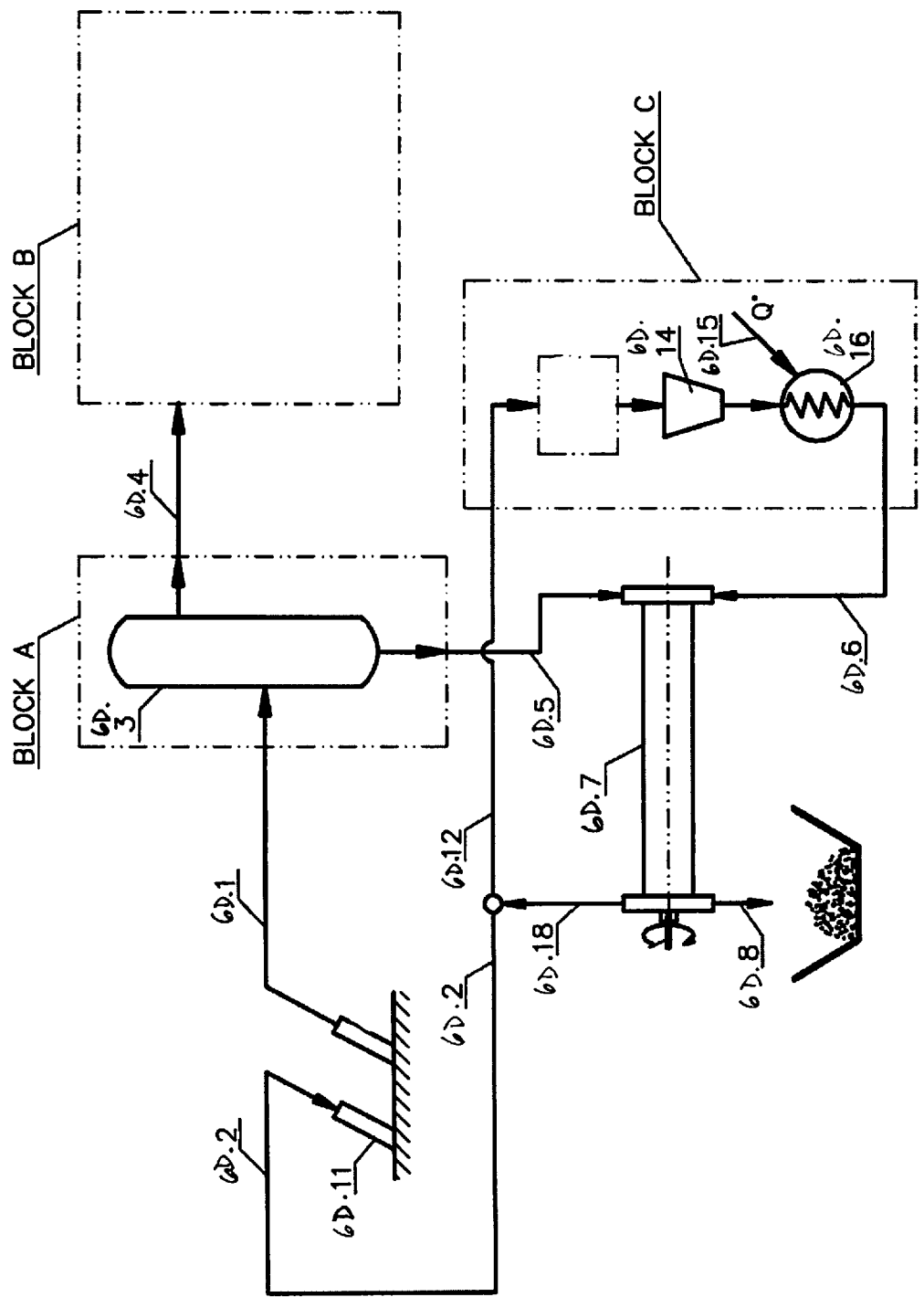
FIG. 6D shows a schematic view of a SD-DCSG similar to the system in FIG. 6C.

FIG. 6D includes a SD-DCSG similar to the system in 6C, where the superheated driving steam is generated by recycling and re-heating the produced steam generated by the SD-DCSG 6D.7. A mixture of steam, water, bitumen and gas is produced from a production well 10, like a SAGD well. The produced flow 6D.1 is separated in a separator 6D.3 located in BLOCK A to generate water rich flow 6D.5 and hydrocarbons rich flow 6D.4. There are a few commercial designs for separators that are currently used by the industry. Chemicals can be added to the separation process. The hydrocarbon rich flow is further treated in a processing plant at BLOCK B. The water rich flow 6D.5, possibly with hydrocarbons and other contaminates like sand, is at a high temperature that is close to the produced emulsion temperature. The heat energy within flow 6D.5 increases the quantity of steam generated in SD-DCSG 6D.7 for a given amount of superheated driving steam 6D.6. Flow 6D.5 is pumped into a SD-DCSG 6D.7 where it is mixed with dry superheated steam 6D.6 to generate additional steam 6D.18. Any available design for mixing the water and the steam to generate additional steam and solids or slurry discharge can be used as well. The solids or slurry 6D.8 are removed from the system for landfill disposal 6D.13 or for any other use. The produced steam 6D.18 is split into two flows—flow 6D.2 of the generated steam 6D.18 is injected, possibly after additional contaminate removal treatment and pressure control (not shown), into an injection well 6D.11 for EOR. The other part of flow of steam 6D.18, flow 6D.12, is recycled back to BLOCK C. Depending on the recycled steam quality and the feed requirements of the compressing and heating units, it can be pre-cleaned by any commercially available cleaning technologies. The recycled produced steam is compressed by a mechanical compressor, steam ejector or any other available unit 6D.14 and then indirectly heated by heat flow 6D.15 to generate a super heated driving steam 6D.6. The heating can be done with any available heating unit that can heat steam, possibly with hydrocarbons remains. Electrical heaters for small units, carbon (like coal, petcoke etc.) combustion units for large scale, or hydrocarbon fired (like natural or produced gas, bitumen etc.) for medium and large size units can be used as facility 6D.16 for heating the produced steam, possibly with small amounts of hydrocarbon gas to generate the dry, superheated driving steam 6D.6. The superheated driving steam 6D.6 is injected to the SD-DCSG 6D.7 where it is mixed with the produced water 6D.5.

Figure 6E:
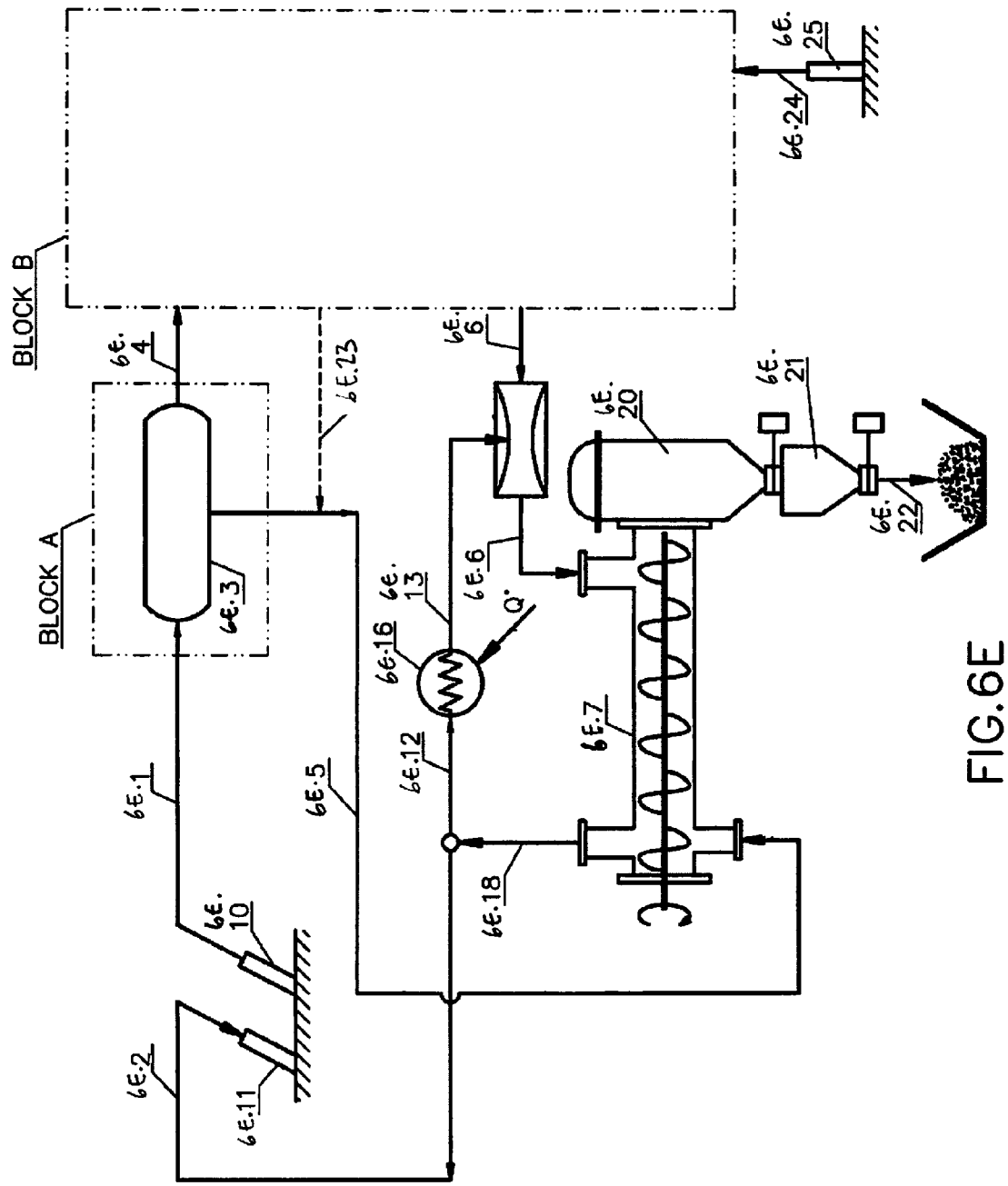
FIG. 6E is a schematic view of the SD-DCSG with similarities to FIG. 6D and with externally supplied make-up HP steam.

FIG. 6E is a schematic view of the SD-DCSG with similarities to FIG. 6D and with externally supplied make-up HP steam. A mixture of steam, water, bitumen and gas is produced from a production well 6E.10, like a SAGD well. The produced flow 6E.1 is separated in a separator 6E.3 located in BLOCK A to generate water rich flow 6E.5 and hydrocarbons rich flow 6E.4. There are a few commercial designs for separators that can be used. Chemicals can be added to the separation process. The hydrocarbon rich flow is further treated in a commercially available oil and water processing plant at BLOCK B. There are commercially available technologies and designs for such plants—some are used by the oilsands thermal insitue industry (like SAGD processing plant). The water rich flow 6E.5, possibly with hydrocarbons and other contaminates like sand, is at a high temperature close to temperature of the produced emulsion or produced flow 6E.1. Flow 6E.5 is pumped into a SD-DCSG 6E.7 where it is mixed with dry superheated steam 6E.6 to generate additional steam 6E.18. The SD-DCSG is a counter flow design as described by counter flow system 3E.15 in FIG. 3E. Any available design for mixing the water and the steam to generate additional steam and solids rich water can be used as well. The solids or slurry is removed from the system through separator 6E.20 and de-compression system 6E.21 in a stable form 6E.22. The produced steam 6E.18 is split into two flows— flow of steam 6E.2 of the generated steam 6E.18 is injected, possibly after additional contaminate removal treatment and pressure control (not shown), into an injection well 6E.11 for EOR or for any other usage in the mining industry or in any other industry that required large quantities of steam. Additional solvents can be added to the injection steam 6E.2—it is a common practice to add solvents to the generated steam for injection. The other part from flow of steam 6E.18, flow of steam 6E.12, is recycled to be re-heated and used as the superheated driving steam. In non-direct contact heater 6E.16, additional heat Q is added to the steam 6E.12 to generate superheated dry steam 6E.13. The heating can be done with any available heating facility. This superheated steam is compressed with the pressure energy from High Pressure (HP) make-up steam 6E.6 generated in BLOCK B. The make-up steam is produced from the produced water that remains in flow 6E.4. The produced water is treated in the process facility in BLOCK B that includes de-oiling and possibly de-mineralization before being used in a commercially available high pressure boiler or OTSG for generating high pressure steam 6E.6. Additional make-up water 6E.24 is usually required to compensate for the water loss in the formation and for the waste water rejected from the water treatment facility in BLOCK B. The make-up water is usually supplied from a water well 6E.25 or can be from any available water source. Disposal water 6E.23 from the water processing facility in BLOCK B, possibly with oil and solids, can be recycled to the SD-DCSG 7 together with stream 6E.5 as the water feed to 6E.7.

Figure 6F:
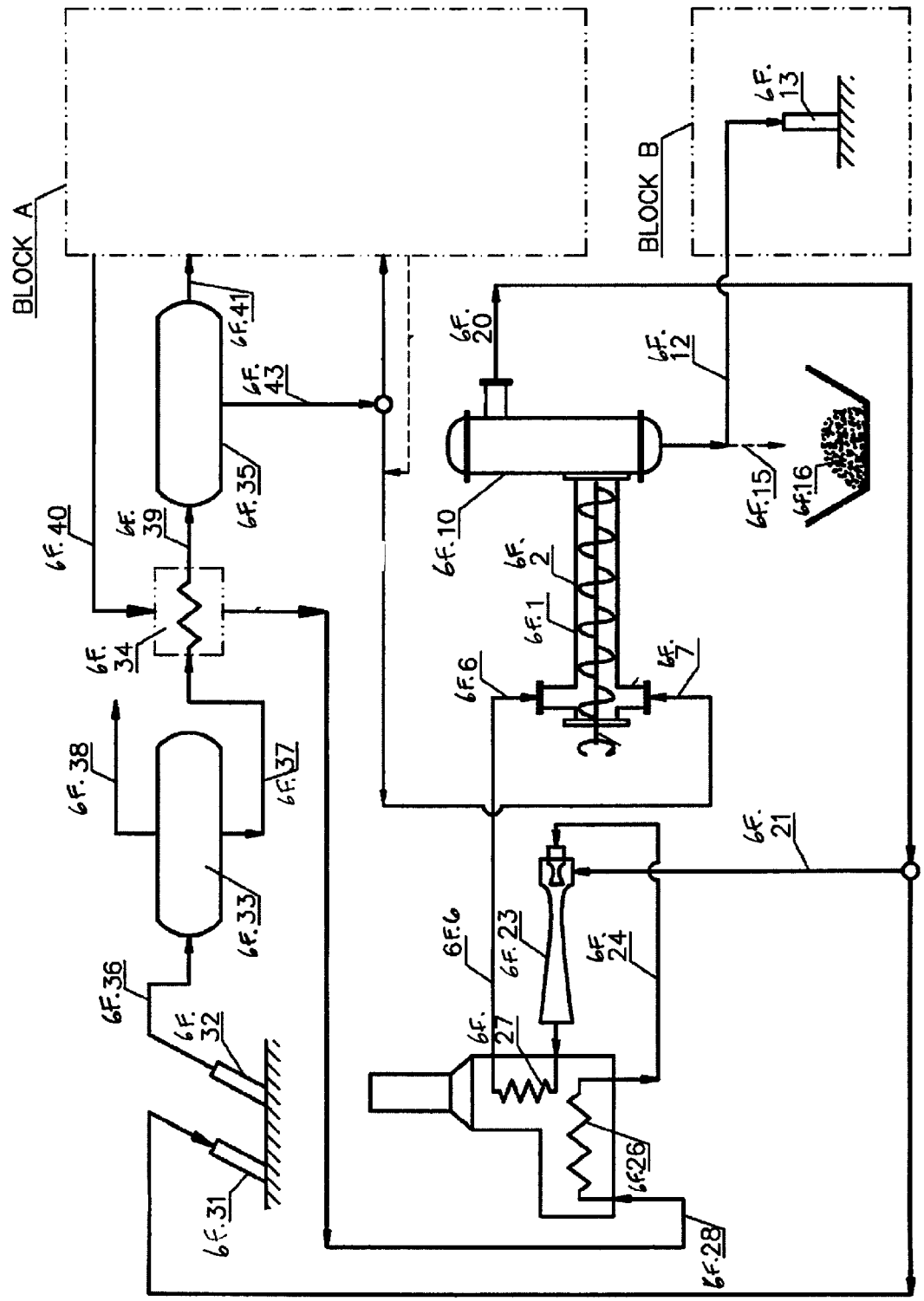
FIG. 6F shows a schematic view of another embodiment of the present invention for generating steam for oil extraction with the use of a steam boiler and steam heater.

FIG. 6F describes another embodiment of the present invention for generating steam for oil extraction with the use of a steam boiler and steam heater. A mixture 6F.36 of steam, water, bitumen and gas is produced from a production well 6F.32, like a SAGD production well. The produced flow of mixture 6F.36 is separated in a separator 6F.33 to separate the produced gas 6F.38 from the produced liquids 6F.37. The produced gas 6F.38 can include reservoir gas, mainly light hydrocarbons and possibly lifting gas, in case lifting gas is used to lift the produced liquids to the surface (not shown). The produced gas is used in the process as lifting gas. It can also used as fuel for the boilers. The produced liquid emulsion 6F.37 is cooled in heat exchanger 6F.34 while heating the boiler feed water 6F.40 to generate pre-heated boiler feed water. The cooled liquid mixture 6F.39, after the produced gas was already removed, is fed into separator 6F.35. Chemicals, sometimes with solvents like light hydrocarbons, can be added to the produced liquid mixture 6F.39 to support the separation process, break the emulsion, and prevent foaming. The separation vessel or separator 6F.35 separates the water liquid 6F.43 from the bitumen and oil 6F.41. The separation process is a well known process within the heavy oil industry. The gas separator reactor or separator 6F.33 and the water-oil separator reactor or separator 6F.35 are commercially available units. Any additional configuration to enhance the gas-water-oil separation can be used as well. The produced bitumen and oil 6F.41 is further treated in a commercially available process area BLOCK 1 commonly used with the insitue thermal oil recovery industry, like SAGD or CSS. Solvents can be added to the produced bitumen and oil 6F.41 to remove the water remains and other contaminates. BLOCK A includes a commercially available water treatment facility, like evaporators, to generate boiler feed quality water 6F.40. The water feed to the water treatment plant in BLOCK 1 can be from the water remains of bitumen and oil 6F.41. Additional water can be directed to the water treatment plant from water liquid 6F.43 that was separated in vessel or separator 6F.35. The produced water used as feed to the boiler feed water treatment plant is de-oiled to remove oil traces that can impact the water treatment process in BLOCK 1. Additional make-up water can be added to the process in BLOCK 1 from any other water source, such as water wells. Usually the make-up water does not include organic contaminates so it is easier to treat them with evaporators and other commercially available distillation units. (See Society of Petroleum Engineers paper No 137633-MS Titled "Integrated Steam Generation Process and System for Enhanced Oil Recovery" presented by M. Betzer at the Canadian Unconventional Resources and International Petroleum Conference, 19-21 Oct. 2010, Calgary, Alberta, Canada.) The produced water flow 6F.7, possibly with solids contaminates and oil remains, is mixed with superheated steam 6F.6. Due to the contaminates within the produced water flow 6F.7, a rotating internal 6F.2 is used to enhance the mixture and remove build-ups within enclosure 6F.1. Due to the driving steam's 6F.6 high temperatures (compared to the saturated steam temperature at the system pressure), liquid water from Flow 6F.7 is converted to steam. The amount of water converted is a function of the ratio of the driving steam 6F.6 and the liquid water flow 6F.7. If disposal wells are available, it is possible to convert only a portion 6F.12 of the water into steam and dispose of the remaining water with the contaminated solids in a disposal well 6F.13. Heat can be recovered from the disposal liquid flow or portion 6F.12 thereof through a heat exchanger (not shown). The produced steam 6F.20 is separated from the disposal flow of the portion 6F.12 or slurry 6F.15 in a separation enclosure 6F.10. If disposal wells for disposing fluids are not available, or a ZLD facility is preferred, most of the water 6F.7 can be converted into steam, generating solids or a stable slurry 6F.15 for landfill disposal 6F.16 or for further treatment. The produced steam 6F.20 is used for injection for thermal oil recovery through an injection well. A portion of steam 6F.21 of the produced steam 6F.20 is used to generate the driving superheated steams 6F.6. The clean BFW 6F.28 is used for generating steam through a commercial boiler or OTSG that includes a heat exchanger 6F.26 to generate High Pressure steam 6F.24. Any type of commercially available boiler and steam separation vessel can be used. The produced HP steam 6F.24 pressure energy is used to recycle steam 6F.21 to heater 6F.27 to generate superheated dry steam stream 6F.6 to drive the steam generation process at enclosure 6F.1. The pumping and circulation of the produced steam 6F.21 is done through steam ejector 6F.23 that uses the pressure of the HP steam as the energy source to compress and circulate portion of steam 6F.21 of the produced steam 6F.20 through the heat exchanger or heater 6F.27. As described in the other examples, the produced steam 6F.21 can be further treated in a separate unit to remove contaminates, like silica, from the produced steam flow that can affect the super heater heat exchanger's or heater's 6F.27 performance and create deposits. There are a few technologies that can be used. One option is to use a liquid scrubber with saturated liquid water, possibly with chemicals, like magnesium oxide, caustic soda or other chemical additives, to remove contaminates that can affect the performance of the non-direct heat exchanger or heater 6F.27, or in some cases the steam lines and the injection well 6F.31. Other technological solutions available to remove the undesired contaminates from the steam gas flow can be used as well. The feed water 6F.40 is a treated water with low levels of contaminates, as required by ASME specifications for boiler feed water. There is a lot of knowledge and commercially available packages to generate the BFW 6F.40 used for generating the high pressure steam 6F.24. In the current sketch, the boiler integrates the steam generation section 6F.26 and the re-heater section of heater 6F.27 for generating super-heated driving steam 6F.6 from the produced steam 6F.21 and the high pressure driving steam 6F.24 for operating the ejector and using the super-heated steam as a driving steam. It is possible to separate the production of the high pressure steam 6F.24 from the superheated steam into two separate units while the steam 6F.24 is generated through a package boiler, OTSG or any other type of commercially available boiler, with any type of carbon or hydrocarbon fuel. The produced steam 6F.21 is heated to generate superheated driving steam with any commercially available heat exchanger design. The heater can be integrated into the boiler or a separate unit with any available heater design. The steam generation unit can be located on the well pads or in close proximity to the well pads. This arrangement will minimize the heat losses and allow the use of the produced water heat. The high pressure steam 6F.24 required to operate the ejector can also be produced remotely in BLOCK 1, whereas on the pad there will only be steam heater 6F.27.

Figure 7:
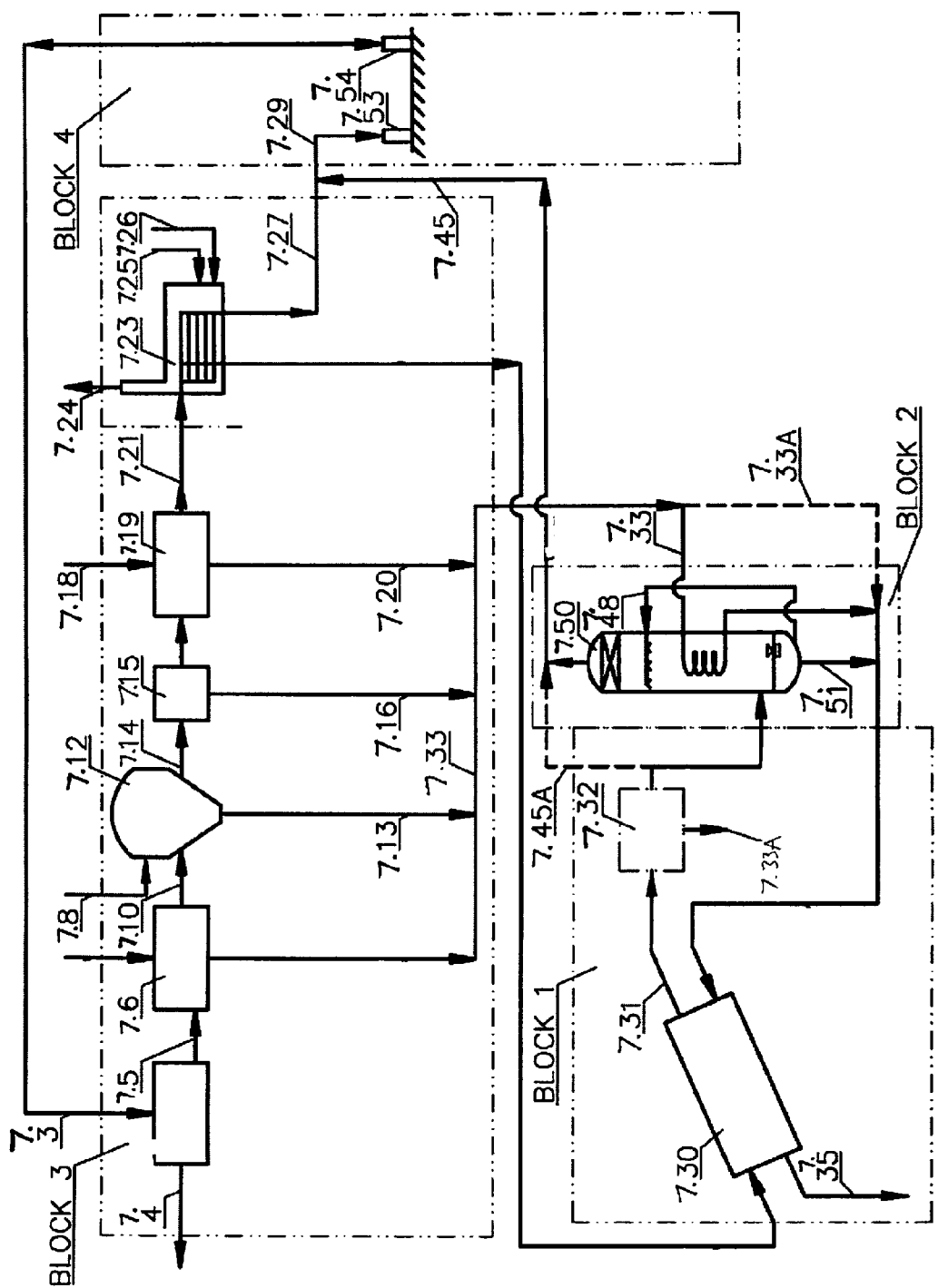
FIG. 7 is a schematic view of an integrated facility of the present invention with a commercially available steam generation facility and for EOR for heavy oil production.

FIG. 7 is a schematic view of an integrated facility of the present invention with a commercially available steam generation facility and for EOR for heavy oil production. The steam for EOR is generated using a lime softener based water treatment plant and an OTSG steam generation facility. This type of configuration is the most common in EOR facilities in Alberta. It recovers bitumen from deep oil sand formations using SAGD, or CSS, etc. Produced emulsion 7.3 from the production well 7.54, is separated inside the separator facility into bitumen 7.4 and water 7.5. There are many methods for separating the bitumen from the water. The most common one uses gravity. Light hydrocarbons can be added to the product to improve the separation process. The water, with some oil remnants, flows to a produced water de-oiling facility 7.6. In this facility, de-oiling polymers are added. Waste water, with oil and solids, is rejected from the de-oiling facility 7.6. In a traditional system, the waste water would be recycled or disposed of in deep injection wells. The de-oiled water 7.10 is injected into a warm or hot lime softener 7.12, where lime, magnesium oxide, and other softening chemicals 7.8 are added. The softener generates sludge 7.13. In a standard facility, the sludge is disposed of in a landfill. The sludge is semi-wet, and hard to stabilize. The softened water 7.14 flows to a filter 7.15 where filter waste is generated 7.16. The waste is sent to an ion-exchange package 7.19, where regeneration chemicals 7.18 are continually used and rejected with carry-on water as waste 7.20. In a standard system, the treated water 7.21 flows to an OTSG 7.23 where approximately 80% quality steam 7.27 is generated. The OTSG 7.23 typically uses natural gas 7.25 and air 7.26 to generate steam. The flue gas is released to the atmosphere through a stack 7.24. Its saturated steam pressure is around 100 bar and the temperature is slightly greater than 300 C. In a standard SAGD system, the steam is separated in a separator to generate 100% steam 7.29 (for EOR) and blow-down water. The blow down water can be used as a heat source and can also be used to generate low pressure steam. The steam, 7.29 is delivered to the pads, where it is processed and injected into the ground through an injection well 7.53. In the current method, additional dry superheated steam flow is produced to drive the SD-DCSG in BLOCK 1 to generate additional injection steam from the waste water stream. The production well 7.54, located in the EOR field facilities BLOCK 4, produces an emulsion 7.3 of water and bitumen 3. In some EOR facilities, injection and production occur in the same well, where the steam can be 80% quality steam 7.27. The steam is then injected into the well with the water. This is typical of the CSS pads where wells 7.53 and 7.54 are basically the same well. The reject streams include the blow down water from OTSG 7.23, as well as the oily waste water, solids, and polymer remnants from the produced water de-oiling unit. This also includes sludge 7.13 from the lime softener, filtrate waste 7.16 from the filters and regeneration waste from the Ion-Exchange system 7.20. The reject streams 7.33 are collected and injected directly 7.33A into Steam SD-DCSG 7.30 in BLOCK 1. The SD-DCSG can be vertical, stationary, horizontal or rotating. Dry solids 7.35 are discharged from the SD-DCSG, after most of the liquid water is converted to steam. The SD-DCSG generated steam 7.31 temperatures can vary between 120 C and 300 C. The pressure can vary between 1 bar and 50 bar. The produced steam 7.32 can be injected directly through flow 7.45A into the injection well 7.53, possibly after additional solids and contamination removal in BLOCK 2. Another option is to wash the generated steam in wet scrubber 7.50 in BLOCK 2. BLOCK 2 is optional and can be bypassed by flows of steam 7.33A and flow 7.45A. The produced steam from the SD-DCSG 7.30 is injected into a scrubber vessel 7.50 where the steam gas is washed with saturated water 7.48 that was condensed from the produced gas 7.31 or from additional liquid water supplied to the wet scrubber vessel 7.50 in order to remove the solid remnants and possibly chemical contaminates. Solid rich water 7.51 is continually removed from the bottom of vessel 7.50. It is recycled back to the SD-DCSG, where the solids 7.35 are removed in dry or semi-dry form. The liquid water is converted back to steam 7.31. The saturated wash water in vessel 7.50 is generated by removing heat through non-direct heat exchange with the feed water 7.33A. A portion of the steam condenses to generate washing liquid water at vessel 7.50. The liquid water is continually recycled to enhance the washing and the wet scrubbing. The SD-DCSG is driven by superheated steam generated by the steam generator 7.23 or generated in a separate boiler or in a separate heat exchanger within the boiler (re-heater type heat is exchanged to heat steam to produce a superheated steam). There are many varieties of commercially available options to generate the dry steam needed to drive the process in the SD-DCSG. The generated clean steam 7.45 is injected into an underground formation for EOR.

Figure 8:
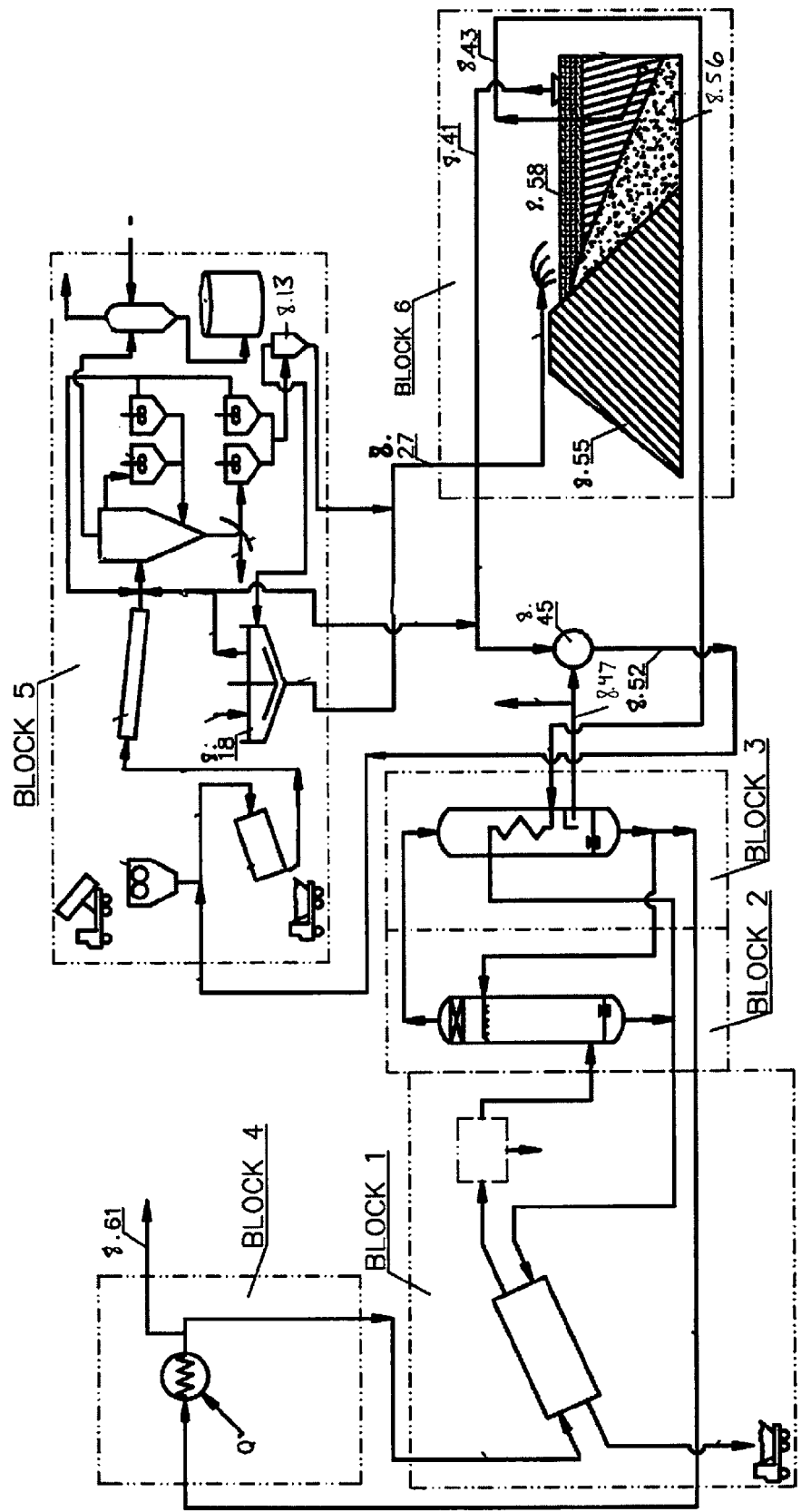
FIG. 8 is a schematic view of the invention with an open mine oilsands extraction facility.

FIG. 8 is a schematic of the invention with an open mine oilsands extraction facility, where the hot process water for the ore preparation is generated from condensing the steam produced from the fine tailings using a SD-DCSG. A typical mine and extraction facility is briefly described in BLOCK 5. The tailing water 8.27 from the oilsand mine facility is disposed of in a tailing pond. The tailing ponds are built in such a way that the sand tailings are used to build the containment areas for the fine tailings. The tailing sources come from Extraction Process. They include the cyclone underflow tailings 8.13, mainly coarse tailings, and the fine tailings from the thickener 8.18, where flocculants are added to enhance the solid settling and recycling of warm water. Another source of fine tailings is the Froth Treatment Tailings, where the tailings are discarded using the solvent recovery process characterized by high fines content, relatively high asphaltene content, and residual solvent. (See "Past, Present and Future Tailings, Tailing Experience at Albian Sands Energy" a presentation by J. Matthews from Shell Canada Energy on Dec. 8, 2008 at the International Oil Sands Tailings Conference in Edmonton, Alberta). A sand dyke 8.55 contains a tailing pond. The sand separates from the tailings and generates a sand beach 8.56. Fine tailings 8.57 are put above the sand beach at the middle-low section of the tailing pond. Some fine tailings are trapped in the sand beach 8.56. On top of the fine tailings is the recycled water layer 8.58. The tailing concentration increases with depth. Close to the bottom of the tailing layer are the MFT. (See "The Chemistry of Oil Sands Tailings: Production to Treatment" presentation by R. J. Mikula, V. A. Munoz, O. E. Omotoso, and K. L. Kasperski of CanmetENERGY, Devon, Alberta, Natural Resources Canada on Dec. 8, 2008 at the International Oil Sands Tailings Conference in Edmonton, Alberta). The recycled water 8.41 is pumped from a location close to the surface of the tailing pond (typically from a floating barge). The fine tailings that are used for generating steam and solid waste in this invention are the MFT. They are pumped from the deep areas of the fine tailings 8.43. MFT 8.43 is pumped from the lower section of the tailing pond and is then directed to the SD-DCSG in BLOCK 1 and in BLOCK 3. The SD-DCSG that includes BLOCKS 1-4 is described in FIG. 5B. However, any available SD-DCSG that can generate gas and solids from the MFT can be used as well. Due to the heat from the superheated steam and pressure inside the SD-DCSG, the MFT turns into gas and solids as the water is converted to steam. The solids are recovered in a dry form or in a semi-dry, semi-solid slurry form. The semi-dry slurry form is stable enough to be sent back into the oilsands mine without the need for further drying to support traffic. The produced steam needed for extraction and froth treatment, is generated by a standard steam generation facility 8.61 used to generate the driving steam for the DCSG in BLOCK 1, or from the steam produced from the SD-DCSG 62. The generated saturated steam 8.47 is mixed with the process water 8.41 in mixing enclosure 8.45 to generate the hot water 8.52 used in the extraction process in BLOCK 5. By continually consuming the fine tailing water 8.43, the oil sand mine facility can use a much smaller tailing pond as a means of separating the recycled water from the fine tailings. This solution will allow for the creation of a sustainable, fully recyclable water solution for open mine oilsands facilities.

Figure 9:
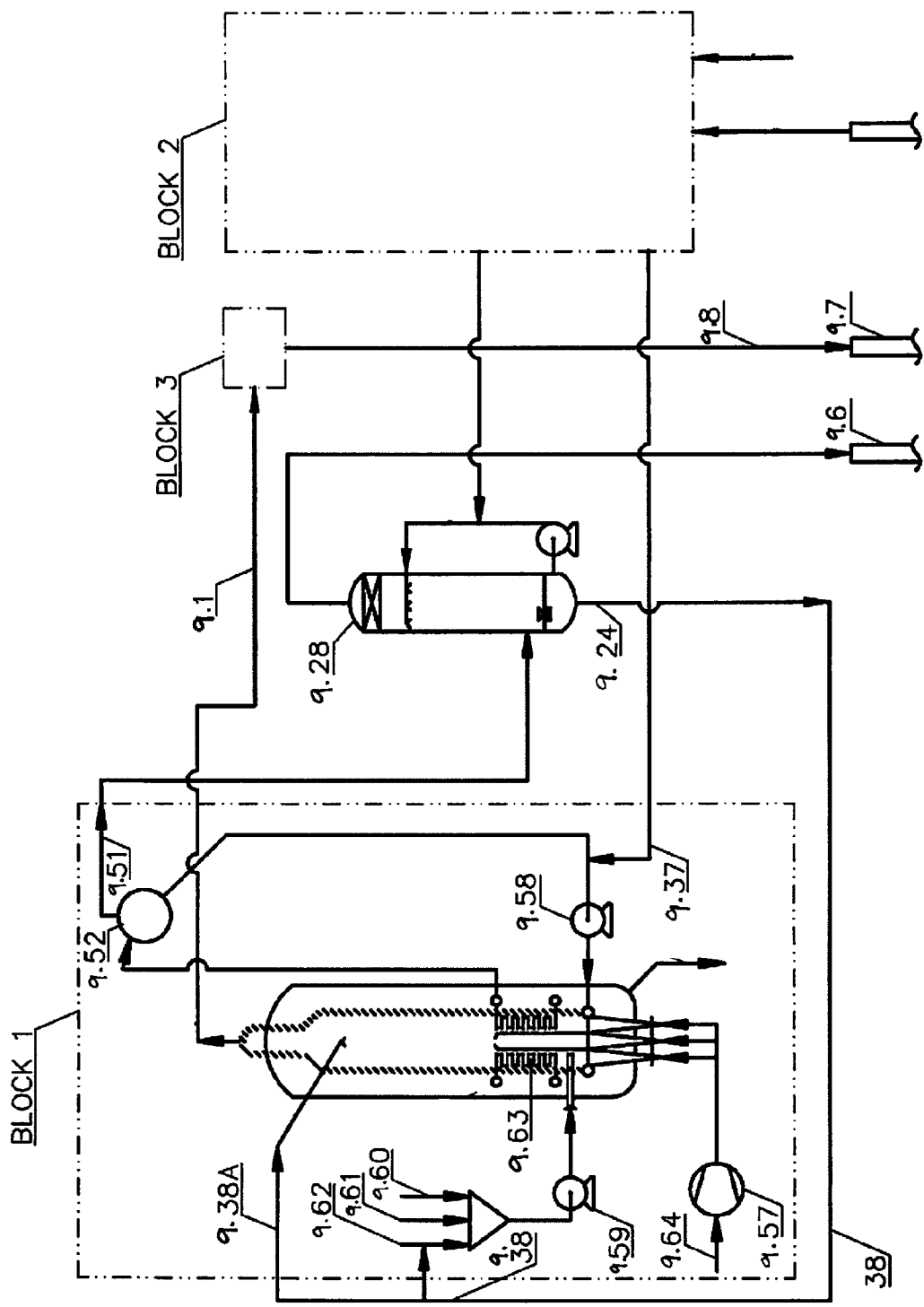
FIG. 9 is another schematic view of the invention with an open mine oilsands extraction facility and a pressurized fluid bed boiler.

FIG. 9 is a schematic view of the invention with an open mine oilsands extraction facility and a prior art commercially available pressurized fluid bed boiler that uses combustion coal for a power supply. Examples of pressurized boilers are the Pressurized Internally Circulating Fluidized-bed Boiler (PICFB) developed and tested by Ebara, and the Pressurized-Fluid-Bed-Combustion-Boiler (PFBC) developed by Babcock-Hitachi. Any other pressurized combustion boiler that can combust petcoke or coal can be used as well. BLOCK 1 is a prior art Pressurized Boiler. Air 9.64 is compressed 9.57 and supplied to the bottom of the fluid bed combustor to support the combustion. Fuel 9.60, like petcoke, is crushed and grinded, possibly with lime stone 9.61 and water 9.62, to generate pumpable slurry 9.59. The water 9.62 is recycled water with a high level of contaminates 9.38, as discharged from the SD-DCSG 9.28. Some portion of stream 9.38A can be injected above the combustion area to directly recover heat from the combustion gas to generate steam. The boiler includes an internal heat exchanger 9.63 to generate high pressure steam 9.51 to drive the SD-DCSG. The steam 9.51 is generated from steam boiler drum 9.52 with boiler water circulation pump 9.58. The boiler heat exchanger 9.63 recovers energy from the combustion. BFW 9.37 is fed to the boiler to generate steam 9.51. The steam can be heated again in a boiler heat exchanger (not shown) to generate a superheated steam stream. The steam is used to drive the SD-DCSG 9.28. The boiler generates pressurized combustion gas and steam mixture 9.1 from the SD-DCSG discharged water 9.24 at an average pressure of 103 kpa and up to 1.5 Mpa, and temperatures of 200 C-900 C. The discharge flow is treated in BLOCK 3 to generate a steam and combustion gas mixture for EOR. The mixture 9.8 is injected into an underground formation through an injection well 9.7. There is no need to remove solids from the combustion gas mixture 9.1 because this gas mixture is fed to the DCSG in BLOCK 3 that works as a wet scrubber and removes solids and possibly contaminated gases like SOx and NOx while creating a steam and combustion gas mixture. Solids from the fluid bed of the PFBC can be recovered to maintain the fluid bed solids level (this is a common practice in FBC (Fluid Bed Combustion) and PFBC). The fluid bed solids can be mixed with the DCSG solids from BLOCK 3 (not shown). The pressurized combustion gases leaving AREA#1 are mixed with the concentrate effluent from SD-DCSG 9.28 and possibly with other low quality waste water and slurry sources, like HLS/WLS sludge produced by SAGD/CSS water treatment plant (not shown). BLOCK 2 includes a commercially available EOR facility, like SAGD, where the water and bitumen emulsion is treated to generate BFW quality water and low quality water that is fed into the SD-DCSG. There will be two types of injection wells—for the injection of pure steam 9.6 from the SD-DCSG and for the injection of a mixture of steam and combustion gases, mainly CO2 into the well 9.7. It is possible to combine the two types of EOR fluids in one production facility where the aging injection wells will be converted from pure steam to a steam and combustion gas mixture to pressurize the underground formation and increase the bitumen recovery due to the dissolved CO2 which increases the bitumen fluidity.

Figure 10:
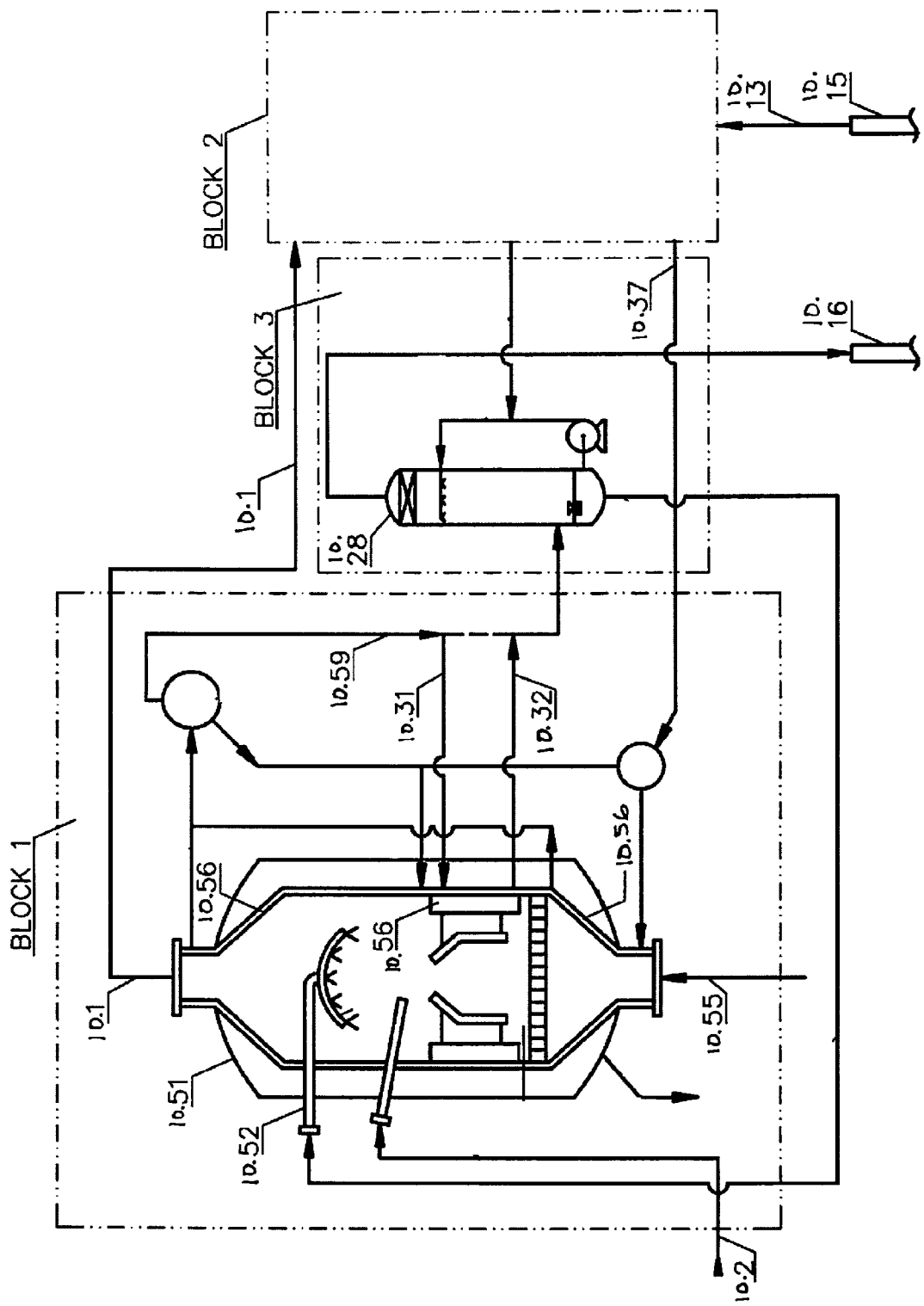
FIG. 10 is a schematic diagram of DCSG pressurized boiler and SD-DCSG.

FIG. 10 is a schematic diagram of DCSG pressurized boiler and SD-DCSG. Fuel 10.2 is mixed with air 10.55 and injected into a Pressurized Fluidized-Bed Boiler 10.51. The fuel 10.2 can be generated from the water-bitumen separation process and includes reject bitumen slurry, possibly with chemicals that were used during the separation process, and sand and clay remains. Additional low quality carbon fuel can be added to the slurry. This carbon or hydrocarbon fuel can include coal, petcoke, asphaltin or any other available fuel. Lime stone can be added to the fuel 10.2 or to the water 10.52 to remove acid gases like SOx. The Fluidized-Bed boiler is modified with water 10.52 injected to convert into a DCSG. It includes reduced capacity internal heat exchangers to recover less combustion heat. The reduction in the heat exchanger's required capacity is because more combustion energy will be consumed due to the direct heat exchange with the water within the fuel slurry or fuel 10.2 and the additional injected solids rich water 10.52 thereby leaving less available heat to generate high pressure steam through the boiler heat exchangers 10.56. The boiler produces high-pressure steam 10.59 from distilled, de-mineralized feed water 10.37. The produced steam 10.59, or part of it 10.31, can be re-heated in re-heater 10.56 to generate super heated steam 10.32 to operate the SD-DCSG in BLOCK 3. There are several pressurized boiler designs for BLOCK 1 that can be modified with direct water injections. One example of such a design is the EBARA Corp. PICFB (see paper No. FBC99-0031 Status of Pressurized Internally Circulating Fluidized-Bed Gasifier (PICFG) development Project dated 16-19 May, 1999 and U.S. Pat. No. RE37,300 E issued to Nagato et al on Jul. 31, 2001). Any other commercially available Pressurized Fluidized Bed Combustion (PFBC) can be used as well. Another modification to the fluid bed boiler can be reducing the boiler combustion pressure down to 102 kpa. This will reduce the plant TIC (Total Installed Cost) and the pumps and compressors' energy consumption. The superheated steam 10.32 is supplied to BLOCK 3 where it is used by the SD-DCSG 10.28 for generating additional steam from low quality water. BLOCK 2 includes a water treatment facility as previously described. The steam and combustion gas mixture stream 10.1 is supplied to BLOCK 2 where the water and heat can be used for generating clean BFW in the evaporation/distillation facility. The pressure energy in flow of mixture stream 10.1 can be used to separate CO2 from the NCG using commercially available membrane technologies. The combustion oxidizer, like air 10.55, is injected at the bottom of the boiler to maintain the fluidized bed. High pressure 100% quality steam 10.59 is generated from distilled water 10.37 through heat exchange inside the boiler 10.51. The generated steam 10.59 can be further heated in heat exchanger 10.56 to generate super-heated steam 10.32 that is used in BLOCK 3 as the driving steam for the SD-DCSG 10.28. The steam generated in BLOCK 3 is injected, through an injection well 10.16, into an underground formation for EOR. Hydrocarbons and water 10.13 are produced from the production well 10.15. The mixture is separated in a commercially available separation facility in BLOCK 2.

Figure 11:
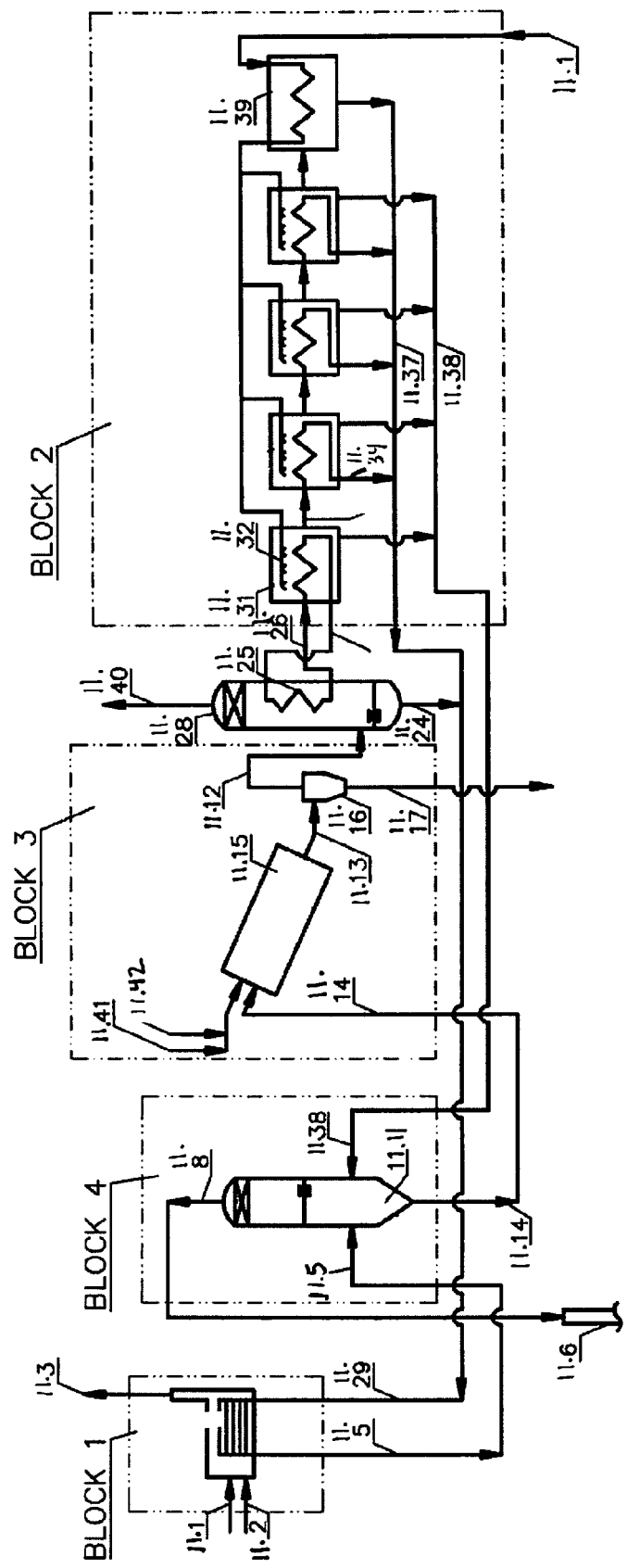
FIG. 11 is a schematic diagram of the present invention which includes a steam generation facility, SD-DCSG, a fired DCSG and MED water treatment plant.

FIG. 11 is a schematic diagram of the present invention which includes a steam generation facility, SD-DCSG, a fired DCSG and MED water treatment plant. BLOCK 1 is a standard, commercially available steam generation facility that includes an atmospheric steam boiler or OTSG 7. Fuel 11.1 and air 11.2 are combusted under atmospheric pressure conditions. The discharged heat is used to generate steam 11.5 from de-mineralized distilled water 11.29. The combustion gas is discharged through stack 11.3. The generated steam is supplied to SD-DCSG 11.11 in BLOCK 4 which generates additional steam from the concentrated brine 11.38 discharged from the MED in BLOCK 2. The generated steam 11.8 is injected into an underground formation 11.6. The liquid discharge 11.14 from SD-DCSG 11.11 is injected into an internally fired DCSG 11.15 in BLOCK 3. Carbon fuel 11.41, like petcoke or coal slurry, is mixed with oxygen-rich gas 11.42 and combusted in a DCSG 11.15. Discharged liquids from the SD-DCSG 11.11 are mixed with the pressurized combustion gas to generate a stream of steam-rich gas and solids 11.13. To reduce the amount of SO2, limestone can be added to the brine water 11.14 or to the fuel 11.41 injected into the DCSG, in order to react with the SO2. The solids are separated in separator 11.16. The separated solids 11.17 are discharged in a dry form from the solids separator 11.16 for disposal. The steam and combustion gas 11.12 flows to heat exchanger 11.25 and condenser 11.28. The steam in gas 11.12 is condensed to generate condensate 11.24. The condensate is treated (not shown) to remove contaminants and to generate BFW that is added to the distillate BFW 11.29 and then supplied to the steam generation facility. The NCG (Non-Condensation Gas) 11.40 is released to the atmosphere or used for further recovery, like CO2 extraction. The heat recovered in heat exchanger 11.28 is used to generate steam to operate the MED (a commercially available package). The water or fuel 11.1 fed to the MED is de-oiled produced water, possibly with make-up underground brackish water. The MED takes place in a series of vessels (effects) 11.31 and uses the principles of condensation and evaporation at a reduced pressure. The heat is supplied to the first effect 11.31 in the form of steam 11.26. The steam 11.26 is injected into the first effect 11.31 at a pressure ranging from 0.2 bar to 12 bar. The steam condenses while feed water 11.32 is heated. The condensation 11.34 is collected and used for boiler feed water 11.37. Each effect consists of a vessel 11.31, a heat exchanger, and flow connections. There are several commercial designs available for the heat exchanger area: horizontal tubes with a falling brine film, vertical tubes with a rising liquid, a falling film, or plates with a falling film. The feed water 11.32 is distributed on the surfaces of the heat exchanger and the evaporator. The steam produced in each effect condenses on the colder heat transfer surface of the next effect. The last effect 11.39 consists of the final condenser, which is continually cooled by the feed water, thus preheating the feed water or fuel 11.1. To improve the condensing recovery, the feed water can be cooled by air coolers before being introduced into the MED (not shown). The feed water may come from de-oiled produced water, brackish water, water wells or from any other locally available water source. The brine concentrate 11.38 is recycled back to the SD-DCSG in BLOCK 4.

Figure 11A:
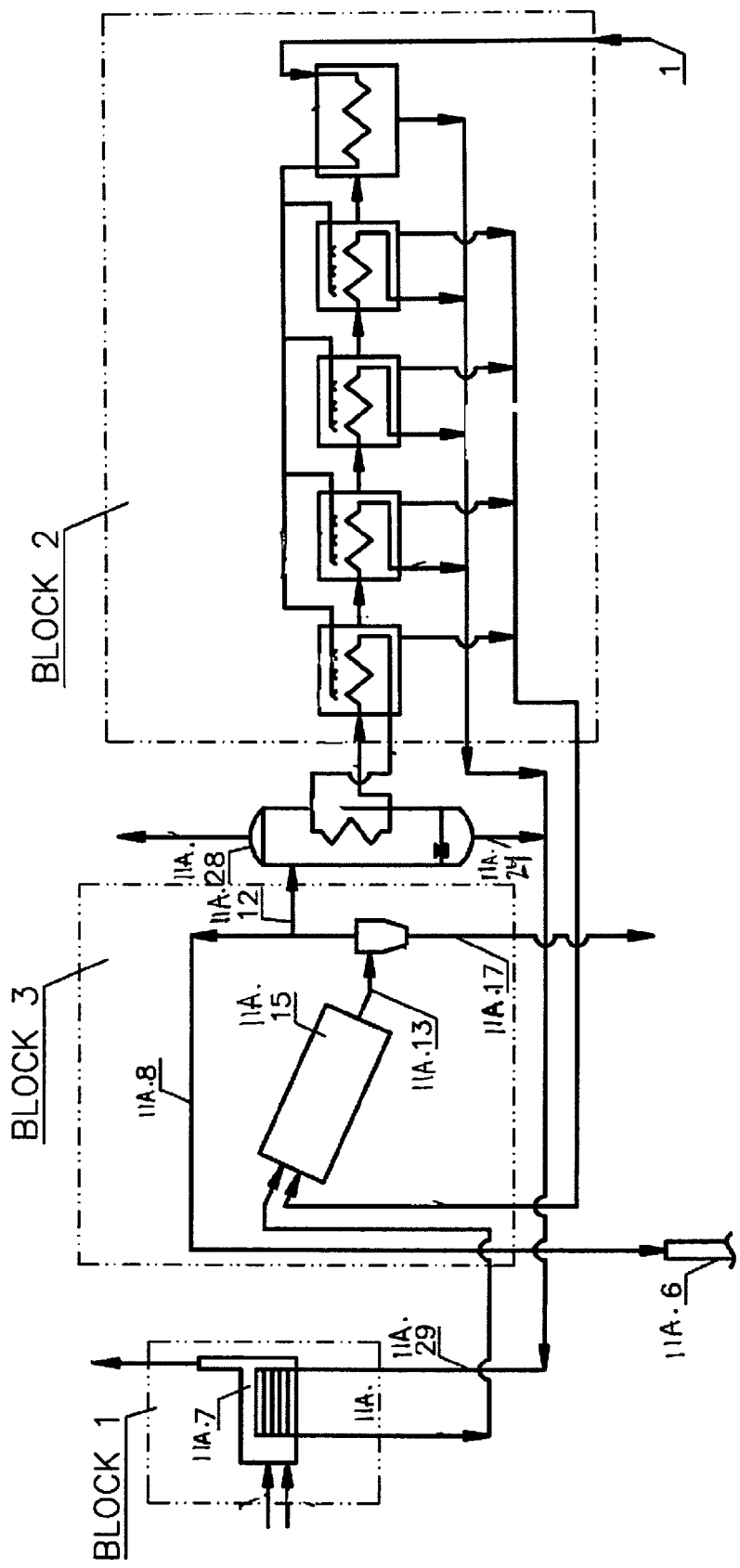
FIG. 11A is a schematic view of the present invention that includes a steam generation facility, SD-DCSG and MED water treatment plant.

FIG. 11A is a view of the present invention that includes a steam generation facility, SD-DCSG and MED water treatment plant. BLOCK 1 is a standard, commercially available steam generation facility for generating super heated driving steam 11A.5. The driving steam 11A.5 is fed to the SD-DCSG in BLOCK 3. Discharged brine from the commercial MED facility in BLOCK 2 is also injected into the SD-DCSG 11A.15 and converted into steam and solid particles 11A.13. The solids 11A.17 are removed for disposal. A portion of the generated steam 11A.12 is used to operate the MED through heat exchanger/condenser 11A.28. The condensate 11A.24, after further treatment (not shown), is used as BFW. The MED produces distilled BFW 11A.29 that is used to produce the driving steam at the boiler 11A.7. The steam 11A.8 is injected through injection well 11A.6 for EOR.

Figure 11B:
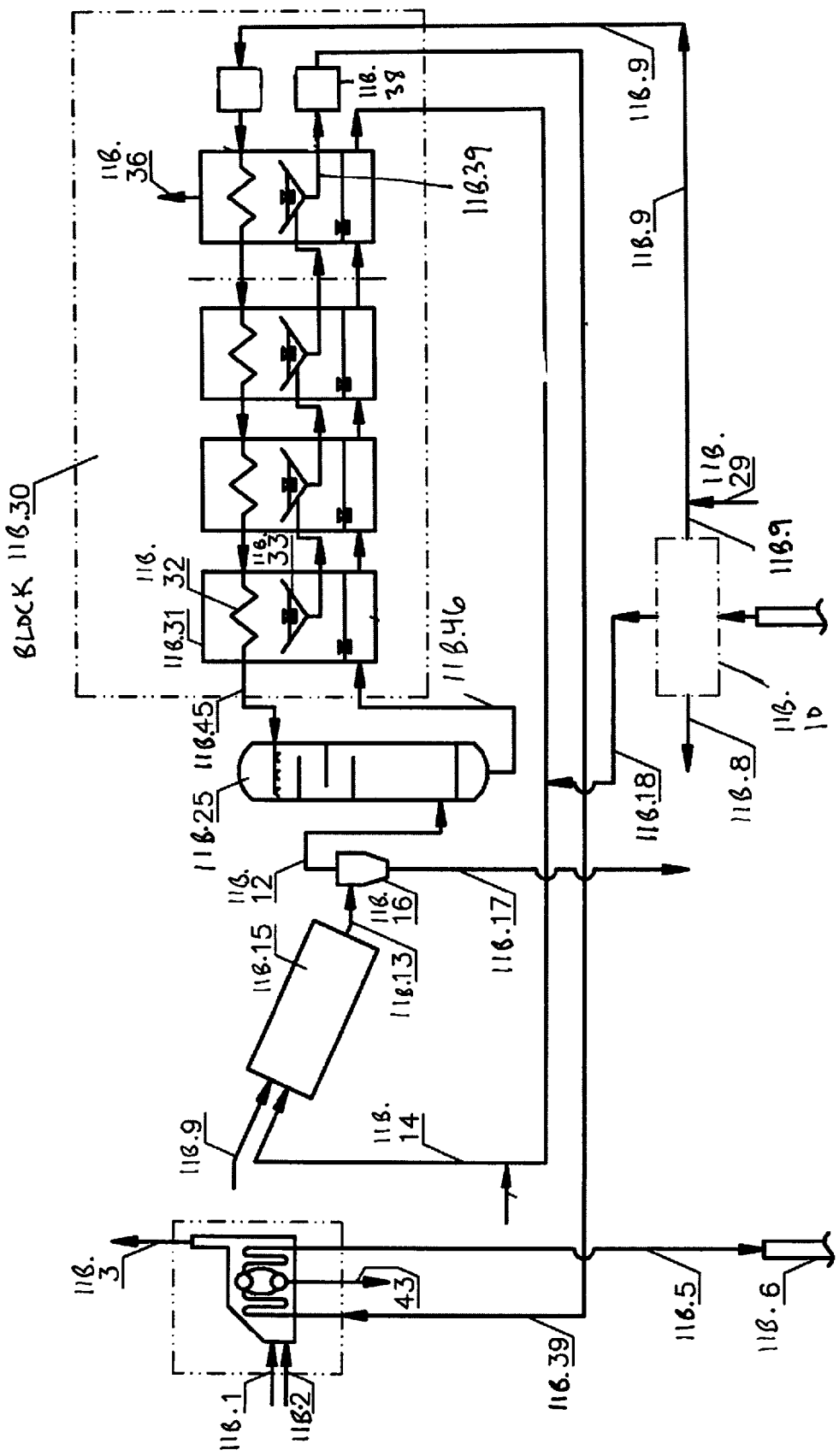
FIG. 11B is a schematic diagram of the present invention that includes a steam drive DCSG with a direct heated Multi Stage Flash (MSF) water treatment plant and a steam boiler for generating steam for EOR.

FIG. 11B is a schematic diagram of the present invention that includes a steam drive DCSG with a direct heated Multi Stage Flash (MSF) water treatment plant and a steam boiler for generating steam for EOR. BLOCK 4 includes a commercially available steam generation facility. Fuel 11B.2 is mixed with oxidized gas 11B.1 and injected into the steam boiler (a commercially available atmospheric pressure boiler). If a solid-fuel boiler is used, the boiler might include solid waste discharge. The boiler produces high-pressure steam 11B.5 from distilled BFW 11B.39. The steam is injected into the underground formation through injection well 11B.6 for EOR. A portion of the steam can be used to operate the DCSG. The boiler combustion gas may be cleaned and discharged from stack 11B.3. If natural gas is used as the fuel 11B.2, there is currently no mandatory requirement in Alberta for further treatment of the discharged flue gas or for removal of CO2. Steam 11B.9 injected into a pressurized DCSG 11B.15 at an elevated pressure. The DCSG design can be a horizontal sloped rotating reactor, however any other reactor that can generate a stream of steam and solids can also be used. Solids-rich water 11B.14 that includes the brine from the MSF is injected into the direct contact steam generator 11B.15 where the water evaporates into steam and the solids are carried on with gas flow 11B.13. The amount of water 11B.14 is controlled to verify that all the water is converted into steam and that the remaining solids are in a dry form. The solids-rich gas flow 11B.13 flows to a dry solids separator 11B.16. The dry solids separator is a commercially available package and it can be used in a variety of gas-solid separation designs. The removed solids 11B.17 are taken to a land-fill for disposal. The steam flows to tower 11B.25. The tower acts like a direct contact heat exchanger. Typically in MSF processes, the feed water is heated in a vessel called the brine heater. This is generally done by indirect heat exchange by condensing the steam on tubes that carry the feed water through the vessel. The heated water then flows to the first stage. In the method described in FIG. 11B, the feed water 11B.45 of MSF is heated by direct contact heat exchange in tower 11B.25 (and not through an indirect heat exchanger). The feed water is injected into the up-flowing steam flow 11B.12. The steam condenses because of heat exchange with the feed water 11B.45. A non-direct heat exchanger/condenser can be used as well to heat brine flow of feed water 11B.45 with steam flow 11B.12 while condensing the steam flow 11B.12 to liquid water. In the MSF at BLOCK 11B.30, the heated feed water 11B.46 flows to the first stage 11B.31 with a slightly lower pressure, causing it to boil and flash into steam. The amount of flashing is a function of the pressure and the feed water temperature, which is higher than the saturated water temperature. The flashing will reduce the temperature to the saturate boiling temperature. The steam resulting from the flashing water is condensed on heat exchanger 11B.32, where it is cooled by the feed water. The condensate water 11B.33 is collected and used (after some treatment) at collector 11B.38 as BFW 11B.39 in the standard, commercially available, steam generation facility 4. There can be up to 25 stages. A commercial MSF typically operates in a temperature range of 90-110 C. High temperatures increase efficiency but may accelerate scale formation and corrosion in the MSF. Efficiency also depends on a low condensing temperature at the last stage. The feed water 11B.9 for the MSF can be treated by adding inhibitors to reduce the scaling and corrosion. Those chemicals are available commercially and the pretreatment package is typically supplied with the MSF. The feed water is recovered from the produced water in separation unit 11B.10 that separates the produced bitumen 11B.8, possibly with diluent that improves separation from the water and decreases the viscosity of the heavy bitumen. The de-oiled water 11B.9 is supplied to the MSF as feed water. There are several commercially available separation units. In my applications, the separation, which can be simplified as discharged "oily contaminate water" 11B.18, is allowed in the process. Make-up water 11B.29, like water from water wells or from any other water source, is continually added to the system. Any type of vacuum pump or ejector can be used to remove gas 11B.36 and generate the low pressure required in the MSF design.

Figure 12:
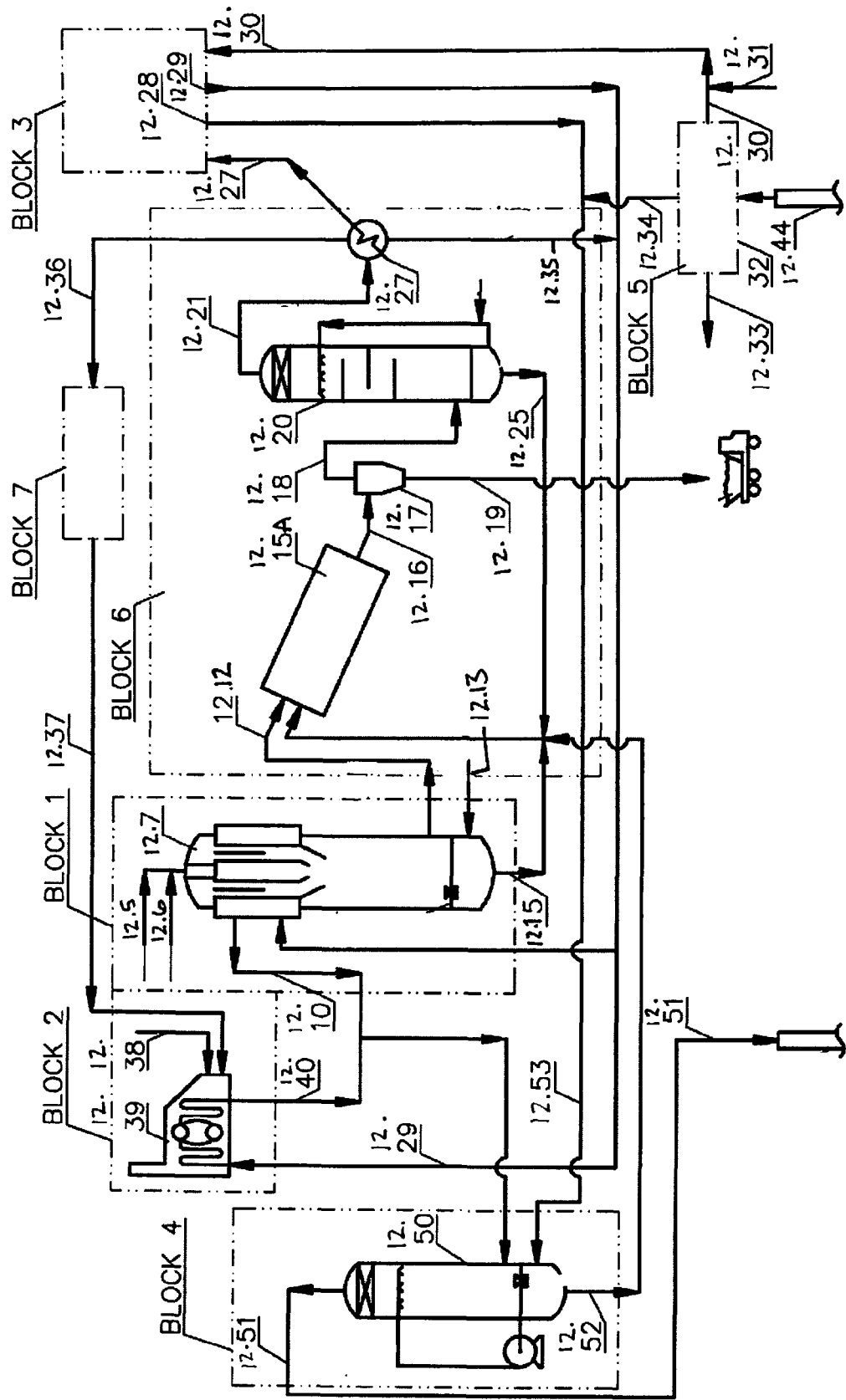
FIG. 12 is a schematic view of an illustration of the use of a partial combustion gasifier with the present invention for the production of syngas.

FIG. 12 is an illustration of the use of a partial combustion gasifier with the present invention for the production of syngas for use in steam generation, a SD-DCSG, and a DCSG combined with a water distillation facility for ZLD. The system contains few a commercially available blocks, each of which includes a commercially available facility:

BLOCK 1 includes the gasifier that produces syngas.
BLOCK 2 includes a commercially available steam generation boiler that is capable of combusting syngas.
BLOCK 3 includes a commercially available thermal water distillation plant.
BLOCK 4 includes the SD-DCSG which generates the injection steam.
BLOCK 5 includes a water-oil separation facility with the option of oily water discharge for recycling into the SD-DCSG.
BLOCK 6 includes the DCSG.
BLOCK 7 includes a syngas treatment plant where part of the syngas can be used for hydrogen production etc.

Carbon fuel 12.5 is injected with oxygen rich 12.6 gas to a pressurized gasifier 12.7. The gasifier shown is a typical Texaco (GE)™ design that includes a quenching water bath at the bottom. Any other pressurized partial combustion gasifier design can also be used. The gasifier can include a heat exchanger, located at the top of the gasifier (near the combustion section), to recover part of the partial combustion energy to generate high pressure steam. At the bottom of the gasifier, there is a quenching bath with liquid water to collect solids.

Make-up water 12.13 is then injected to maintain the liquid bath water level. The quenching water 12.15, which includes the solids generated by the gasifier, is injected into a DCSG 12.15A where it is mixed with the produced hot syngas discharged from the gasifier 12.12. The DCSG also consumes the liquid water discharge 12.52 from the SD-DCSG 12.50. In the DCSG, the water is evaporated into pressurized steam and solids (which were carried with the water and the syngas into the DCSG). The DCSG generates a stream of gas and solids 12.16. The solids 12.19 are removed from the gas flow by a separator 12.17 for disposal. The solids lean gas flow 12.18 (after most of the solids have been removed from the gas) is injected into a pressurized wet scrubber 12.20 that removes the solid remains and can also generate saturated steam from the heat in gas flow 12.18. Solids rich water 12.25 is continually rejected from the bottom of the scrubber and recycled back to the DCSG 12.15A. Heat 12.27 is recovered from the saturated water and syngas mixture 12.21 while condensing steam to liquid water 12.35 and water lean syngas 12.36. The condensed water 12.35 can be used as BFW after further treatment to remove contaminations (not shown). The heat 12.27 is used to operate a thermal distillation facility in BLOCK 3. There are several commercially available facilities for this, such as the MSF or MED. The distillation facility uses de-oiled produced water 12.30, possibly with make-up brackish water 12.31 and heat 12.27, to generate a stream of de-mineralized BFW 12.29 for steam generation and a stream of brine water 12.28, with a high concentration of minerals. The generated brine 12.28 is recycled back to the SD-DCSG 12.50 in BLOCK 4. The syngas can be treated in commercially available facilities in BLOCK 7 to remove H2S (using amine) or to recover hydrogen. The treated syngas 12.37, together with oxidizer 12.38, is used as a fuel source in the commercially available steam generation facility in BLOCK 2. The super heated steam 12.40 is generated in steam boiler 12.39 from the BFW 12.29. The steam 12.40 from the boiler, possibly together with the steam 12.10 generated by the gasifier, is injected into the SD-DCSG 12.50 in BLOCK 4 where additional steam is generated from low quality water 12.53. The generated steam 12.51 is injected into an underground formation for EOR. The produced bitumen and water recovered from production well 12.44 are separated in the water-oil separation facility (BLOCK) 5 to produce bitumen 12.33 and de-oiled water 12.30. Oily water 12.34 can be rejected and consumed in the SD-DCSG 50. By allowing continuous rejection of oily water, the chemical consumption can be reduced and the efficiency of the oil separation unit can be improved.

Figure 13:
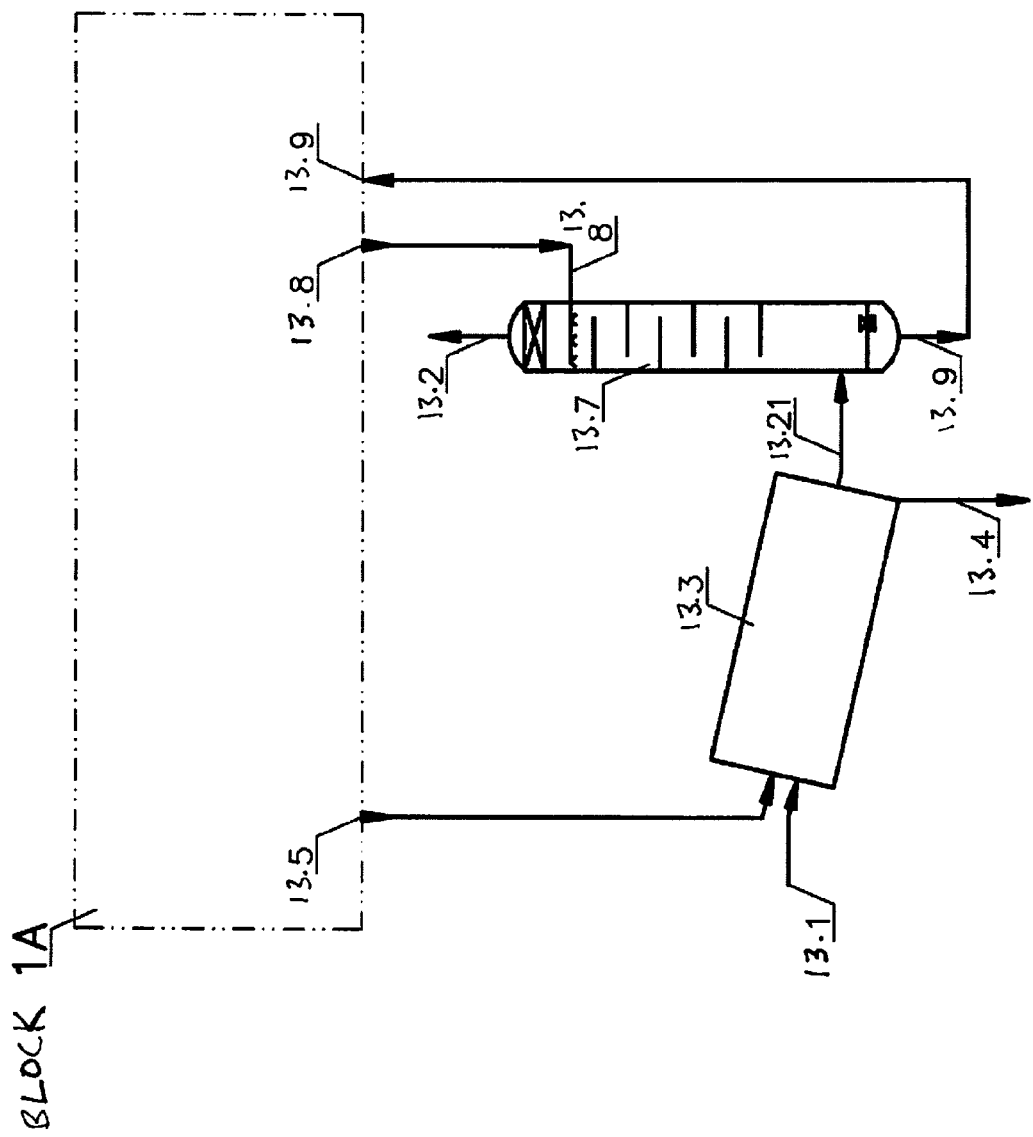
FIG. 13 is a schematic view of the present invention for the generation of hot water for oilsands mining extraction facilities.

FIG. 13 is a schematic of the present invention for the generation of hot water for oilsands mining extraction facilities, with Fine Tailing water recycling. Block 1A includes a Prior Art commercial open mine oilsands plant. The plant consists of mining oilsands ore and mixing it with hot process water, typically in a temperature range of 70 C-90 C, separating the bitumen from the water, sand and fines. The cold process water 13.8 includes recycled process water together with fresh make-up water that is supplied from local sources (like the Athabasca River in the Wood Buffalo area). Another bi-product from the open mine oilsands plant is Fine Tailings 13.5 which, after a time, is transferred to a stable Mature Fine Tailings. Energy from steam 13.1 is injected into reactor 13.3. The energy is in the form of steam gas. The hot, super heated ("dry") steam gas is mixed in enclosure or reactor 13.3 with a flow of FT 13.5 from BLOCK 1A. Most of the liquid water in the FT is converted to steam. The remaining solids 13.4 are removed in a solid, stable form to use as a back-fill material and to support traffic. The produced steam 13.21 is at a lower temperature than steam 13.1 and contains additional water from the FT that was converted to steam. Steam 13.1 can be generated by heating the produced steam 13.21, as described in FIG. 3, 3A or 3B (not shown). The produced steam 13.21 is mixed with cold process water 13.8 from BLOCK 1A in a direct contact heat exchanger 13.7. The produced steam is directly heated and condensed into the liquid water 13.8 to generate hot process water 13.9 that is then supplied back to operate the Open Mine Oilsands plant. The amount of NCG 13.2 is minimal. Some NCG can be generated from the organic contaminates in the FT 13.5. The enclosure or reactor 13.3 system pressure can vary from 103 kpa to 50000 kpa and the temperature at the discharge point of steam 13.21 can vary from 100 C to 400 C.

Figure 13A:
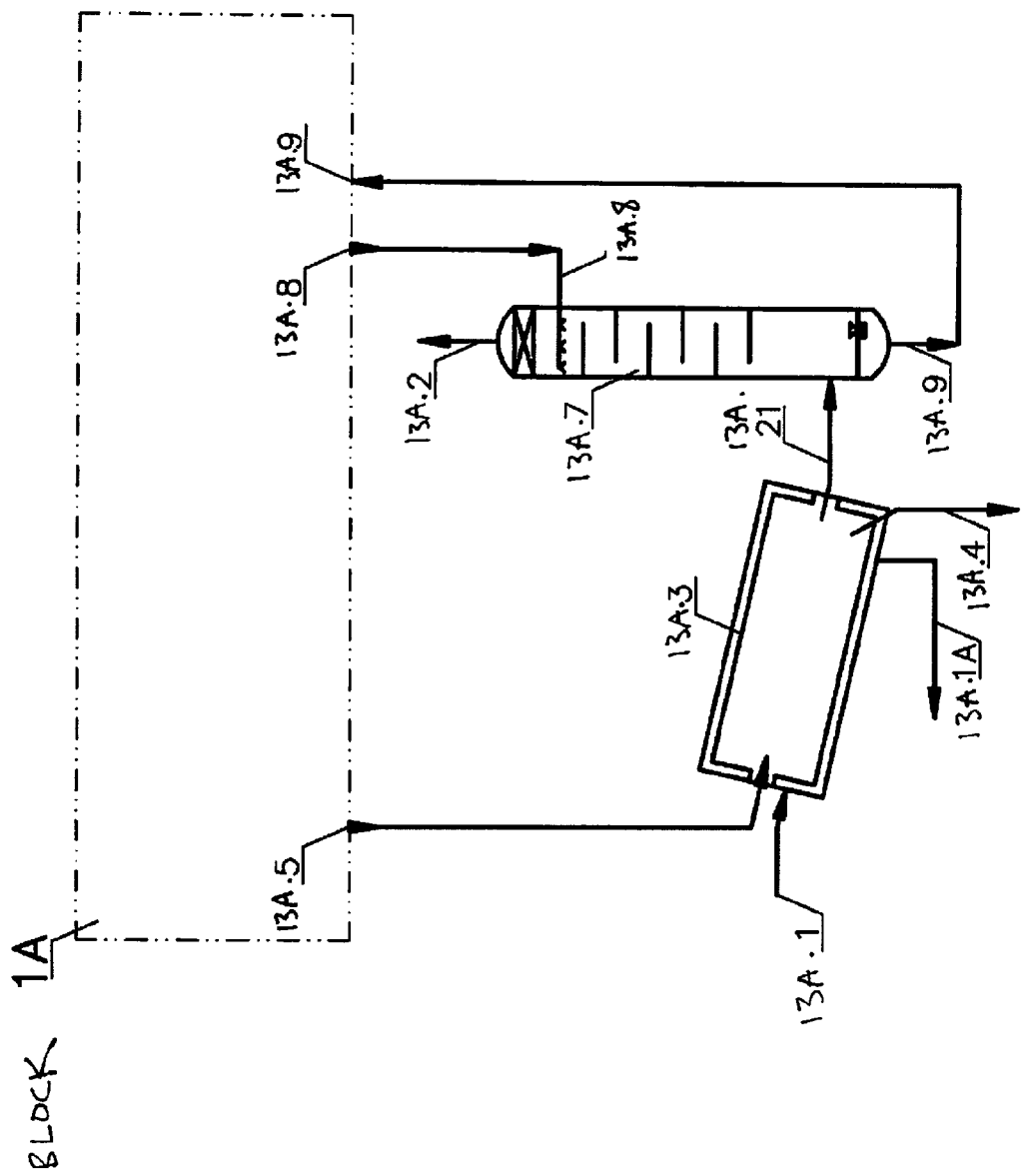
FIG. 13A is a schematic view of the process for the generation of hot water for oilsands mining extraction facilities, with Fine Tailing water recycling.

FIG. 13A is a schematic view of the process for the generation of hot water for oilsands mining extraction facilities, with Fine Tailing water recycling. FIG. 13A is similar to FIG. 13 with the notable difference that non-direct heat exchange is used between the drive steam 13A.1 and the FT or MFT 13A.5. Block 1A includes a Prior Art commercial open mine oilsands plant. The plant consists of mining oilsands ore and mixing it with hot process water, typically in a temperature range of 70 C-90 C, and separating the bitumen from the water, sand and fines. The cold process water 13A.8 includes recycled process water together with fresh make-up water that is supplied from local sources (like the Athabasca River in the Wood Buffalo area). Another bi-product from the open mine oilsands plant is Fine Tailing (FT) 13A.5 which, after a time, are transferred to a stable Mature Fine Tailings (MFT). Energy 13A.1 is injected into reactor 13A.3. The energy is in the form of steam gas which is injected around enclosure or reactor 13A.3 where the heat is transferred to the reactor and to the MFT through the enclosure wall. The driving hot steam gas is condensed and recovered as a liquid condensate of drive steam 13A.1A. The driving steam 13A.1 heat energy is transferred to the enclosure and used to evaporate the FT 13A.5. Most of the liquid water in the FT is converted to steam. The remaining solids 13A.4 are removed in a solid/slurry stable form to use as a back-fill material which can support traffic. Steam 1 is generated by a standard boiler heating the condensate 13A.1A in a closed cycle, allowing the use of high quality clean ASME BFW (not shown). The produced steam 13A.21 is mixed with cold process water 13A.8 from BLOCK 1A in a direct contact heat exchanger 13A.7. The produced steam is directly heated and condensed into the liquid water 13A.8 to generate hot process water 13A.9 that is supplied back to operate the Open Mine Oilsands plant. The amount of Non Condensable Gases (NCG) 13A.2 is minimal. Some NCG can be generated from the organic contaminates in the FT 13A.5. The enclosure or reactor 13A.3 can have pressure varying from 103 kpa to 50000 kpa and the temperature at the discharge point of steam 13A.21 can vary from 100 C to 400 C.

Figure 13B:
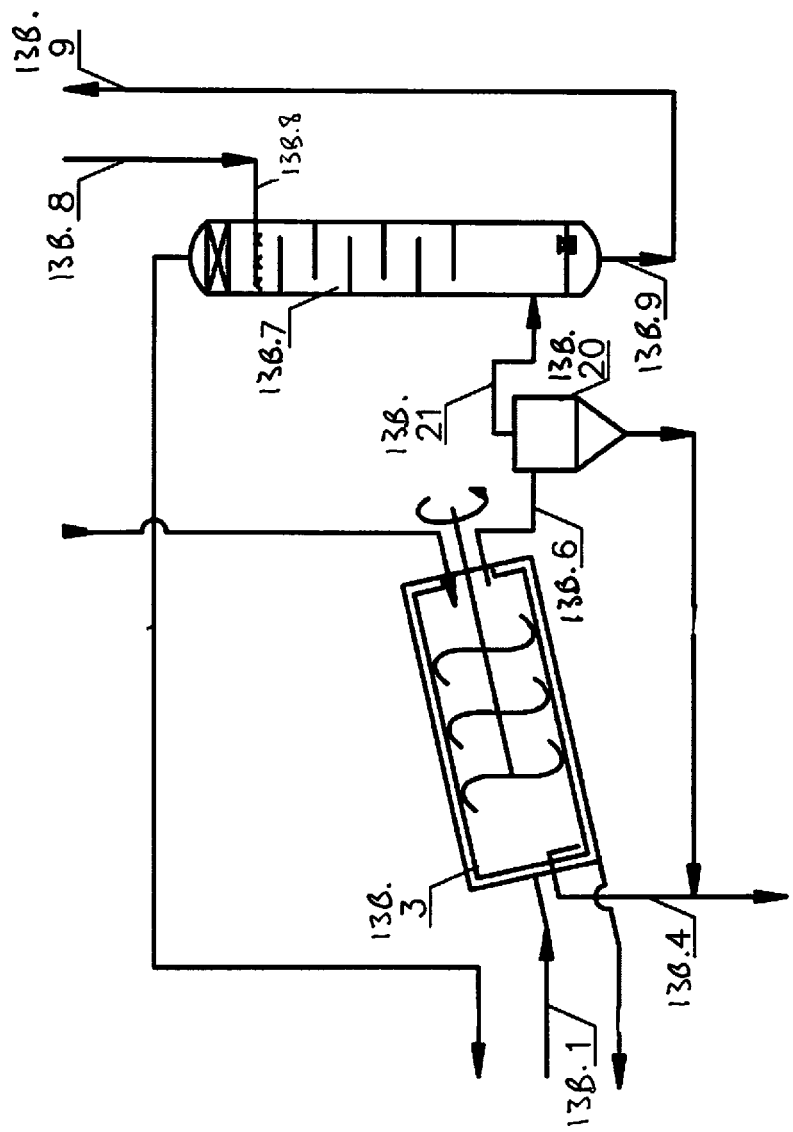
FIG. 13B is a schematic view of the process for the generation of hot water for oilsands mining extraction facilities, with Fine Tailing water recycling.

FIG. 13B is a schematic view of the process for the generation of hot water for oilsands mining extraction facilities, with Fine Tailing water recycling. FIG. 13B is similar to FIG. 13A with rotating internals to enhance the heat transfer between the evaporating MFT and the heat source which is the steam 13B.1 in the enclosure 13B.3. The rotating internals also mobilize the high concentration slurry and solids to the solid discharge 13B.4, where stable material that can support traffic is discharged from the system. The produced steam 13B.6 is further cleaned to remove solids in commercially available solids separation unit 13B.20 like a cyclone, electrostatic filter or any other commercially available system. The generated steam 13B.21 is mixed with cold process water 13B.8 supplied from an open mine extraction plant in a direct contact heat exchanger 13B.7. The produced steam is directly heated and condensed into the liquid water 13B.8 to generate hot process water 13B.9 that is supplied back to operate the extraction Open Mine Oilsands plant.

Figure 14:
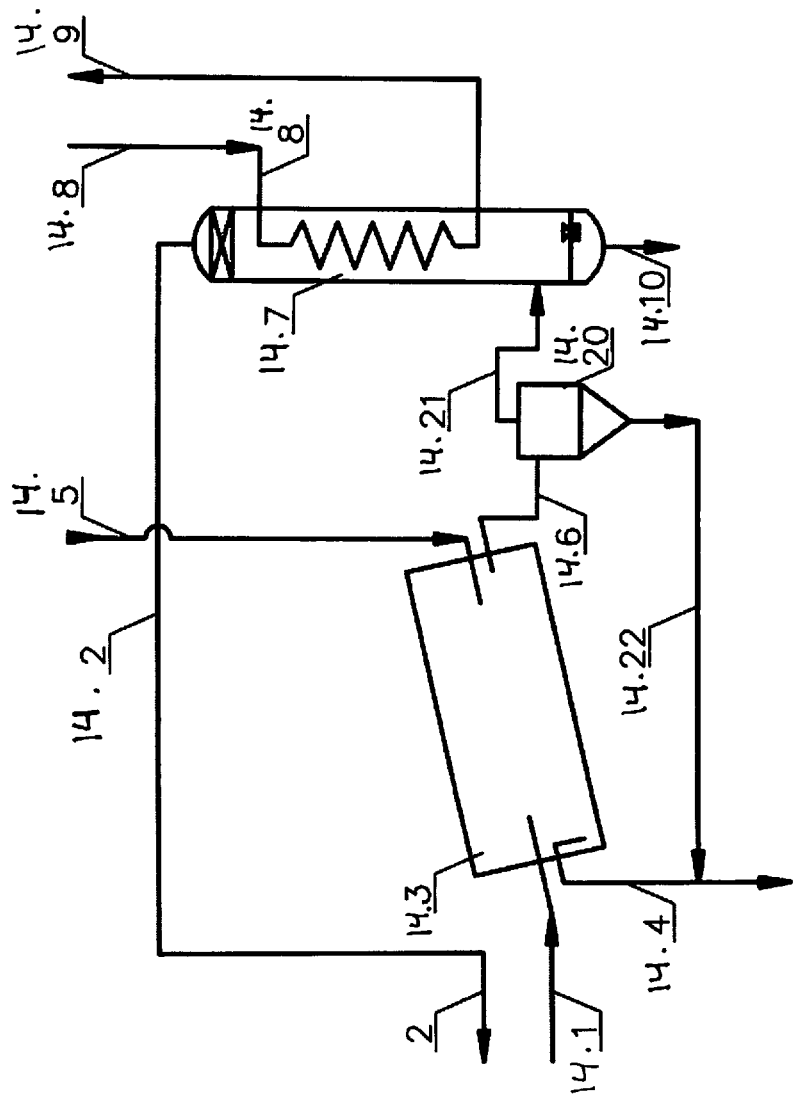
FIG. 14 is a schematic view of one illustration of the present invention for the generation of pre-heated water.

FIG. 14 is one illustration of the present invention for the generation of pre-heated water that can be used for steam generation or in a mining extraction facility. The invention has full disposal water recycling, so as to achieve zero liquid discharge. Energy, in the form of super heated steam 14.1, is introduced into the Direct Contact Steam Generator reactor 14.3. Contaminated water 14.5, like FT or MFT, is injected into reactor 14.3. There, most of the water is converted into steam, leaving only solids with a low moisture content. There are several possibilities for the design of reactor 14.3. The design can be a horizontal rotating reactor, an up-flow reactor, or any other type of reactor that can be used to generate a stream of solids and gas. A stream of hot gas 14.6, possibly with carried-on solids generated in reactor 14.3, flows into a commercially available solid-gas separator 14.20. Solids 14.4 can also be discharged directly from the reactor 14.3, depending on the type of reactor used. The separated solids 14.22 and 14.4 are disposed of in a landfill. The solids lean steam 14.21, (rich with steam from water 14.5) is condensed into liquid water 14.10 in a non-direct condenser 14.7. There are many commercially available standard designs for heat-exchanger/condenser 14.7. The steam heat is used to heat flow of water 14.8, like process water flow, to generate hot water 14.9 that can be used in the extraction process. Low volumes of NCG 14.2 can be treated or combusted as a heat source (not shown). The condensed liquid water 14.10 can be used as hot process water for the extraction process or any other usage. The steam 14.21 condenses by non-direct contact with the recycled water 14.8. Solid remains that previously passed through solid separation unit or separator 14.20 and were carried on with the steam 14.21, are washed with the condensed water 14.10.

Figure 15:
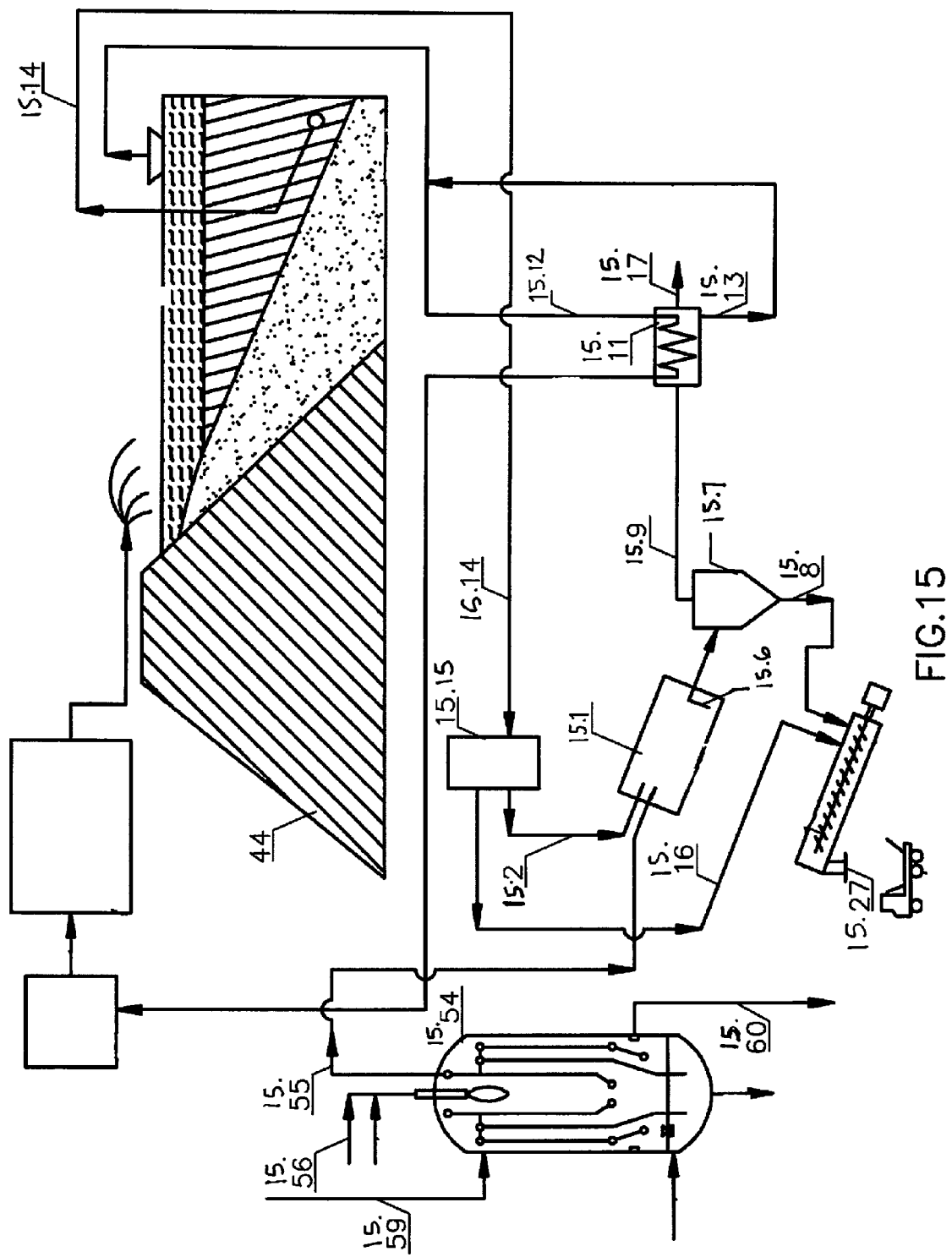
FIG. 15 is a schematic view of the invention with an open mine oilsands extraction facility.

FIG. 15 is a schematic of the invention with an open mine oilsands extraction facility, where the steam source is a standard gasifier for generating steam in a non-direct heat exchange and syngas can be used for the production of hydrogen for upgrading the produced crude in prior-art technologies or can be used as a fuel source. The MFT recovery is done with the steam which was produced by the gasifier and not with the syngas. The partial combustion of fuel 15.56 and oxidizer, like enriched air, takes place inside the gasifier 15.54. The gasification heat is used to produce superheated steam 15.55 from BFW 15.59. The produced syngas 15.60 is recovered and further treated. This treatment can include the removal of the H2S (like in an amine plant). Treatment can also include generating hydrogen for crude oil upgrading or as a fuel source to replace natural gas usage (not shown). The steam 15.55 flows to a horizontal parallel flow DCSG 15.1. Concentrated MFT 15.2 is also injected into the DCSG. The MFT is converted to gas, mainly steam, and solids 15.6. The solids 15.8 are removed in a gas-solid separator 15.7. The solid lean stream 15.9 flows through heat exchanger 15.11, where it heats the process water, or any other process flow 15.12, indirectly through a heat exchanger. Condensing hot water 15.13 is removed from the bottom and used as hot process extraction water. In case NCG 15.17 is generated, it can be further treated or combusted as a fuel source. The fine tailings 15.14 are pumped from the tailing pond and can then be separated into two flows through a specific separation process. Separation 15.15 is one option to increase the amount of MFT removal. The process can use natural MFT both at flows of MFT 15.2 and MFT 15.16. This separation can be done using a centrifuge or a thickener (like a High Compression Thickener or Chemical Polymer Flocculent based thickener). This unit separates the fine tailings into solid rich MFT 15.16 and solid lean MFT 15.2 flows. The solid lean flow is fed into the DCSG 15.1 or recycled and used as the process water (not shown). In the DCSG 15.1, dry solids are generated and removed from the gas-solid separator. The solid rich flow MFT 15.16 is mixed with the dry solids 15.8 in a screw conveyor to generate a stable material 15.27.

Figure 16:
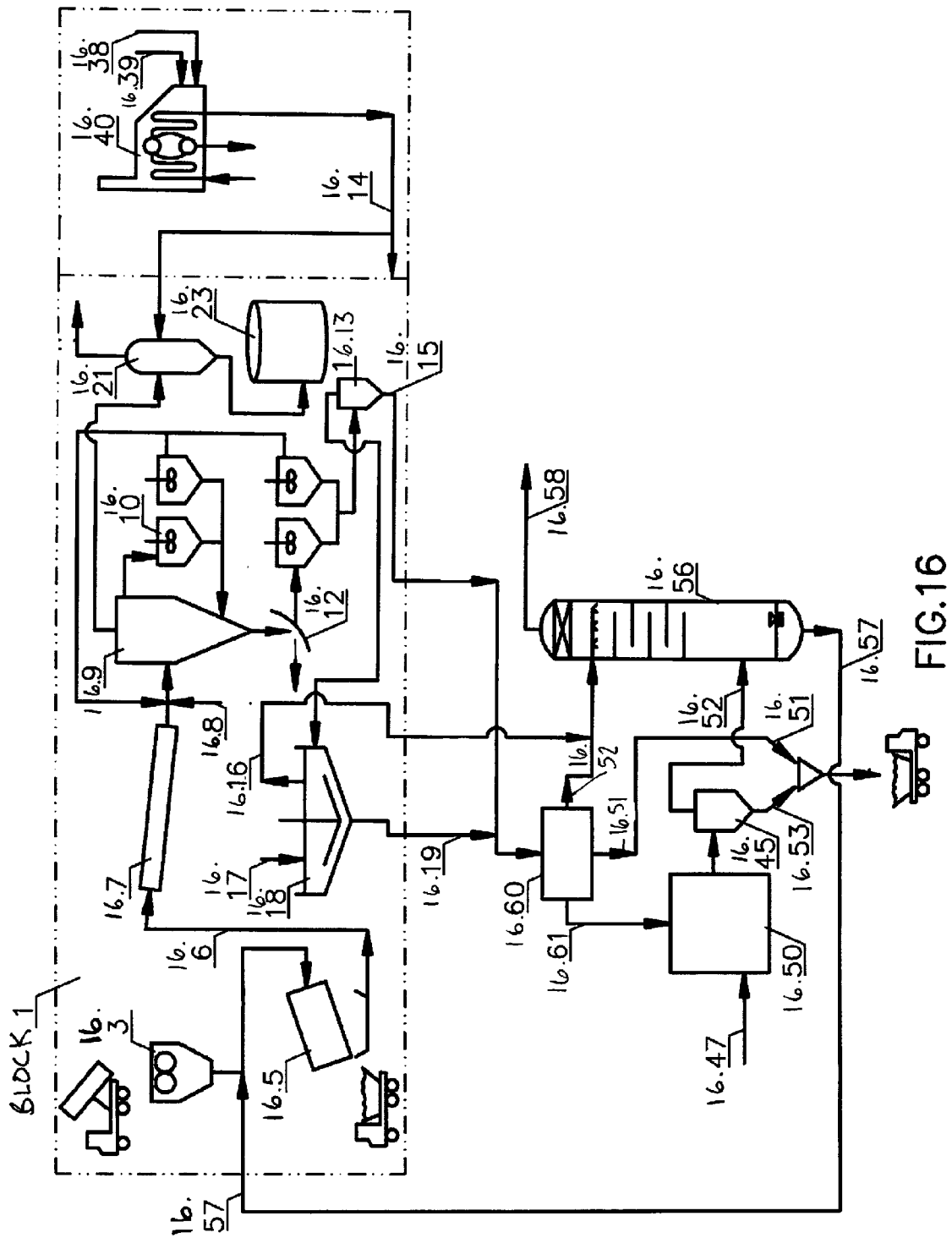
FIG. 16 is a another schematic view of the invention with another open mine oilsands extraction facility.

FIG. 16 is a schematic of the invention with an open mine oilsands extraction facility, where the hot process water for the ore preparation is generated by recovering the heat and condensing the steam generated from the fine tailings without the use of a tailings pond. A typical mine and extraction facility is briefly described in block 1 (See "Past, Present and Future Tailings, Tailing Experience at Albian Sands Energy" presentation by J. Matthews from Shell Canada Energy on Dec. 8, 2008 at the International Oil Sands Tailings Conference in Edmonton, Alberta). Mined Oil sand feed is transferred via truck to an ore preparation facility, where it is crushed in a semi-mobile crusher 16.3. It is also mixed with hot water 16.57 in a rotary breaker 16.5. Oversized particles are rejected and removed to a landfill. The ore mix goes through slurry conditioning, where it is pumped through a special pipeline 16.7. Chemicals and air are added to the ore slurry 16.8. In the invention, the NCGs 16.58 that are released under pressure from tower 16.56 can be added to the injected air at 16.8 to generate aerated slurry flow. The conditioned aerated slurry flow is fed into the bitumen extraction facility, where it is injected into a Primary Separation Cell 16.9. To improve the separation, the slurry is recycled through floatation cells 16.10. Oversized particles are removed through a screen 16.12 in the bottom of the separation cell. From the flotation cells, the coarse and fine tailings are separated in separator 16.13. The fine tailings flow to thickener 16.18. To improve the separation in the thickener, flocculant 16.17 is added. Recycled water 16.16 is recovered from the thickener and fine tailings are removed from the bottom of the thickener 16.18. The froth is removed from the Primary Separation Cell 16.9 to vessel 16.21. In this vessel, steam 16.14 is injected to remove air and gas from the froth. The recovered froth is maintained in a Froth Storage Tank 16.23. The coarse tailings 16.15 and the fine tailings 16.19 are removed and sent to tailing processing area 16.60. The fine and coarse tailings can be combined, or removed and sent separately (not shown) to the tailing process area 16.60. In Unit with area 16.60, the sand and other large solid particles are removed and then put back into the mine, or stored in stock-piles. Liquid flow is separated into different flows, mostly differing in their solids concentration. A relatively solids-free flow 16.62 is heated. This flow is used as heated process water 16.57 in the ore preparation facility, for generation of the oilsands slurry 16.6. The fine tailings stream can be separated into two sub streams. The most concentrated fine tailings 16.51 are mixed with dry solids, generated by the DCSG, to generate a solid and stable substrate material that can be put back into the mine and used to support traffic. The medium concentration fine tailings 16.61 flows to the DCSG facility 16.50. Steam energy of steam 16.47 is used in the DCSG to convert the fine tailings 16.61 water into a dry or semi dry solid and gas stream. The steam can be produced in a standard high pressure steam boiler 16.40, in an OTSG, or produced by a COGEN, using the elevated temperature in a gas turbine tail (not shown). The boiler consumes fuel gas 16.38 and air 16.39 while generating steam 16.14. A portion of the generated steam 16.14 can be injected as steam 16.47 into the DCSG 16.50. The temperature of the DCSG produced steam can vary from 100 C to 400 C as it includes the water from the MFT. Steam 16.47 can be also generated by heating a portion of the produced steam 16.52 as described in FIGS. 3, 3A and 3B. The solids are separated from the gas stream in any commercially available facility 16.45 which can include: cyclone separators, centrifugal separators, mesh separators, electrostatic separators or other combination technologies. The solids lean steam 16.52 flows into tower 16.56. The gas flows up into the tower, possibly through a set of trays, while any solid carried-on remnants are scrubbed from the up flowing gas through direct contact with liquid water. The water vapor that was generated from heating the fine tailing 16.61 in the DCSG and the steam that provided the energy to evaporate the FT are condensed and added to the down-flowing extraction water process 16.57. The presence of small amounts of remaining solids in the hot process water is acceptable. That is because the hot water is mixed with the crushed oilsands from the crusher 16.3 in the breaker during ore preparation. The temperature of the discharged hot water 16.57 is between 70 C and 95 C, typically in the 80 C-90 C range. The hot water is supplied to the ore preparation facility. The separated dry solids from the DCSG are mixed with the concentrated slurry flow from the tailing water separation facility with processing area 16.60. They are used to generate a stable solid waste that can be returned to the oilsands mine for back-fill and can be used to support traffic. Any commercially available mixing method can be used in the process: a rotating mixer, a Z type mixer, a screw mixer, an extruder or any other commercially available mixer. The slurry 16.51 can be pumped to the mixing location, while the dry solids can be transported pneumatically to the mixing location. The described arrangement, where the fine tailings are separated into two streams 16.61 and 16.51, is intended to maximize the potential of the process to recover MFT. It is meant to maximize the conversion of fine tailings into solid waste for each unit weight of the supplied fuel source. The system can work in the manner described for tailing pond water recovery. The tailing pond water is condensed in hot water generation 16.57, without the combination of the dry solids 16.53 and tailing slurry 16.51. The generated dry solids 16.53 are a "water starving" dry material. As such, they are effective in the process of drying MFT to generate trafficable solid material without relying on weather conditions to dry excess water.

Figure 17:
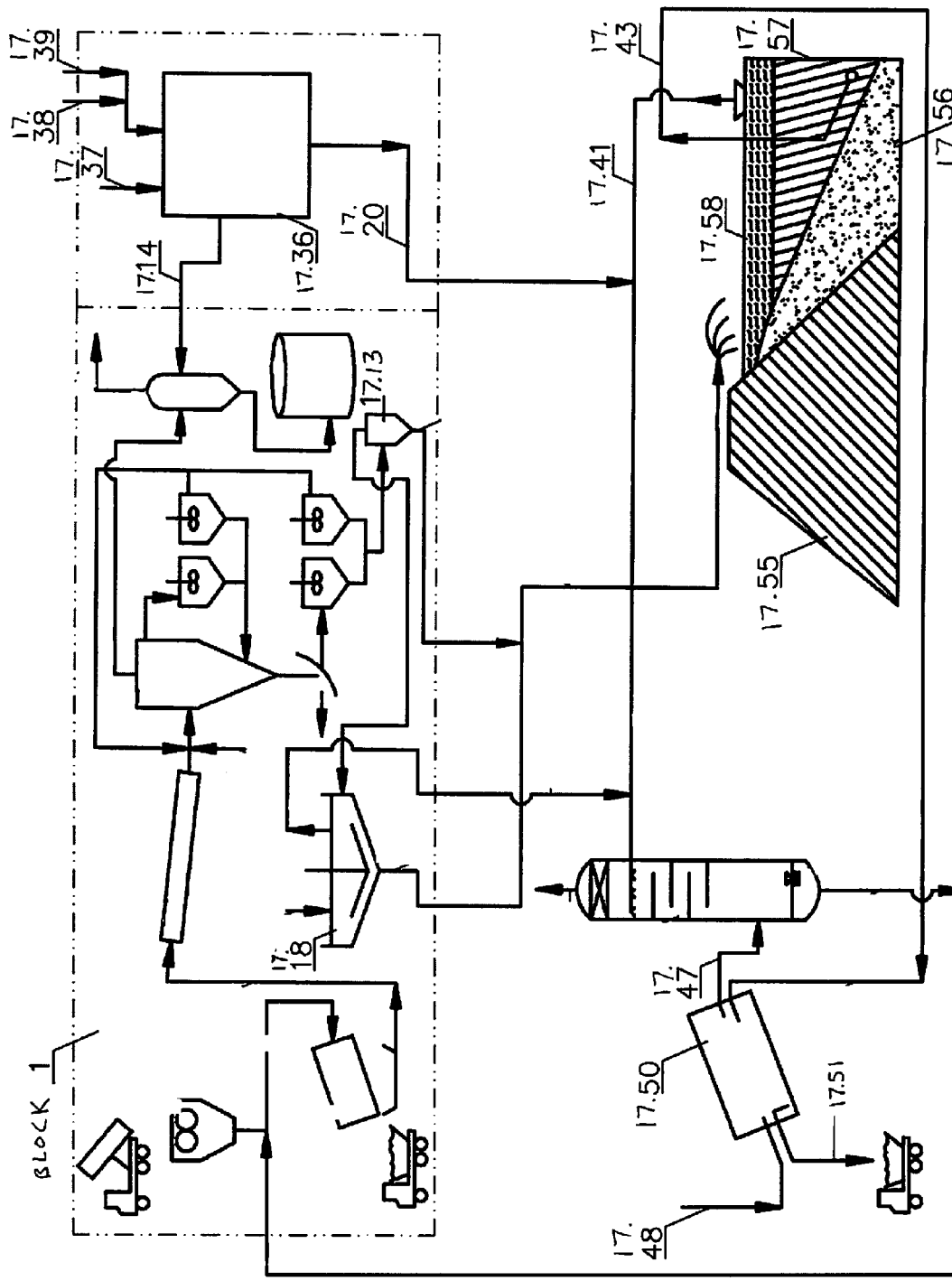
FIG. 17 is a schematic view of the invention with still another open mine oilsand extraction facility.

FIG. 17 is a schematic of the invention with an open mine oilsand extraction facility, where the hot process water for the ore preparation is generated from condensing the steam produced from the fine tailings. A typical mine and extraction facility is briefly described in block diagram 1. The tailing water from the oilsands mine facility is disposed of in a tailing pond. The tailing ponds are designed in such a way that the sand tailings are used to build the containment areas for the fine tailings. The tailings are generated in the Extraction Process. They include the cyclone underflow tailings 17.13 (mainly coarse tailings) and the fine tailings from the thickener 17.18, where flocculants are added to enhance the solid settling and recycling of warm water. Another source of fine tailings is the Froth Treatment Tailings, where the tailings are discarded using the solvent recovery process; the Froth Treatment Tailings are characterized by high fines content, relatively high asphaltene content, and residual solvent. (See "Past, Present and Future Tailings, Tailing Experience at Albian Sands Energy" a presentation by J. Matthews from Shell Canada Energy on Dec. 8, 2008 at the International Oil Sands Tailings Conference in Edmonton, Alberta). A sand dyke 17.55 contains a tailing pond. The sand separates from the tailings and generates a sand beach 17.56. Fine tailings 17.57 are put above the sand beach at the middle-low section of the tailing pond. Some fine tailings are trapped in the sand beach 17.56. On top of the fine tailing is the recycled water layer 17.58. The tailing concentration increases with depth. Close to the bottom of the tailing layer are the MFT (Mature Fine Tailings). (See "The Chemistry of Oil Sands Tailings: Production to Treatment" presentation by R. J. Mikula, V. A. Munoz, O. E. Omotoso, and K. L. Kasperski of CanmetENERGY, Devon, Alberta, Natural Resources Canada on Dec. 8, 2008 at the International Oil Sands Tailings Conference in Edmonton, Alberta). The recycled water 17.41 is pumped from a location close to the surface of the tailing pond (typically from a floating barge). The fine tailings that are used for generating steam and solid waste in my invention are the MFT. They are pumped from the deep areas of the fine tailings 17.43. Steam 17.48 is injected into a DCSG. MFT 17.43 are pumped from the lower section of the tailing pond and are then directed to the DCSG 17.50. The DCSG described in this particular example is a horizontal, counter flow rotating DCSG. However, any available DCSG that can generate gas and solids from the MFT can be used as well. Due to the heat and pressure inside the DCSG, the MFT turn into gas and solids as the water is converted into steam. The solids are recovered in a dry form or in a semi-dry, semi-solid slurry form 17.51. The semi-dry slurry form is stable enough to be sent back into the oilsands mine without the need for further drying and can be used to support traffic. The produced steam 17.14, of which portion of the steam 17.48 can be used to operate the DCSG, is generated by a standard steam generation facility 17.36 from BFW 17.37, fuel gas 17.38 and air 17.39. The blow-down water 17.20 can be recycled into the process water 17.20. By continually consuming the fine tailings 17.43, the oil sand mine facility can use a much smaller tailing pond as a means of separating the recycled water from the fine tailings. This smaller recyclable tailing pond is cost effective, and is a simple way to deal with tailings as it does not involve any moving parts (in contrast to the centrifuge or to thickening facilities). This solution will allow for the creation of a sustainable, fully recyclable water solution for the open mine oilsands facilities. Steam 17.48 can be generated by heating a portion of the produced steam 17.47, as described in FIGS. 3, 3A and 3B.

Figure 18:
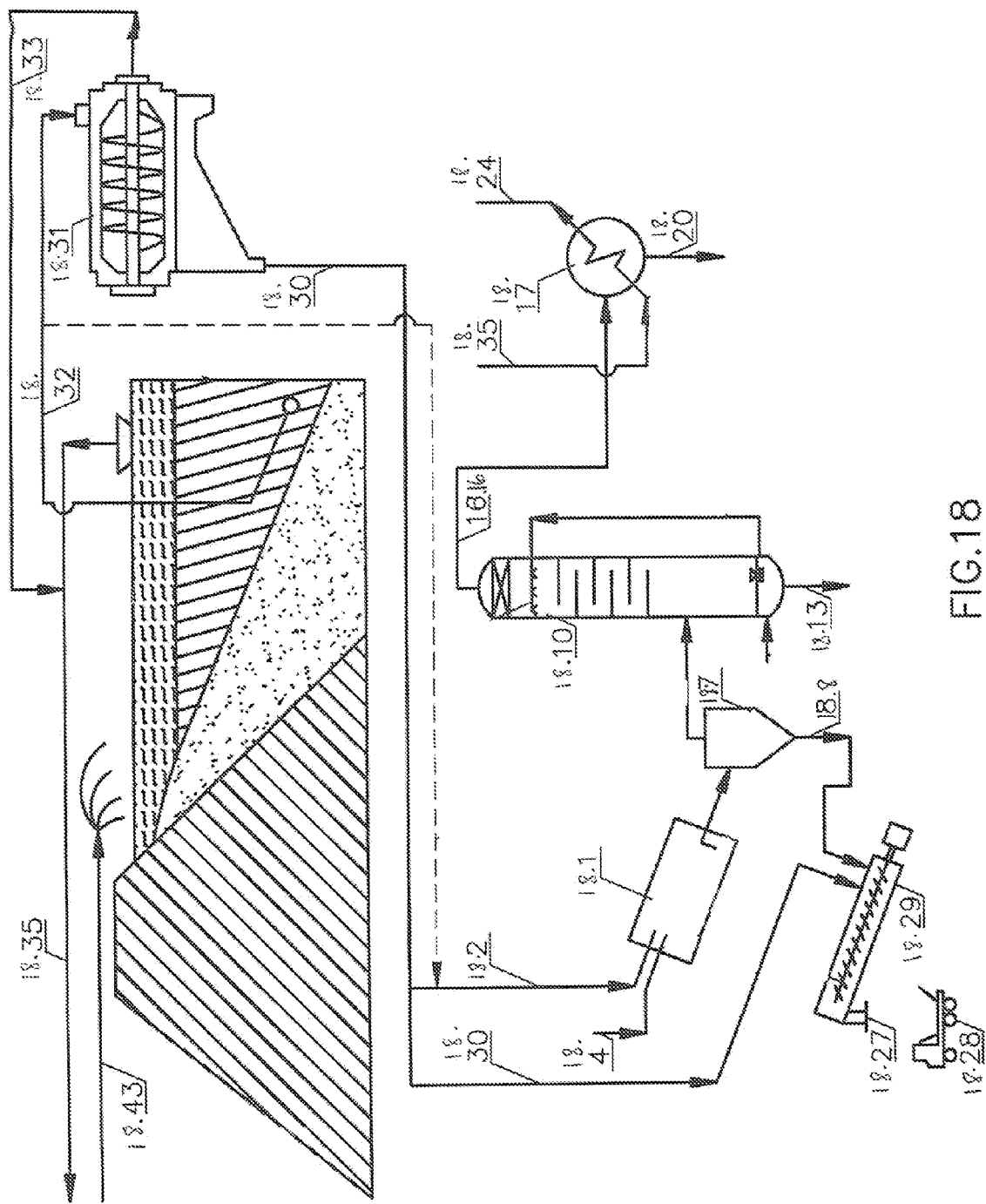
FIG. 18 is a schematic view of the invention with yet another open mine oilsands extraction facility.

FIG. 18 is a schematic of the invention with open mine oilsands extraction facility, where the hot process water for the ore preparation is generated by condensing the steam generated from the fine tailings and the driving steam. The tailing water 18.43 from the oilsands mine facility (not shown) is disposed of in a tailing pond. Steam 18.4 is fed into a horizontal parallel flow DCSG 18.1. Concentrated MFT 18.2 is injected into the DCSG 18.1 as well. The MFT is converted into steam, and solids. The solids are removed in a solid-gas separator 18.7 where the solid lean stream is washed in tower 18.10 by saturated water. In the tower, the solids are washed out and then removed. The solid rich discharge flow 18.13 can be recycled back to the DCSG or to the tailing pond. Heat is recovered from the saturated steam 18.16 in heat exchanger/condenser 18.17. Steam is condensed to water 18.20. The condensed water 18.20 can be used as hot process water and can be added to the flow 18.24. The recovered heat is used for heating the process water 18.35. The fine tailings 18.32 are pumped from the tailing pond and separated into two flows by a centrifugal process unit 18.31. This unit separates the fine tailings into two components: solid rich 18.30 and solid lean 18.33 flows. The centrifuge unit described is commercially available and was tested successfully in two field pilots (See "The Past, Present and Future of Tailings at Syncrude" presentation by A. Fair from Syncrude on Dec. 7-10, 2008 at the International Oil Sands Tailings Conference in Edmonton, Alberta). Other processes, like thickening the MFT with chemical polymer flocculent, can be used as well instead of the centrifuge. The solid lean flow can contain less than 1% solids. The solid rich flow is a thick slurry ("cake") that contains more than 60% solids. The solid lean flow is used directly or is recycled back to a settling basin (not shown) and is eventually used as process water 18.35. The solid concentration is not dry enough to be disposed of efficiently and cannot be used to support traffic. This can be solved by mixing it with a "water starving" material (virtually dry solids generated by the DCSG). Mixing of the dry solids and the thick slurry can be achieved through many commercially available methods. In this particular figure, the mixing is done by a screw conveyer 18.29 where the slurry of solids rich tailings 18.30 and the dry material 18.8 are added to the bottom of a screw conveyer, mixed by the screw, and then the stable solids are loaded on a truck 18.28 for disposal. The produced solid material 18.27 can be backfilled into the oil-sands mine excavation site and then used to support traffic. It is also possible to feed the thickened MFT directly to the DCSG 18.1, eliminating the additional mixing process. In this particular figure, there are two options for supplying the fine tailing water to the DCSG: one is to supply the solid rich thick slurry of tailings 18.30 from the centrifuge or thickening unit 18.31. The other is to use the "conventional" MFT, typically with 30% solids, pumped from the settlement pond. Feeding the MFT "as is" to the DCSG eliminates the TIC, operation, and maintenance costs for a centrifuge or thickening facility.

Figure 19:
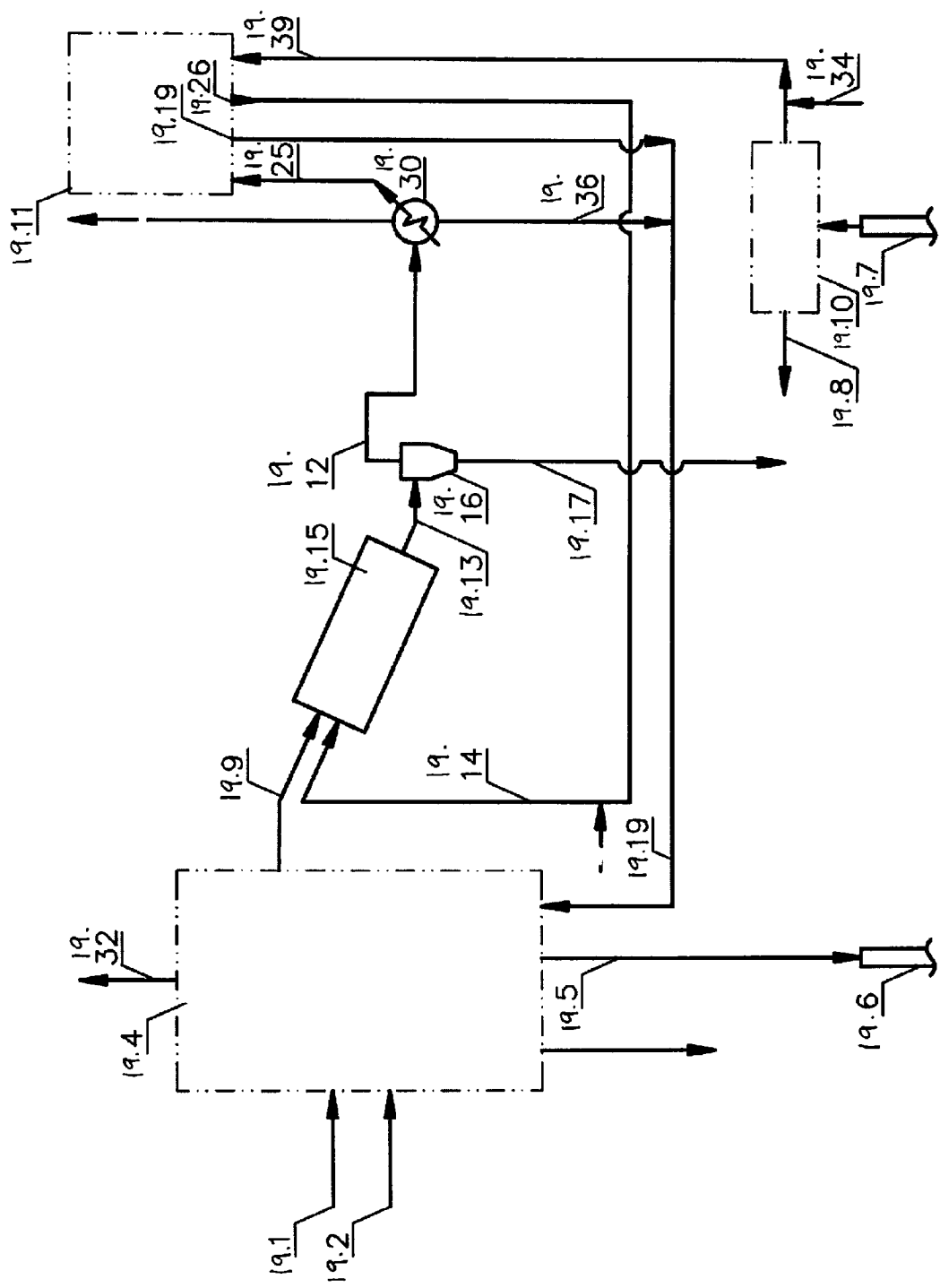
FIG. 19 is a schematic view of an illustration of still another embodiment of the present invention.

FIG. 19 is an illustration of one embodiment of the present invention. Fuel 19.2 is mixed with oxidizing gas 19.1 and injected into the steam boiler 19.4. The boiler is a commercially available atmospheric pressure boiler. If a solid fuel boiler is used, the boiler might include a solid waste discharge. The boiler produces high-pressure steam 19.5 from distilled BFW 19.19. The steam is injected into the underground formation through injection well 19.6 for EOR. The boiler combustion gases are possibly cleaned and discharged from stack 19.32. If natural gas is used as the fuel 19.2, there is currently no mandatory requirement in Alberta to further treat the discharged flue gas or remove CO2. Steam 19.9 is injected into a pressurized DCSG 19.15 at an elevated pressure. The DCSG design can include a horizontal rotating reactor, a fluidized bed reactor, an up-flow reactor, or any other reactor that can be used to generate a stream of gas and solids. Solids-rich water 19.14 is injected into the direct contact steam generator 19.15 where the water evaporates into steam and the solids are carried on with gas flow 19.13. The amount of water 19.14 is controlled in order to verify that all the water is converted into steam and that the remaining solids are in a dry form. The solid-rich gas 19.13 flows to a dry solids separator 19.16. The dry solids separator is a commercially available package and it can be used in a variety of gas-solid separation designs. The solids 19.17 are taken to a land-fill. The solids lean flow 19.12 flows to the heat exchanger 19.30. The steam continually condenses because of heat exchange. Heat 19.25 is recovered from gas flow 19.12. The condensed water 19.36 can be used for steam generation. The condensation heat 19.25 can be used to operate the distillation unit 19.11. The distillation unit 19.11 produces distillation water 19.19. The brine water 19.26 is recycled back to the direct contact steam generator 19.15 where the liquid water is converted to steam and the dissolved solids remain in a dry form. The distillation unit 19.11 receives de-oiled produced water 19.39 that is separated in a commercially available separation facility or unit 19.10, like that which is currently in use by the industry. Additional make-up water 19.34 is added. This water can be brackish water, from deep underground formations, or from any other water source that is locally available to the oil producers. The quality of the make-up water 19.34 is suitable for the distillation facility 19.11, where there are typically very low levels of organics due to their tendency to damage the evaporator's performance or carry on and damage the boiler. Water that contains organics is a by-product of the separation unit 19.10 and it will be used in the DCSG 19.15. By integrating the separation unit 19.10 and the DCSG 19.15, the organic contaminated by-product water can be used directly, without any additional treatment by the DCSG 19.15. This simplifies the separation facility or unit 19.10 so that it can reject contaminated water without environmental impact. It is sent to the DCSG 19.15, where most of the organics are converted into hydrocarbon gas phase or are carbonic with the hot steam gas flow. The distilled water 19.19 produced by the distillation facility 19.11, possibly with the condensed steam from flow 19.12, are sent to the commercially available, non-direct, steam generator or boiler 19.4. The produced steam 19.5 is injected into an underground formation for EOR. The brine 19.26 is recycled back as solids rich water 19.14 to the DCSG 19.15 and solids dryer as described before. The production well 19.7 produces a mixture of tar, water and other contaminants. The oil and water are separated in commercially available plants or unit 19.10 into water or steam 19.9 and oil product 19.8.

Figure 20:
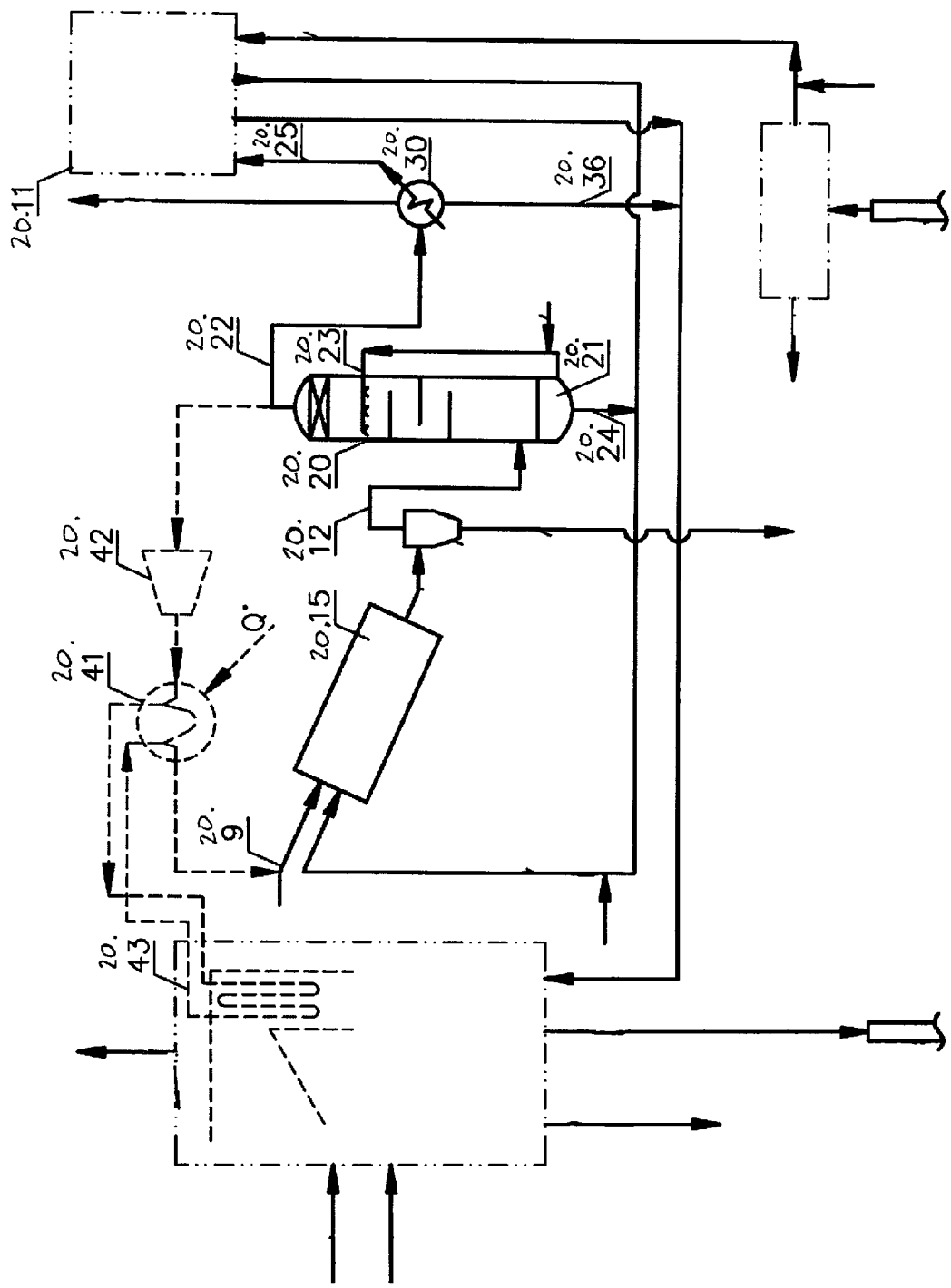
FIG. 20 is a schematic view of an illustration of yet another embodiment of the present invention.

FIG. 20 is an illustration of one embodiment of the present invention. It is similar to FIG. 19 with the following modifications described below: The solids lean flow of steam gas 20.12 is mixed with saturated water 20.21 in vessel 20.20. The heat carried in the steam gas 20.12 can generate additional steam if its temperature is higher than the saturated water 20.21 temperature. The solids carried with the steam gas are washed by saturated liquid water 20.23. The solids rich water 20.24 is discharged from the bottom of the vessel 20.20 and recycled back to the DCSG 20.15 where the liquid water is converted into steam and the solids are removed in a dry form for disposal. Saturated "wet" solids free steam 20.22 flows to heat exchanger/condenser 20.30. The condensed water 20.36 is used for steam generation. The condensation heat 20.25 is used to operate a water treatment plant 20.11, as described in FIG. 19 above. To minimize the amount of steam 20.9 used to drive the DCSG 20.15, it is possible to recycle a portion of the produced saturated steam 20.22 as described in FIGS. 3, 3A and 3B. This option is shown as the dotted line. A portion of the produced steam 20.22 is recycled to drive the process. This steam is compressed by compressor 20.42 to allow the flow to be recycled and to overcome the heater and the SD-DCSG pressure drop. The steam is heated in a non-direct heat exchanger 20.41. Any type of heat exchanger/heater 20.41 can be used. One example is the use of a typical re-heater 20.43 that is part of a standard boiler design.

Figure 21:
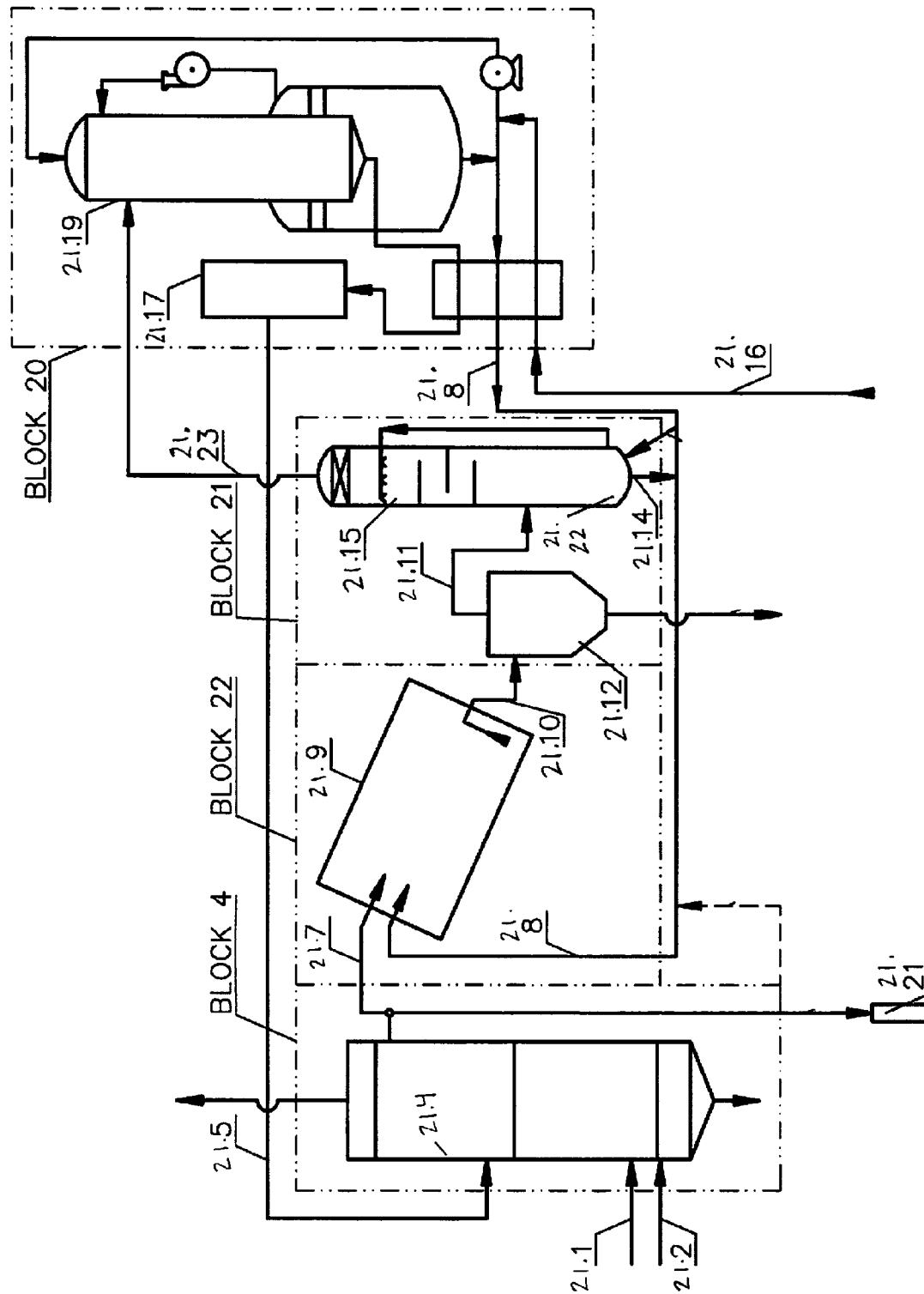
FIG. 21 is a schematic view of an illustration of a boiler, steam drive DCSG, solid removal and Mechanical Vapor Compression distillation facility for generating distilled water in the boiler for steam generation.

FIG. 21 is an illustration of a boiler, steam drive DCSG, solid removal and Mechanical Vapor Compression distillation facility for generating distilled water in the boiler for steam generation for EOR. BLOCK 4 includes a steam generation unit. Fuel 21.2, possibly with water in a slurry form, is mixed with air 21.1 and injected into a steam boiler 21.4. The boiler may have waste discharged from the bottom of the combustion chamber. The boiler produces high-pressure steam 21.3 from treated distillate feed water 21.5. The steam is injected into the underground formation through injection well 21.21 for EOR. Part of the steam 21.7 is directed to drive a DCSG 21.9. BLOCK 22 includes a steam drive DCSG 21.9. Solids rich water, like concentrated brine water 21.8 from the distillation facility, is injected into the DCSG 21.9 where the water is mixed with super heated steam 21.7. The liquid water phase is converted to steam due to the high temperature of the driving steam 21.7. The DCSG can be a commercially available direct-contact rotary dryer or any other type of direct contact dryer capable of generating solid waste and steam from solid-rich brine water 21.8. The DCSG generates a stream of steam 21.10 with solid particles from the solid rich water 21.8. The DCSG in BLOCK 22 can generate its own driving steam 21.7 by recycling and heating a portion of the saturated produced steam 21.10, as described in FIGS. 3, 3A and 3B (not shown). The amount of water 21.8 is controlled to verify that all the water is converted into steam and that the remaining solids are in a dry form. The solid-rich steam gas flow of steam 21.10 is directed to BLOCK 21 which separates the solids. The solids separation is in a dry solids separator 21.12. The dry solids separator is a commercially available package and it can be used in a variety of gas-solid separation designs. The solids lean flow of steam 21.11 is mixed with saturated water 21.22 in a direct contact wash vessel 21.15. The solid remains carried with the steam are washed by saturated liquid water 21.22. The solids rich water 21.14 is discharged from the bottom of the vessel 21.15 and recycled back to dryer or DCSG 21.9 where the liquid water is converted into steam and the solids are removed in a dry form for disposal. If the dry solid removal efficiency at separator 21.12 is high, it is possible to eliminate the use of the saturate water liquid scrubber. The produced saturated steam 21.23 is supplied to BLOCK 20, which is a commercially available distillation unit that produces distillation water 21.5. The brine water 21.8 is recycled back to the direct contact steam generator/solids dryer 21.15 where the liquid water is converted into steam and the dissolved solids remain in dry form. Distillation unit 21.19 is a Mechanical Vapor Compression (MVC) distillation facility. It receives de-oiled produced water 21.16 that has been separated in a commercially available separation facility (such as that currently in use by the industry) with additional make-up water (not shown). This water can be brackish, from deep underground formations or from any other water source that is locally available to the oil producers. The quality of the make-up water is suitable for the distillation facility or unit 21.19, where there are typically very low levels of organics due to their tendency to damage the evaporator's performance or damage the boiler further in the process. The distilled water produced by distillation facility or unit 21.19 is treated by the distillate treatment unit 21.17, typically supplied as part of the MVC distillation package. The treated distilled water 21.5 can be used in the boiler to produce 100% quality steam for EOR. The brine water 21.8 and possibly the scrubbing water 21.14 are recycled back to the DCSG 21.9 as previously described. The heat from flow of steam 21.23 is used to operate the distillation unit in Block 20. The condensing steam from flow of steam 21.23 is recovered in the form of liquid distilled water 21.5. The high-pressure steam from the boiler in BLOCK 4 is injected into the injection well 21.21 for EOR or for other uses (not shown). With the use of a low pressure system (which includes a low pressure dryer), the thermal efficiency of the system is lower than using a high pressurized system with pressurized DCSG.

The following are examples for heat and material balance simulations:

Example 1

Figure 22:
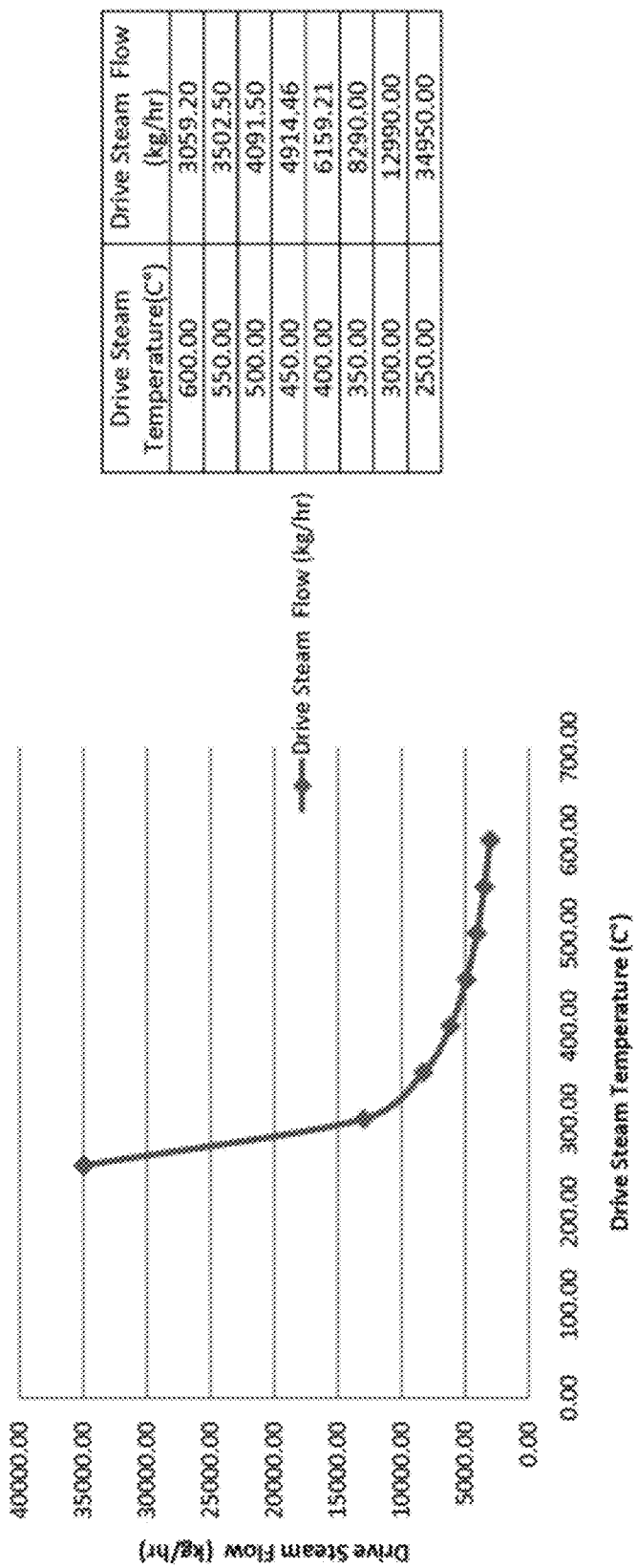
FIG. 22 is a graph illustration of a simulation of the process as described in FIG. 2A.

The graph in FIG. 22 simulates the process as described in FIG. 2A. The system pressure was constant at 25 bar. The liquid water 2A.7 was at temperature of 25 C with a constant flow of 1000 kg/hour. The product or produced gas 2A.8 was saturated steam at 25 bar. The graph below shows the amount of drive steam 2A.9 required to transfer the liquid water 2A.7 into the gas phase as a function of the temperature of the driving steam 2A.9. When 300 C driving steam is used, there is a need for 12.9 ton/hour of steam 2A.9 to gasify one ton/hour of liquid water 2A.7. When 500 C driving steam is used, there is a need for only 4.1 ton/hour of steam 2A.9 to gasify one ton/hour of liquid water 2A.7. The following are the results of the simulation:

| Drive Steam 9 Temperature (° C.) | Drive Steam 9 Flow (kg/hr) |
|---|---|
| 600.00 | 3059.20 |
| 550.00 | 3502.50 |
| 500.00 | 4091.50 |
| 450.00 | 4914.46 |
| 400.00 | 6159.21 |
| 350.00 | 8290.00 |
| 300.00 | 12990.00 |
| 250.00 | 34950.00 |

Example 2

Figure 23:
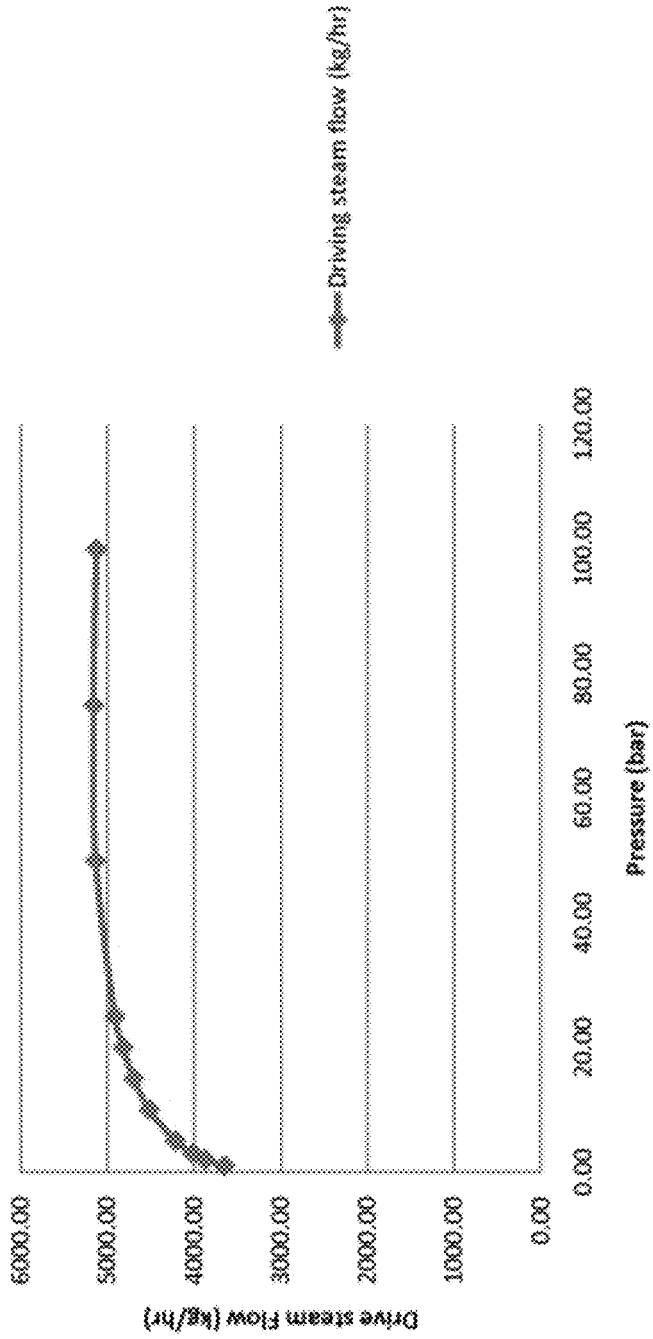
FIG. 23 is another graph illustration of a simulation of the process as described in FIG. 2A.

The graph in FIG. 23 simulates the process as described in FIG. 2A. The driving steam 2A.9 temperature was constant at 450° C. The liquid water 2A.7 was at temperature of 25° C. and had a constant flow of 1000 kg/hour. The produced steam product or produced gas 2A.8 was saturated. The graph shows the amount of drive steam 2A.9 required to transfer the liquid water 2A.7 into the gas phase as a function of the pressure of the driving steam 2A.9. When the system pressure was 2 bar, 3.87 tons/hour of driving steam was needed to convert the water to saturated steam at temperature of 121° C. For a 50 bar system pressure, 5.14 tons/hour of driving steam was used to generate saturated steam at 256° C. The simulation results are summarized in the following table:

| System Pressure (bar) | Temperature of Saturated produced Steam | Driving Steam Flow (kg/hr) |
|---|---|---|
| 100.00 | 311.82 | 5127.94 |
| 75.00 | 291.35 | 5161.78 |
| 50.00 | 264.74 | 5135.66 |
| 25.00 | 224.70 | 4914.46 |
| 20.00 | 213.11 | 4821.42 |
| 15.00 | 198.98 | 4696.41 |
| 10.00 | 180.53 | 4515.83 |
| 5.00 | 152.40 | 4218.44 |
| 3.00 | 134.03 | 4018.992 |
| 2.00 | 120.68 | 3870.57 |
| 1.00 | 100.00 | 3649.728 |

Example 3

Figure 24:
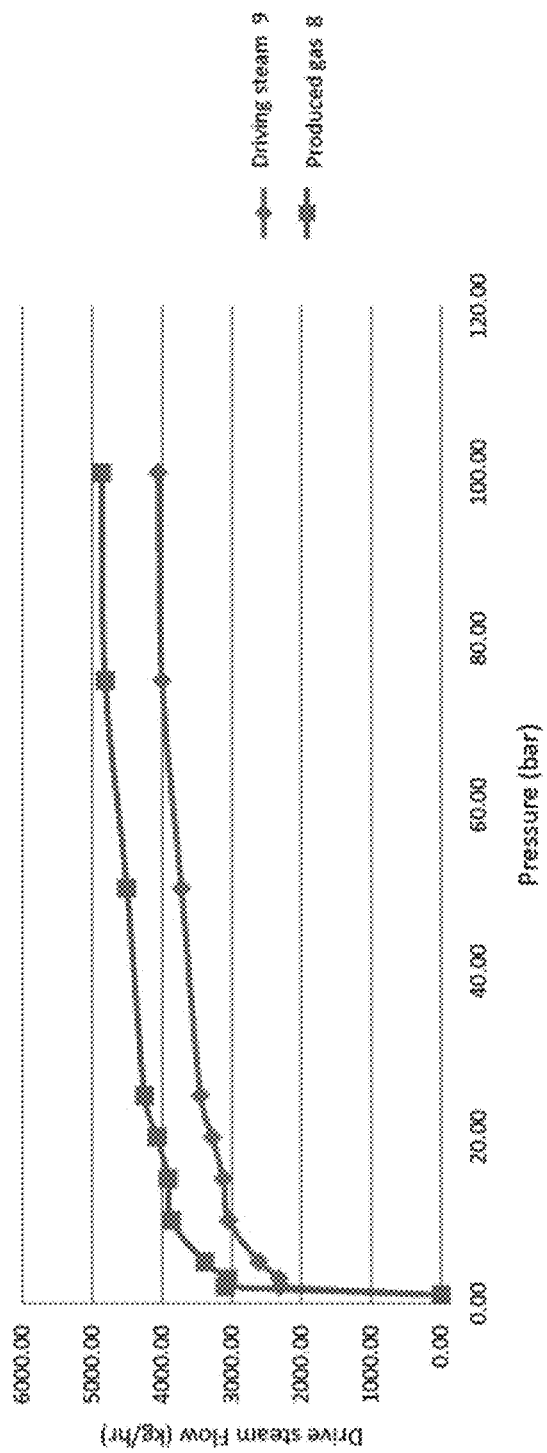
FIG. 24 is yet another graph illustration of a simulation of the process as described in FIG. 2A.

The graph in FIG. 24 simulates the process as described in FIG. 2A where the water feed includes solids and naphtha. As the pressure increases, the saturated temperature of the steam also increases from around 100 C at 1 bar to around 312 C 100 bar. Thus, the amount of superheated steam input at 450 C also increases from around 2300 kg/hr to 4055 kg/hr. The graph in FIG. 24 represents the superheated driving steam input or dry steam 2A.9 and the total flow rate (including hydrocarbons) of the produced gas 2A.8.

| Flow Number | 7 | 9 | 12 | 8 |
|---|---|---|---|---|
| T, C | 25.00 | 450.00 | 120.61 | 120.61 |
| P, atm | 2.00 | 2.00 | 2.00 | 2.00 |
| Vapor Fraction | 0.00 | 1.00 | 0.00 | 1.00 |
| Enthalpy, MJ | −14885.08 | −29133.36 | −6692.49 | −37325.62 |
| Total Flow, kg/hr | 1000.00 | 2311.54 | 414.73 | 2896.81 |
| Water | 600.00 | 2311.54 | 114.20 | 2797.34 |
| Solids | 300.00 | 0.00 | 300.00 | 4.14E−17 |
| Naptha | 100.00 | 0.00 | 0.53 | 99.47 |

Example 4

The following table simulates the process as described in FIG. 3 for insitue oilsands thermal extraction facilities, like SAGD, for two different pressures. The water feed is hot produced water at 200 C that includes solids and bitumen. The heat source Q' for the simulation was 12 KW.

For a system pressure of 400 psi the total Inflow of water, solids and bitumen of flow and water feed 3.34 was 23.4 kg. 77% of the steam 3.31 is recycled as the driving steam 3.32 while 23% is discharged out of system at 283 C steam and hydrocarbons.

For a system pressure of 600 psi, the total Inflow of water, solids, and Bitumen of flow and water feed 3.34 was 22.5 kg. 80% of the steam 3.31 is recycled as the driving steam 3.32 while 20% is discharged out of system at 283 C steam and hydrocarbons.

|  | Flow Number | | | | | |
|---|---|---|---|---|---|---|
|  | 34 | 35 | 31 | 32 | 36 | 33 |
| T, C. | 200 | 243.42 | 243.42 | 243.43 | 486.73 | 243.43 |
| Press., psig | 400 | 400 | 400 | 400 | 400.00 | 400.00 |
| Vapor Fraction | 0 | 0.00 | 1.00 | 1.00 | 1.00 | 1.00 |
| Enthalpy, kW | −96.591 | −5.06 | −346.24 | −266.80 | −254.78 | −79.69 |
| Total Flow, kg/hr | 23.4 | 1.17 | 96.89 | 74.66 | 74.66 | 22.30 |
| Water, kg/hr | 21.76 | 0.00 | 94.84 | 73.08 | 73.08 | 21.83 |
| Solids | 1.17 | 1.17 | 0.00 | 0.00 | 0.00 | 0.00 |
| Hydrocarbons | 0.470 | 0.000 | 2.048 | 1.578 | 1.578 | 0.471 |
| T, C. | 200 | 282.88 | 282.88 | 282.62 | 485.97 | 282.62 |
| Press., psig | 600 | 600.00 | 600.00 | 600.00 | 600.00 | 600.00 |
| Vapor Fraction | 0 | 0.00 | 1.00 | 1.00 | 1.00 | 1.00 |
| Enthalpy, kW | −92.863 | −4.78 | −381.06 | −305.04 | −293.02 | −76.26 |
| Total Flow, kg/hr | 22.5 | 1.12 | 107.11 | 85.74 | 85.74 | 21.43 |
| Water, kg/hr | 20.925 | 0.00 | 104.86 | 83.93 | 83.93 | 20.98 |
| Solids | 1.125 | 1.12 | 0.00 | 0.00 | 0.00 | 0.00 |
| Bitumen | 0.450 | 0.000 | 2.255 | 1.805 | 1.805 | 0.451 |

Example 5

Figure 30:
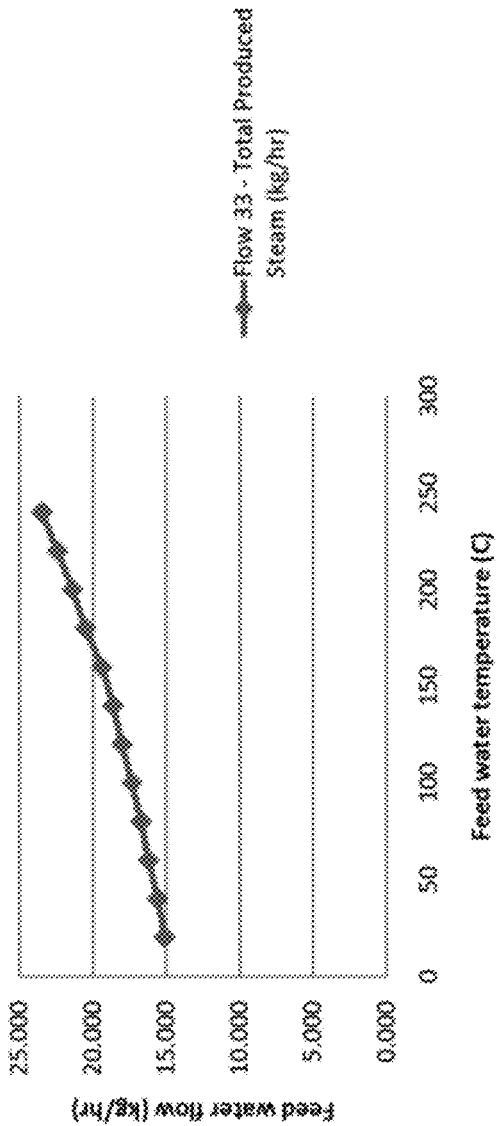
FIG. 30 is a graph illustration showing the amount of produced steam as a function of the feed water temperature in the system.

The following process simulation described in FIG. 30 simulates a 600 psi system pressure. The graph in FIG. 30 simulates the impact of the produced water feed temperature on the overall process performance. Hot produced water that includes solids and bitumen contaminates is typical for insitue oilsands thermal extraction facilities like SAGD. The graph shows that for a constant heat flow, as the produced feed water temperature increases, the amount of produced steam increases accordingly. The heat source Q' in the simulation was 12 KW. The driving steam temperature was 482 C. 80% of the steam is recycled to the heater as the driving steam while 20% is discharged out of system at 283 C steam and hydrocarbons. The simulation shows that for feed water at a temperature of 20 C, 15.1 kg of produced steam is generated. For a temperature of 100 C, 17.4 kg of produced steam is produced and for a temperature of 220 C, 22.4 kg of produced steam is produced.

Example 6

The following table simulates the process as described in FIG. 4 for insitue oilsands thermal extraction facilities like SAGD. The water feed is hot produced water at 200 C that includes solids and bitumen. The heat source Q' for the simulation was 12 KW and the system pressure was 600 psi. The total Inflow of water, solids, and bitumen of flow and water feed 4.47 was 22.5 kg. 79% of the steam 4.31 is recycled as the driving steam 4.36 while 21% is discharged out of system at 294 C steam and hydrocarbons.

In the simulation, 4.9 kw were removed at the flash/condensation unit 4.42 and used to pre-heat the water feed 4.47. The product was split from flow of steam 4.31 (not shown on FIG. 4) replacing flow of steam 4.46. Flows of steam 4.44 and 4.45 were equal in this simulation.

|  | Flow Number | | | | | | | Product (split from 33) |
|---|---|---|---|---|---|---|---|---|
|  | 47 | 35 | 31 | 33 | 36 | 45 | 43 | |
| T, C. | 200 | 294.91 | 294.91 | 294.91 | 471.55 | 253.81 | 253.81 | 294.91 |
| Press., psig | 600 | 600.00 | 600.00 | 600.00 | 600.00 | 600.00 | 600.00 | 600.00 |
| Vapor Fraction | 0 | 0.00 | 1.00 | 1.00 | 1.00 | 1.00 | 0.13 | 1.00 |
| Enthalpy, kW | −92.863 | −4.76 | −361.07 | −285.24 | −261.99 | −274.01 | −15.89 | −75.82 |
| Total Flow, kg/hr | 22.5 | 1.13 | 101.76 | 80.39 | 74.82 | 74.82 | 5.56 | 21.37 |
| Water, kg/hr | 20.925 | 0.00 | 99.64 | 78.72 | 74.82 | 74.82 | 3.90 | 20.92 |
| SiO2 | 1.125 | 1.13 | 0.00 | 0.00 | 0.00 | 0.00 | 0.00 | 0.00 |
| hydrocarbons | 0.450 | 0.000 | 2.118 | 1.673 | 0.000 | 0.000 | 1.668 | 0.445 |

Example 7

Figure 25:
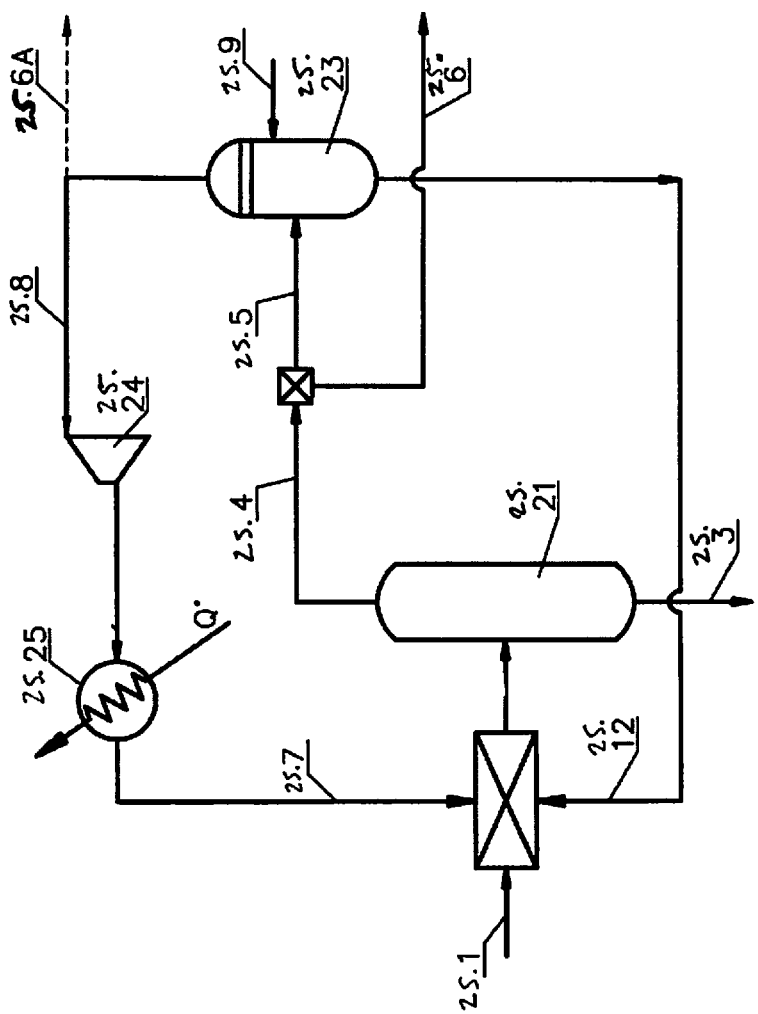
FIG. 25 is a schematic view of the process of Example 7.

The following table is the simulation results for the process described in FIG. 25. The water feed 25.1 is produced water from a SAGD separator and includes solids and hydrocarbons at a temperature of 200 C. The produced water feed 25.1 is mixed with superheated steam 25.7 at approximately 482 C. Recycled water 25.12 from scrubber 25.23 is recycled back to the water feed 25.1. Solid contaminates 25.3 are removed from separator 25.21. The produced steam 25.4 is divided into two flows—portion of steam 25.6 of the produced steam (22%) at a temperature of 285 C and pressure of 600 psi is recovered from the system as the product for steam injection, or any other use. The remaining 78% of the produced steam 25.5 is cleaned in a wet scrubber with saturated water, potentially with additional chemicals that can efficiently removed silica and possibly other contaminates that were introduced with the produced water (like magnesium based additives, soda caustic, and others). Water 25.9 is fed into the scrubber 25.23 and the scrubbed water 25.12 is continually recycled back to the stage of steam generation. The scrubbed steam 8 is compressed by mechanical means or by steam ejector 25.24 to a heater 25.25. In the simulation, a 12 kw heater was used 25.25 to simulate a bench scale laboratory facility. In a commercial plant any heater can be used. The system simulation pressure was 600 psig. The superheated steam 25.7 is used as the driving steam to drive the process.

| | Flow Number | | | | | |
|---|---|---|---|---|---|---|
| | 1 | 2 | 3 | 4 | 5 | 6 |
| T, C. | 200 | 284.78 | 284.78 | 284.78 | 284.77 | 284.77 |
| Press., psig | 600 | 600 | 600 | 600 | 600 | 600 |
| Vapor Fraction | 0 | 1 | 0 | 1 | 1 | 1 |
| Enthalpy, kW | −74.29 | −330.8 | −3.82 | −326.94 | −255.03 | −71.93 |
| Total Flow, kg/hr | 18 | 92.53 | 0.9 | 91.63 | 71.47 | 20.16 |
| Water, kg/hr | 16.74 | 90.01 | 0 | 90.01 | 70.21 | 19.8 |
| Solids | 0.9 | 0.9 | 0.9 | 0 | 0 | 0 |
| Hydrocarbons | 0.36 | 1.618 | 0 | 1.618 | 1.262 | 0.356 |

| | Flow Number | | | | |
|---|---|---|---|---|---|
| | 7 | 8 | 9 | 10 | 12 |
| T, C. | 478.12 | 253.81 | 20 | 254.13 | 253.81 |
| Press., psig | 600 | 600 | 600 | 601.46 | 600 |
| Vapor Fraction | 1 | 1 | 0 | 1 | 0 |
| Enthalpy, kW | −255.05 | −267.08 | −13.25 | −267.04 | −1.21 |
| Total Flow, kg/hr | 72.92 | 72.93 | 3 | 72.92 | 1.55 |
| Water, kg/hr | 72.92 | 72.93 | 3 | 72.92 | 0.28 |
| Solids | 0 | 0 | 0 | 0 | 0 |
| Hydrocarbons | 0 | 0 | 0 | 6.99E−06 | 1.262 |

Another option to minimize the risk of build-ups in the injection piping is to recover the produced steam 25.6 from flow of steam 25.8 (indicated on FIG. 25 as flow 25.6A). This option was simulated as described in the table below. In reality, flow of steam 25.6A will be cleaner than flow of steam 25.6, because the steam will be scrubbed by saturated liquid water 25.9. The scrubbing water 25.9 can include chemical to remove contaminates, like silica, from the produced steam 25.4. The simulation shows that this option do not affect the overall process efficiency. The size of scrubbing vessel or scrubber 25.23 will increase with the increased flow.

| | Flow Number | | | | | |
|---|---|---|---|---|---|---|
| | 1 | 2 | 3 | 4 | 5 | 6A |
| T, C. | 200 | 267.16 | 267.16 | 267.16 | 267.16 | 253.81 |
| Press., psig | 600 | 600.00 | 600.00 | 600.00 | 600.00 | 600.00 |
| Vapor Fraction | 0 | 0.99 | 0.00 | 1.00 | 1.00 | 1.00 |
| Enthalpy, kW | −75.7649 | −340.01 | −3.93 | −336.03 | −336.03 | −76.38 |
| Total Flow, kg/hr | 18.36 | 96.85 | 0.92 | 95.93 | 95.93 | 20.86 |
| Water, kg/hr | 17.07 | 92.08 | 0.00 | 92.08 | 92.08 | 20.86 |
| Solids | 0.92 | 0.92 | 0.92 | 0.00 | 0.00 | 0.00 |
| Hydrocarbons | 0.370 | 3.848 | 0.000 | 3.848 | 3.848 | 0.000 |

| | Flow Number | | | | |
|---|---|---|---|---|---|
| | 7 | 8 | 9 | 10 | 12 |
| T, C. | 481.86 | 253.81 | 20.00 | 254.1276 | 253.81 |
| Press., psig | 600.00 | 600.00 | 600.00 | 601.4696 | 600.00 |
| Vapor Fraction | 1.00 | 1.00 | 0.00 | 1 | 0.00 |

-continued

| | | | | | |
|---|---|---|---|---|---|
| Enthalpy, kW | −251.25 | −263.09 | −15.46 | −263.249 | −12.00 |
| Total Flow, kg/hr | 71.89 | 71.84 | 3.50 | 71.88519 | 6.73 |
| Water, kg/hr | 71.89 | 71.84 | 3.50 | 71.88519 | 2.88 |
| Solids | 0.00 | 0.00 | 0.00 | 0 | 0.00 |
| Hydrocarbons | 0.000 | 0.000 | 0.000 | 3.17E−06 | 3.848 |

Example 8

Figure 26:
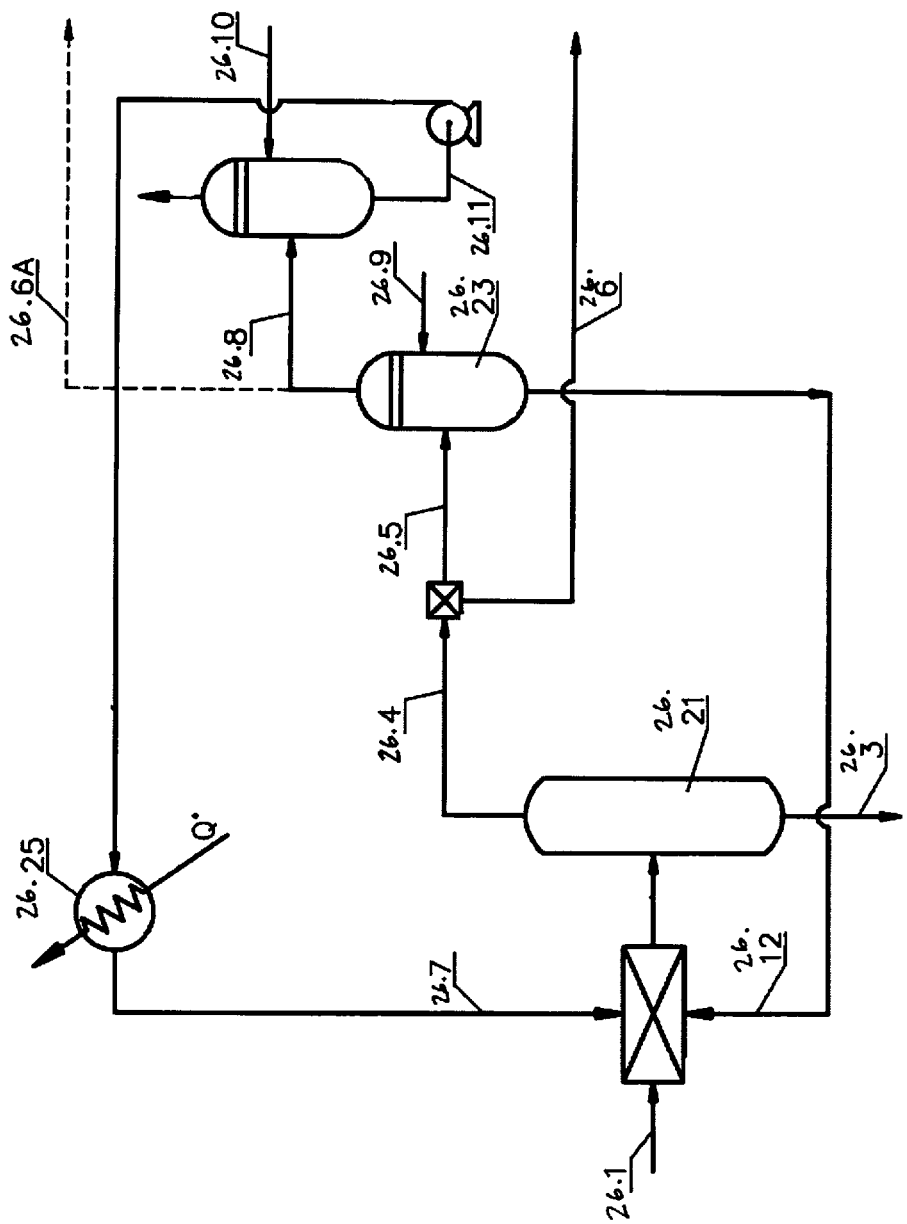
FIG. 26 is a schematic view of the process of Example 8.

The following tables are the simulation results for the process described in FIG. 26. The water feed 26.1 is produced water from a SAGD separator and includes solids and hydrocarbons at a high temperature of 200 C. (The produced water feed 26.1 is at a much lower flow of approx. 8 kg/hour compared to the flow of 18 kg/hour in example 25 because additional treated boiler feed water 26.10 is added later). The water feed 26.1 is mixed with superheated steam 26.7 at approximately 482 C. Recycled water 26.12 from scrubber 26.23 is recycled back to the water feed 26.1. Solid contaminates 26.3 are removed from separator 26.21. The produced steam 26.4 is divided into two flows—portion of steam 26.6 of the produced steam (75%) at a temperature of 271 C and pressure of 600 psi is recovered from the system as the product for steam injection in CSS, SAGD or any other steam use. Another option that wasn't simulated is to clean and scrub all the produced steam 26.4 to generate a cleaner produced steam for injection 26.6A. This option can be used in case contaminates in the produced steam 26.4 can damage the injection facility or block the formation over time. The remaining 25% of the produced steam 26.5 is cleaned in a wet scrubber with saturated water, potentially with additional chemicals to remove contaminates. Water 26.9 with a flow rate of 0.3 kg/hour and temperature of 20 C is fed into the scrubber 26.23 and the scrubbed water 26.12 is continually recycled back to the stage of the steam generation. The scrubbed steam 26.8 is condensed by direct contact with clean BFW 26.10 at a flow of 10 kg/hour and temperature of 20 C. The generated water 26.11 at a temperature of 250 C is pumped to low overpressure to generate circulation and compensate for the losses and is then transferred into superheated steam by a 12 kw heater 26.25 to simulate a bench scale laboratory facility. In a commercial plant any commercial boiler can be used to produce the superheated dry steam. The system simulation pressure was 600 psig. The superheated steam 26.7 at a flow of 16 kg/hour is used as the driving steam to drive the process.

| | Flow No. | | | | | |
|---|---|---|---|---|---|---|
| | 1 | 2 | 3 | 4 | 5 | 6 |
| T, C. | 200.00 | 271.89 | 271.89 | 271.89 | 271.88 | 271.88 |
| Press., psig | 600.00 | 600.00 | 600.00 | 600.00 | 600.00 | 600.00 |
| Vapor Fraction | 0.00 | 0.99 | 0.00 | 1.00 | 1.00 | 1.00 |
| Enthalpy, kW | −32.47 | −87.32 | −1.66 | −85.64 | −21.42 | −64.27 |
| Total Flow, kg/hr | 7.870 | 24.105 | 0.390 | 23.715 | 5.932 | 17.797 |
| Water, kg/hr | 7.320 | 23.500 | 0.000 | 23.500 | 5.879 | 17.636 |
| Solids | 0.390 | 0.390 | 0.390 | 0.000 | 0.000 | 0.000 |
| Hydrocarbons | 0.160 | 0.215 | 0.000 | 0.215 | 0.054 | 0.161 |

| | Flow No. | | | | | |
|---|---|---|---|---|---|---|
| | 7 | 8 | 9 | 10 | 11 | 12 |
| T, C. | 660.37 | 253.81 | 20.00 | 20.00 | 250.31 | 253.81 |
| Press., psig | 600.00 | 600.00 | 600.00 | 600.00 | 600.00 | 600.00 |
| Vapor Fraction | 1.00 | 1.00 | 0.00 | 0.00 | 0.00 | 0.00 |
| Enthalpy, kW | −53.87 | −21.71 | −1.32 | −44.16 | −65.87 | −1.04 |
| Total Flow, kg/hr | 15.927 | 5.927 | 0.300 | 10.000 | 15.927 | 0.305 |
| Water, kg/hr | 15.927 | 5.927 | 0.300 | 10.000 | 15.927 | 0.251 |
| Solids | 0.000 | 0.000 | 0.000 | 0.000 | 0.000 | 0.000 |
| Hydrocarbons | 0.000 | 0.000 | 0.000 | 0.000 | 0.000 | 0.054 |

To minimize the risk of build-ups in the downstream piping and equipment it is possible to recover the produced steam 25.6 from flow of steam 25.8 (indicated on FIG. 25 as flow 25.6A). The following tables are the simulation results for the process described in FIG. 26 with flow injection 26.6A as the produced steam exported from the system. The produced steam injection 26.6A is extracted from steam flow 26.8 after scrubbing in scrubber 26.23 with water 26.9. Additional chemical can be added to the scrubbing water 26.9 to remove contaminates with stream of steam 26.4.

| | Flow No. | | | | | |
|---|---|---|---|---|---|---|
| | 1 | 2 | 3 | 4 | 5 | 6A |
| T, C. | 200.00 | 253.81 | 253.81 | 253.81 | 253.81 | 253.81 |
| Press., psig | 600.00 | 600.00 | 600.00 | 600.00 | 600.00 | 600.00 |
| Vapor Fraction | 0.00 | 0.89 | 0.00 | 0.95 | 0.95 | 1.00 |
| Enthalpy, kW | −32.47 | −104.51 | −1.67 | −102.07 | −102.07 | −71.18 |
| Total Flow, kg/hr | 7.870 | 28.770 | 0.390 | 28.380 | 28.380 | 19.436 |
| Water, kg/hr | 7.320 | 27.686 | 0.000 | 27.686 | 27.686 | 19.436 |
| Solids | 0.390 | 0.390 | 0.390 | 0.000 | 0.000 | 0.000 |
| Hydrocarbons | 0.160 | 0.695 | 0.000 | 0.695 | 0.695 | 0.000 |

| | Flow No. | | | | | |
|---|---|---|---|---|---|---|
| | 7 | 8 | 9 | 10 | 11 | 12 |
| T, C. | 482.16 | 253.81 | 20.00 | 20.00 | 239.99 | 253.81 |
| Press., psig | 600.00 | 600.00 | 600.00 | 600.00 | 600.00 | 600.00 |
| Vapor Fraction | 1.00 | 1.00 | 0.00 | 0.00 | 0.00 | 0.00 |
| Enthalpy, kW | −64.08 | −23.73 | −2.65 | −52.3303 | −76.06 | −9.81 |
| Total Flow, kg/hr | 18.335 | 6.479 | 0.600 | 11.850 | 18.330 | 3.065 |
| Water, kg/hr | 18.335 | 6.479 | 0.600 | 11.850 | 18.330 | 2.370 |
| Solids | 0.000 | 0.000 | 0.000 | 0.000 | 0.000 | 0.000 |
| Hydrocarbons | 0.000 | 0.000 | 0.000 | 0.000 | 0.000 | 0.695 |

Example 9

Figure 27:
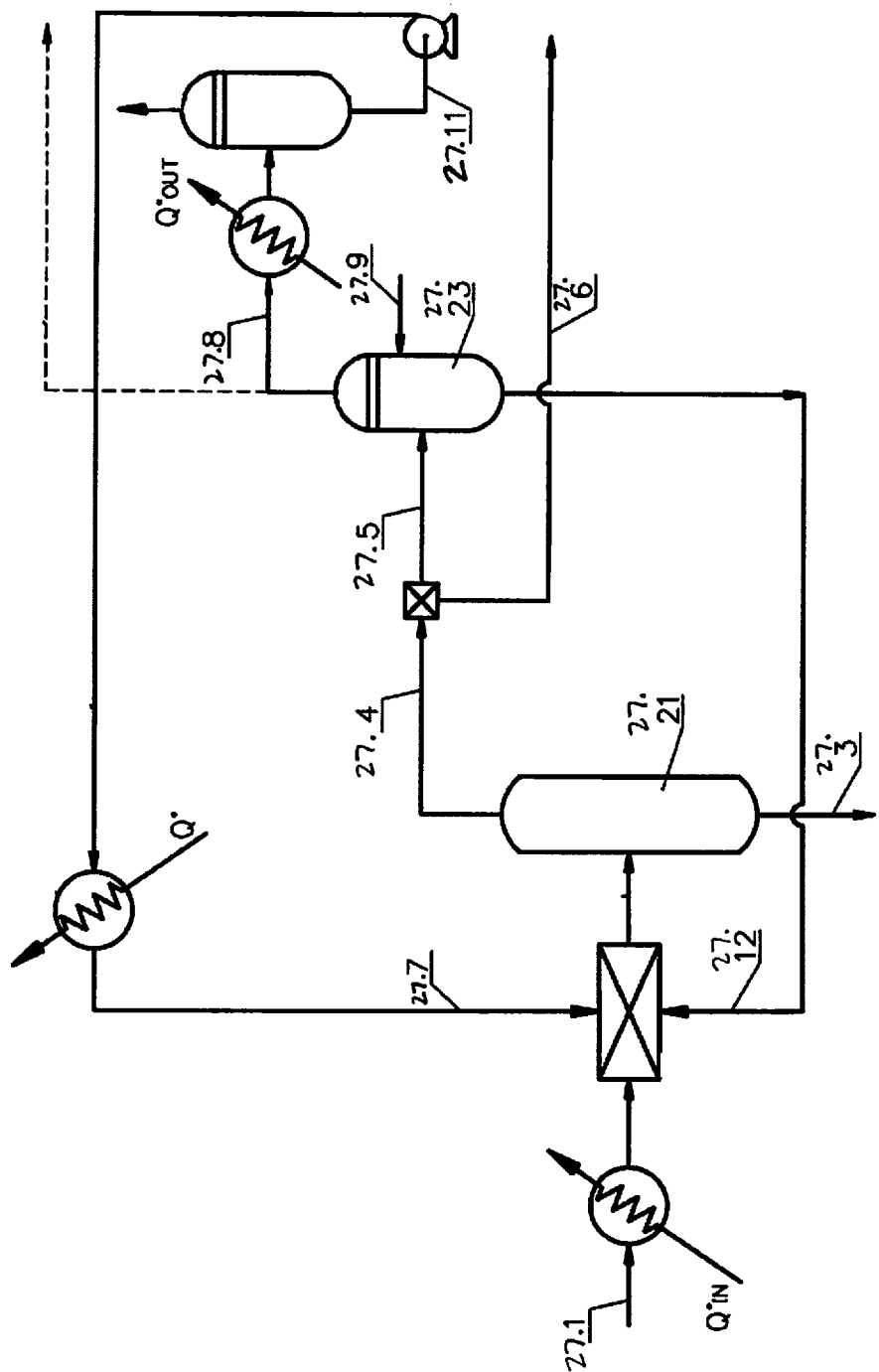
FIG. 27 is a schematic view of the process of Example 9.

The following tables are the simulation results for the process described in FIG. 27. The simulation is similar to Example 8 with a change to the production of the boiler feed water where instead of using clean Boiler Feed water to condense the generated steam for generating the superheated steam generator feed water, heat is recovered to condense the steam to BFW and is introduced back to the system to heat the feed water. By this arrangement, the need for fresh BFW is eliminated and replaced by condensation. Water feed 27.1 is heated with Q-in, that is a heat recovered from the condensation, and mixed with superheated steam 27.7. Recycled water 27.12 from scrubber 27.23 is recycled back to the water feed 27.1. Solid contaminates 27.3 are removed from separator 27.21. The produced steam 27.4 is divided into two flows—portion of steam 27.6 of the produced steam (53%) at a temperature of 282 C and pressure of 600 psi is recovered from the system as the product for steam injection or any other use. The remaining 47% of the produced steam 27.5 is cleaned in a wet scrubber with saturated water, potentially with additional chemicals to remove contaminates. Water 27.9 at a flow of 4.1 kg/hour and temperature of 20 C is fed into the scrubber 27.23 and the scrubbed water 27.12 is continually recycled back to the stage of the steam generation. The scrubbed clean steam 27.8 is condensed by recovering the condensation heat Q-out that is returned back to the system for pre-heating the feed water as Q-in or for pre-heating other streams like water 27.9. The generated water 27.11, at a temperature of 254 C, is pumped to low overpressure to generate circulation and compensate for the losses and is then generated into superheated steam by a 12 kw heater 27.25 to simulate a bench scale laboratory facility. In a commercial plant, any commercial boiler can be used to produce the superheated dry steam. The system simulation pressure was 600 psig. The superheated steam 27.7 at a flow of 18.7 kg/hour is used as the driving steam to drive the process. Another option to minimize the risk of build-ups in the injection piping is to recover the produced steam 27.6 from flow of steam 27.8 (indicated on FIG. 25 as flow 25.6A).

| | Flow No. | | | | | |
|---|---|---|---|---|---|---|
| | 1 | 2 | 3 | 4 | 5 | 6 |
| T, C. | 200.00 | 282.56 | 282.56 | 282.56 | 282.52 | 282.52 |
| Press., psig | 600.00 | 600.00 | 600.00 | 600.00 | 600.00 | 600.00 |
| Vapor Fraction | 0.00 | 0.99 | 0.00 | 1.00 | 1.00 | 1.00 |
| Enthalpy, kW | −86.378 | −145.07 | −4.46 | −140.57 | −66.07 | −74.51 |
| Total Flow, kg/hr | 20.930 | 40.518 | 1.050 | 39.468 | 18.552 | 20.920 |
| Water, kg/hr | 19.460 | 38.678 | 0.000 | 38.678 | 18.180 | 20.501 |
| Solids | 1.050 | 1.050 | 1.050 | 0.000 | 0.000 | 0.000 |
| Hydrocarbons | 0.420 | 0.791 | 0.000 | 0.791 | 0.372 | 0.419 |

| | Flow No. | | | | |
|---|---|---|---|---|---|
| | 7 | 8 | 9 | 11 | 12 |
| T, C. | 493.17 | 253.81 | 20.00 | 253.81 | 253.81 |
| Press., psig | 600.00 | 600.00 | 600.00 | 600.00 | 600.00 |
| Vapor Fraction | 1.00 | 1.00 | 0.00 | 1.00 | 0.00 |
| Enthalpy, kW | −65.12 | −68.38 | −4.42 | −77.12 | −2.11 |
| Total Flow, kg/hr | 18.671 | 18.671 | 1.000 | 18.671 | 0.881 |
| Water, kg/hr | 18.671 | 18.671 | 1.000 | 18.671 | 0.509 |
| Solids | 0.000 | 0.000 | 0.000 | 0.000 | 0.000 |
| Hydrocarbons | 0.000 | 0.000 | 0.000 | 0.000 | 0.372 |

Example 10

Figure 28:
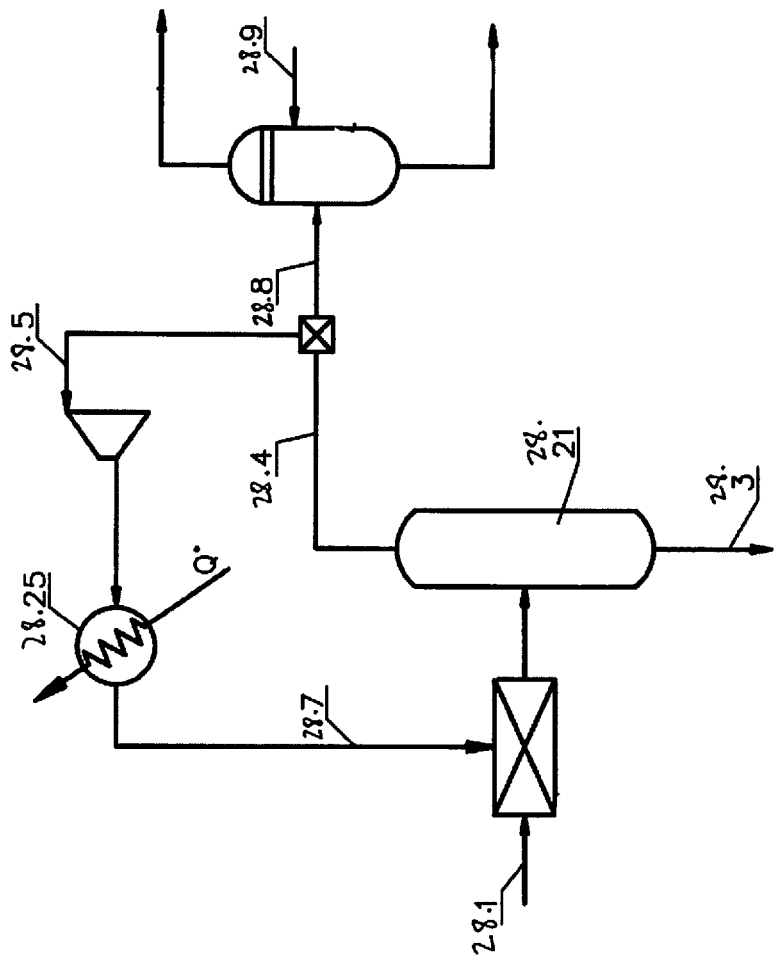
FIG. 28 is a schematic view of the process of Example 10.

The following tables are the simulation results for the process described in FIG. 28. The water feed 28.1 is tailings water from an open mine oilsands extraction facility. The feed water includes 30% solids and 3% solvents at a temperature of 20 C. The system is at a low pressure, close to atmospheric pressure. The produced water feed 28.1 is mixed with superheated steam 28.7 at 535 C. Solid contaminates 28.3 are removed from separator 28.21. The produced steam 28.4 is divided into two flows—portion of recycled steam 28.5 of the produced steam (70%) at a temperature 99.7 C is recycled, using mechanical compression, an ejector (not shown) or any other means, to generating the recycle flow. The recycled steam 28.5 is heated with a 12 kw heat source to generate superheated steam 28.7 at a temperature of 534 C. The remaining 30% of the produced steam 28.8 is condensed by direct contact mixture with process water 28.9 at a temperature of 20 C to generate 80 C process water that can used in the extraction process. The produced steam 28.4 can be further cleaned with any dry or wet commercially available cleaning systems, such as a wet scrubber (not shown) with saturated water, possibly with additional chemicals to remove contaminates. This cleaning can prevent build-ups at the recycling low pressure compressing unit and the heating unit 28.25. A total of 206 kg/hour of hot water is generated in this simulation from a 12 kw heat source.

| | Flow Number | | | | | |
|---|---|---|---|---|---|---|
| | 1 | 2 | 3 | 4 | 5 | 6 |
| T, C. | 20.00 | 99.73 | 99.73 | 99.73 | 99.73 | 108.00 |
| Press., atm | 1.00 | 1.00 | 1.00 | 1.00 | 1.00 | 1.10 |
| Vapor Fraction | 0.00 | 0.88 | 0.00 | 1.00 | 1.00 | 1.00 |
| Enthalpy, kW | −132.07 | −293.79 | −41.37 | −248.71 | −174.10 | −173.88 |
| Total Flow, kg/hr | 30.00 | 78.84 | 9.00 | 69.84 | 48.89 | 48.89 |
| Water, kg/hr | 20.10 | 66.85 | 0.00 | 66.85 | 46.79 | 46.79 |
| Solids | 9.00 | 9.00 | 9.00 | 0.00 | 0.00 | 0.00 |
| N-Butane | 0.45 | 1.50 | 0.00 | 1.50 | 1.05 | 1.05 |
| N-Pentane | 0.32 | 1.05 | 0.00 | 1.05 | 0.73 | 0.73 |
| N-Hexane | 0.14 | 0.45 | 0.00 | 0.45 | 0.31 | 0.31 |

| | Flow Number | | | | |
|---|---|---|---|---|---|
| | 7 | 8 | 9 | 10 | 11 |
| T, C. | 534.94 | 99.73 | 20.00 | 80.11 | 80.11 |
| Press., atm | 1.00 | 1.00 | 1.00 | 1.00 | 1.00 |
| Vapor Fraction | 1.00 | 1.00 | 0.00 | 1.00 | 0.00 |
| Enthalpy, kW | −161.88 | −74.61 | −821.39 | −0.61 | −895.39 |
| Total Flow, kg/hr | 48.89 | 20.95 | 186.00 | 0.51 | 206.44 |
| Water, kg/hr | 46.79 | 20.05 | 186.00 | 0.10 | 205.95 |
| Solids | 0.00 | 0.00 | 0.00 | 0.00 | 0.00 |
| N-Butane | 1.05 | 0.45 | 0.00 | 0.26 | 0.18 |
| N-Pentane | 0.73 | 0.31 | 0.00 | 0.12 | 0.20 |
| N-Hexane | 0.31 | 0.13 | 0.00 | 0.03 | 0.11 |

Example 11

Figure 29:
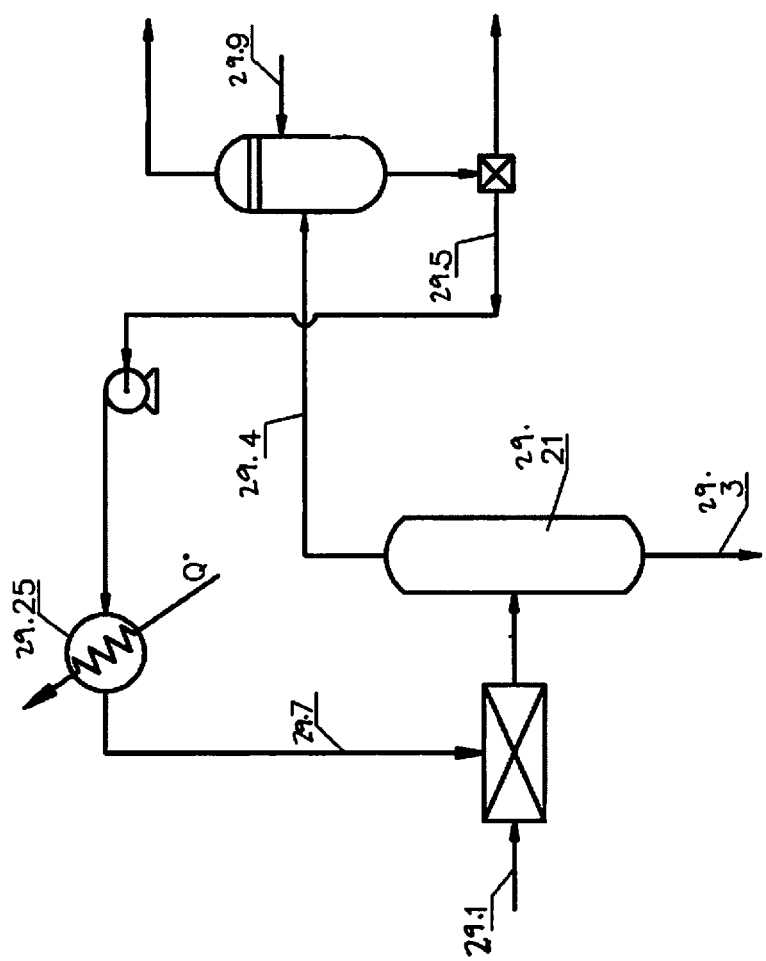
FIG. 29 is a schematic view of the process of Example 11.

The following tables are the simulation results for the process described in FIG. 29. The water feed 29.1 is tailings water from an open mine oilsands extraction facility. The feed water includes 30% solids and 3% solvents at a temperature of 20 C. The system is at a low pressure, close to atmospheric pressure. The produced water feed 29.1 is mixed with superheated steam 29.7 at 492 C. Solid contaminates 29.3 are removed from separator 29.21. The produced steam is condensed by direct contact mixture with process water 29.9 at a temperature of 20 C to generate 80 C process water that can be used in the extraction process. A portion of the produced water is heated in boiler 29.25 to generate superheated steam. The flow to produce the steam 29.5 can be further treated to remove contaminates to increase its quality to BFW quality water. Another option is to split the produced steam 29.4, scrub a portion, condense the clean scrubbed steam to water, possibly with water from an exterior source, and use the clean condensate to generate the super heated steam 29.7. This option was described in other figures but is not reflected in the current simulation.

| | Flow No. | | | | | |
|---|---|---|---|---|---|---|
| | 1 | 2 | 3 | 4 | 5 | 6 |
| T, C. | 20 | 110.46 | 110.46 | 110.46 | 80.07 | 80.07 |
| Press., atm | 1 | 1.00 | 1.00 | 1.00 | 1.00 | 1.10 |
| Vapor Fraction | 0 | 1.00 | 0.00 | 1.00 | 0.00 | 0.00 |
| Enthalpy, kW | −20.31 | −68.23 | −2.51 | −65.72 | −59.92 | −59.92 |
| Total Flow, kg/hr | 6 | 19.80 | 1.80 | 18.00 | 13.80 | 13.80 |
| Water, kg/hr | 4.02 | 17.81 | 0.00 | 17.81 | 13.79 | 13.79 |
| Solids | 1.8 | 1.80 | 1.80 | 0.00 | 0.00 | 0.00 |
| Hydrocarbons | 0.180 | 0.194 | 0.000 | 0.194 | 0.015 | 0.015 |

| | Flow No. | | | | |
|---|---|---|---|---|---|
| | 7 | 8 | 9 | 10 | 11 |
| T, C. | 492.40 | 80.07 | 20.00 | 80.07 | 80.07 |
| Press., atm | 1.00 | 1.00 | 1.00 | 1.00 | 1.00 |
| Vapor Fraction | 1.00 | 0.00 | 0.00 | 1.00 | 0.00 |
| Enthalpy, kW | −47.91 | −803.20 | −737.48 | 0.00 | −743.28 |
| Total Flow, kg/hr | 13.80 | 185.00 | 167.00 | 0.00 | 171.20 |
| Water, kg/hr | 13.79 | 184.81 | 167.00 | 0.00 | 171.02 |
| Solids | 0.00 | 0.00 | 0.00 | 0.00 | 0.00 |
| Hydrocarbons | 0.015 | 0.194 | 0.000 | 0.000 | 0.180 | the driving steam temperature was around 480 C—a typical re-heater temperature. Low quality produced water 3.34, at a temperature of 200 C with solids and bitumen contaminates, is injected into the steam. Inside the SD-DCSG the injected liquid water is converted into steam at 280 C temperature and is at the same 600 psi pressure as the dry driving steam 3.36. An 80% portion of the generated steam 3.32 is recycled through the ejector. The ejector is only designed to create the steam flow through heat exchanger 3.38 and create the flow through the SD-DCSG 3.30. High pressure steam 3.40 at a pressure of 1450 psi and a temperature of 311 C is injected through ejector to generate the required over pressure and flow in line with steam 3.36. The produced low pressure steam flows to heat exchanger 3.38 where 12 kw heat is added to the recycled steam 3.32 to generate a heated "dry" steam 3.36 at 480 C. This steam is used to drive the SD-DCSG as it is injected into the steam generation enclosure or SD-DCSG 3.30 and the excess heat energy is used to evaporate the injected water and generate additional steam 3.31 at 280 C. The produced steam 3.31 or just the recycled produced steam 3.32 can be cleaned of solids carried with the steam gas by an additional commercially available system (not shown).

| | Line Number | | | | | | | | |
|---|---|---|---|---|---|---|---|---|---|
| | 34 | Inside SD-DCSG 30 | 35 | 31 | 32 | Ejector Discharge | 36 | 33 | 40 |
| T, C. | 200 | 280.46 | 280.46 | 280.46 | 280.45 | 279.93 | 480.69 | 280.45 | 311.59 |
| Press., psig | 600 | 600.00 | 600.00 | 600.00 | 600.00 | 601.47 | 600.00 | 600.00 | 1450.38 |
| Vapor Fraction | 0 | 1.00 | 0.00 | 1.00 | 1.00 | 1.00 | 1.00 | 1.00 | 1.00 |
| Enthalpy, kW | −92.863 | −387.97 | −4.78 | −383.14 | −302.80 | −306.85 | −295.10 | −80.49 | −4.05 |
| Total Flow, kg/hr | 22.5 | 108.49 | 1.22 | 107.26 | 84.82 | 85.92 | 85.99 | 22.55 | 1.10 |
| Water, kg/hr | 20.925 | 105.37 | 0.00 | 105.37 | 83.27 | 84.37 | 84.44 | 22.14 | 1.10 |
| Solids | 1.125 | 1.13 | 1.13 | 0.00 | 0.00 | 0.00 | 0.00 | 0.00 | 0.00 |
| Bitumen | 0.450 | 1.995 | 0.100 | 1.895 | 1.545 | 1.545 | 1.545 | 0.411 | 0.000 |

Example 12

The following table is a simulation of the method described in FIG. 3 that illustrated producing steam with the use of a heat source without using an external source for the driving steam and with the use of a high pressure steam ejector to generate the internal flow in the system. SD-DCSG 3.30 includes a hot and dry steam 3.36 injection. In the simulation, Example 13

The following table simulates the process as described in FIG. 3 for in-situ oilsands thermal extraction facilities, like SAGD, for 600 psi pressures. The water feed is hot produced water at 200 C that includes solids and bitumen. The heat source Q' for the simulation was 12 KW. A portion of the heavy hydrocarbons are separated with the solids.

| | Flow Number | | | | | |
|---|---|---|---|---|---|---|
| | 34 | 35 | 31 | 32 | 36 | 33 |
| T, C. | 200 | 283.24 | 283.24 | 283.08 | 486.97 | 283.08 |
| Press., psig | 600 | 600.00 | 600.00 | 600.00 | 600.00 | 600.00 |
| Vapor Fraction | 0 | 0.00 | 1.00 | 1.00 | 1.00 | 1.00 |
| Enthalpy, kW | −92.863 | −4.78 | −380.72 | −304.70 | −292.68 | −76.17 |
| Total Flow, kg/hr | 22.5 | 1.23 | 106.83 | 85.56 | 85.56 | 21.39 |
| Water, kg/hr | 20.925 | 0.00 | 104.77 | 83.85 | 83.85 | 20.96 |
| Solids | 1.125 | 1.13 | 0.00 | 0.00 | 0.00 | 0.00 |
| Bitumen | 0.450 | 0.108 | 2.055 | 1.713 | 1.713 | 0.428 |

The table and the graph in FIG. 30 show the produce steam amount as a function of the feed water temperature in the system, as described in example 13. The simulation shows that with 20 C feed water, 15.1 kg/hr steam at 600 psi and 280 C will be produced from 12 kw heat source. With 240 C produced feed water, 23.5 kg/hr steam at 600 psi and 280 C will be produced from 12 kw heat source. There is an advantage to using hot produced water as the heat energy within the produced water: it will increase the amount of the produced steam. A portion of the hydrocarbons with the produced water will be converted to gas and flow with the produced steam.

I claim:

1. A method for oil extraction, said method comprising the steps of:
   generating a liquid stream having water, organics and solids from an oil production facility, wherein organics are comprised of hydrocarbons;
   generating steam through indirect heat exchange so as to form a generated steam;
   mixing said generated steam with said liquid stream so as to transfer said water from a liquid phase to a gas phase;
   separating said solids to produce a process steam, said process steam being a solids lean gas phase comprised of steam; and
   extracting oil with said process steam.

2. The method of claim 1, further comprising the step of:
   heating a portion of said generated steam indirectly before the step of mixing said generated steam with said liquid stream, said portion forming a superheated steam.

3. The method of claim 2, wherein a heat exchanger heats said generated steam so as to form said superheated steam.

4. The method of claim 2, further comprising the step of:
   circulating said portion of said generated steam in a steam ejector, wherein ejected steam for operating said steam ejector is added to said generated steam.

5. The method of claim 1, further comprising the step of:
   injecting said process steam to recover oil through an oil injection well.

6. The method of claim 5, further comprising the step of:
   adding solvents to process steam prior to the step of injecting.

7. The method of claim 1, wherein said hydrocarbons are comprised of processed hydrocarbons converted to gas and mixed with a previous process steam.

8. The method of claim 1, further comprising the step of:
   mixing a portion of said process steam with saturated water so as to scrub contaminates from said process steam and generate a scrubbed steam; and
   recycling said saturated water and scrubbed contaminates back to the step of mixing with said liquid stream.

9. The method of claim 8, further comprising the step of:
   adding chemicals to said saturated water so as to improve scrubbing performance of contaminates.

10. The method of claim 1, further comprising the steps of:
    producing oil and water from a production well, said water being comprised of hydrocarbons, solvents and solids contaminates;
    separating said hydrocarbons, solvents, and solids contaminates from liquid water so as to form a production water; and
    mixing said production water with said process steam.

11. A method for oil production, said method comprising the steps of:
    generating a liquid stream having water, solids, and hydrocarbons;
    generating steam through indirect heat exchange so as to form a generated steam;
    gasifying said liquid stream with said generated steam by direct contact heat exchange so as to transfer said water from a liquid phase to a gas phase;
    separating said gas phase to produce a process steam, said process steam being a solids lean gas phase steam;
    condensing said process steam to generate process heat and process water; and
    extracting oil with said process water.

12. The method of claim 11, further comprising the step of:
    forming a superheated steam with a portion of said generated steam;
    mixing said superheated steam with said liquid stream; and
    recycling another portion of said generated steam to a heater generating said superheated steam.

13. The method of claim 11, further comprising the step of:
    separating solvent from said process water.

14. The method of claim 11, wherein said hydrocarbons are comprised of solvents.

15. A system for producing steam for extracting heavy bitumen, the system comprising:
    an indirect contact heat exchanger means, wherein system water is heated by said indirect contact heat exchanger means to generate a superheated steam;
    a steam drive direct contact steam generator, mixing said superheated steam with a liquid discharge stream having water and solids, wherein said steam drive direct contact steam generator is in fluid connection to said indirect contact heat exchanger means; and
    an enhanced oil recovery facility in fluid connection to said steam drive direct contact steam generator.

16. The system of claim 15, further comprising:
    a production well producing a mixture of water, oil and gas;
    a separator fluidly connected to said production well and in fluid connection to said steam drive direct contact steam generator, wherein said liquid discharge steam is comprised of water from said production well, and wherein said indirect heat exchanger means is comprised of a heater.

17. The system of claim 16, wherein said steam drive direct contact steam generator and said heater are located on a well pad in proximity to a steam injection well.

18. The system of claim 15, further comprising:
    an ejector means for a pressurized steam supply, wherein said indirect contact heat exchanger means is comprised of a heater, and wherein produced steam from said steam drive direct contact steam generator recycles to said pressurized steam supply and said heater.

* * * * *